TELEPHONE SERVICE CONCENTRATOR

Filed May 27, 1954 29 Sheets-Sheet 1

INVENTORS S. F. DUNNING
D. H. MAC PHERSON
BY William F. Simpson
ATTORNEY

TELEPHONE SERVICE CONCENTRATOR

TERMINATING END

INVENTORS S. F. DUNNING
D. H. MAC PHERSON
BY William F. Simpson
ATTORNEY

INVENTORS S. F. DUNNING
D. H. MAC PHERSON
BY *William F. Simpson*
ATTORNEY

INVENTORS S. F. DUNNING
D. H. MAC PHERSON
BY William F. Simpson.
ATTORNEY

Dec. 9, 1958 S. F. DUNNING ET AL 2,863,950

TELEPHONE SERVICE CONCENTRATOR

Filed May 27, 1954 29 Sheets-Sheet 5

INVENTORS S. F. DUNNING
D. H. MAC PHERSON
BY *William F. Simpson.*
ATTORNEY

Dec. 9, 1958 S. F. DUNNING ET AL 2,863,950

TELEPHONE SERVICE CONCENTRATOR

Filed May 27, 1954 29 Sheets-Sheet 6

INVENTORS S. F. DUNNING
D. H. MAC PHERSON

BY *William F. Simpson*

ATTORNEY

Dec. 9, 1958 S. F. DUNNING ET AL 2,863,950

TELEPHONE SERVICE CONCENTRATOR

Filed May 27, 1954 29 Sheets-Sheet 7

INVENTORS S. F. DUNNING
D. H. MacPHERSON

BY William F. Simpson

ATTORNEY

INVENTORS S. F. DUNNING
D. H. MacPHERSON
BY William F. Simpson
ATTORNEY

INVENTORS S. F. DUNNING
D. H. MAC PHERSON
BY William F. Simpson
ATTORNEY

INVENTORS: S.F. DUNNING
D.H. MACPHERSON
BY William F. Simpson
ATTORNEY

INVENTORS S. F. DUNNING
D. H. MAC PHERSON
BY *William F. Simpson*
ATTORNEY

INVENTORS S. F. DUNNING
D. H. MAC PHERSON
BY William F. Simpson
ATTORNEY

INVENTORS S. F. DUNNING
D. H. MAC PHERSON
BY William F. Simpson.
ATTORNEY

Dec. 9, 1958 S. F. DUNNING ET AL 2,863,950

TELEPHONE SERVICE CONCENTRATOR

Filed May 27, 1954 29 Sheets-Sheet 14

INVENTORS S. F. DUNNING
D. H. MacPHERSON

BY William F. Simpson.

ATTORNEY

INVENTORS S. F. DUNNING
D. H. MAC PHERSON
BY William F. Simpson
ATTORNEY

INVENTORS S. F. DUNNING
D. H. MacPHERSON
BY
William F. Simpson.
ATTORNEY

INVENTORS S. F. DUNNING
D. H. MACPHERSON
BY William F. Simpson
ATTORNEY

Dec. 9, 1958 S. F. DUNNING ET AL 2,863,950

TELEPHONE SERVICE CONCENTRATOR

Filed May 27, 1954 29 Sheets-Sheet 18

INVENTORS S. F. DUNNING
D. H. MacPHERSON
BY
William F. Simpson.
ATTORNEY

Dec. 9, 1958 S. F. DUNNING ET AL 2,863,950

TELEPHONE SERVICE CONCENTRATOR

Filed May 27, 1954 29 Sheets-Sheet 19

INVENTORS S.F. DUNNING
D.H. MacPHERSON
BY William F. Simpson.
ATTORNEY

Dec. 9, 1958 S. F. DUNNING ET AL 2,863,950

TELEPHONE SERVICE CONCENTRATOR

Filed May 27, 1954 29 Sheets-Sheet 20

INVENTORS S. F. DUNNING
D. H. MacPHERSON
BY William F. Simpson.
ATTORNEY

TELEPHONE SERVICE CONCENTRATOR

INVENTORS S. F. DUNNING
D. H. MACPHERSON
BY William F. Simpson
ATTORNEY

INVENTORS S. F. DUNNING
D. H. MacPHERSON
BY William F. Simpson.
ATTORNEY

Dec. 9, 1958 S. F. DUNNING ET AL 2,863,950

TELEPHONE SERVICE CONCENTRATOR

Filed May 27, 1954 29 Sheets-Sheet 23

INVENTORS S. F. DUNNING
D. H. MACPHERSON
BY William F. Simpson
ATTORNEY

INVENTORS S. F. DUNNING
D. H. MACPHERSON
BY William F. Simpson
ATTORNEY

INVENTORS S. F. DUNNING
D. H. MacPHERSON
BY William F. Simpson
ATTORNEY

INVENTORS S. F. DUNNING
D. H. MacPHERSON
BY William F. Simpson.
ATTORNEY

INVENTORS S. F. DUNNING
D. H. MacPHERSON
BY William F. Simpson
ATTORNEY

INVENTORS S. F. DUNNING
D. H. MacPHERSON
BY William F. Simpson.
ATTORNEY

INVENTORS S. F. DUNNING
D. H. MAC PHERSON
BY William F. Simpson,
ATTORNEY

United States Patent Office 2,863,950

Patented Dec. 9, 1958

2,863,950

TELEPHONE SERVICE CONCENTRATOR

Sanford F. Dunning, Wheaton, Ill., and Donald H. MacPherson, Freeport, N. Y.; said Dunning assignor to American Telephone and Telegraph Company, a corporation of New York, and said MacPherson assignor to Bell Telephone Laboratories, Incorporated, New York, N. Y., a corporation of New York Application May 27, 1954, Serial No. 432,770

31 Claims. (Cl. 179—27)

Figures 1, 3:
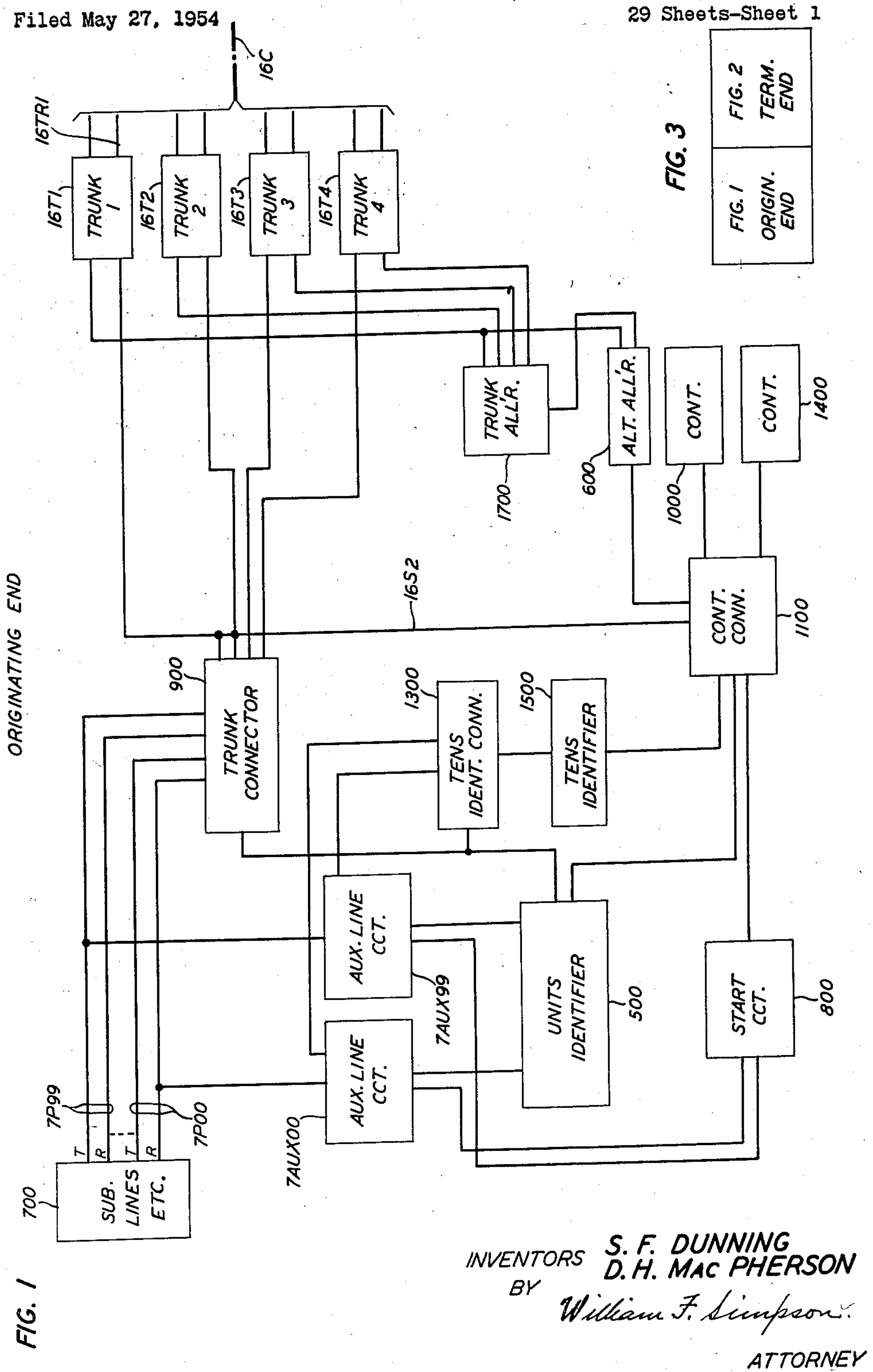

This invention relates to telephone systems and more particularly to such systems arranged to render secretarial or answering service to certain subscribers served thereby.

Telephone secretarial services are utilized to answer calls for professional or business subscribers in their absence. When the line of a serviced subscriber is called, it is necesary to provide an indication to an answering attendant who answers the call and receives or supplies a message. In the telephone answering systems utilized in the prior art, an individual pair of wires for each service line is provided between the central office and the answering bureau. The answering bureaus are usually located as near as possible to the central office because the cost of providing individual pairs of wires generally makes it impracticable for an answering bureau to service subscribers who are in distant central office areas or to locate the answering bureau at a distance from the central office.

It is an object of the present invention to provide concentrator apparatus to realize reduction of the number of pairs of wires between the central office and the answering bureau in a telephone answering system.

Another object of the present invention is to provide an answering service system for economically servicing a plurality of central office areas from one answering bureau, location or position.

A further object of the present invention is the provision of an economical answering service system having a bureau that is located in a central office area different from the central office area of some of the subscribers serviced thereby.

Still another object of the present invention is to provide an economical answering service system having an answering bureau or position that is located at a distance from any central office.

Still another object of the present invention is to provide an answering service system having identifying apparatus which transmits the identity of a called line to a remote answering bureau and trunk allotting apparatus which functions to allot a trunk for connecting the called subscriber's line to the rmeote answering bureau.

Another object of this invention is to provide control means responsive to signals representing the identity of a called line for both lighting a lamp individual to that line and for automatically controlling the establishing of a connection between a jack individual to that line and an answering trunk.

Another object of this invention is to provide control apparatus responsive to calls directed to subscribers' lines to automatically extend connections from said lines to call answering trunks.

Still another object is the provision of an answering service system having an indication system for identifying and providing an indication of called subscribers which functions independently of the availability for answering calls of the answering trunks. An answering position is provided to which the indications of the called subscribers are provided over portions of some of the trunks.

Still another object of the present invention is the provision of line concentrating and identifying apparatus for servicing a relatively large number of telephone subscribers over relatively few trunks.

The answering service equipment of an exemplary embodiment of the present invention includes at the answering bureau a jack and an associated lamp individual to each of the lines for which the answering service is provided. Each of the jacks is assigned to one of the lines and calls to the lines are answered by the attendant at the answering bureau by inserting a plug in the jack assigned to respective lines.

The answering bureau is connected with the central office by a few trunks, less in number than the number of lines which may be answered at the answering bureau. Equipment is provided at the central office and at the answering bureau for first interconnecting the called lines with the trunks to the answering bureau and then at the answering bureau for connecting the trunks with the jacks individually assigned to the respective subscribers' lines.

In an exemplary embodiment of this invention, equipment is provided for answering forty lines at an answering bureau, which is connected to the central exchange or central office by two trunks. Provision is made for expanding such arrangements to permit one hundred lines to be answered at the answering bureau over four trunks interconnecting the answering bureau with the central office. Of course, if it is desired to answer still more lines additional equipment will be provided The amount of equipment required is dependent upon the number of lines to be provided with answering service and the frequency with which calls are directed to these lines.

During light traffic conditions, i. e., a low number of calls directed to the group of lines provided with answering service, the answering equipment is arranged so that the lights assigned to the individual subscribers' lines will flash or light during the intervals that ringing current is applied to the subscribers' lines. When the usual ringing cycle of two seconds ring, four seconds silent code is employed at the central office, the light at the answering bureau individual to the subscriber's line having such ringing current applied thereto will be lit for approximately a second and a half for each ringing interval of two seconds during the time the ringing current is applied to the subscriber's line.

During the time a light at the answering bureau individual to a given subscriber's line is lit, one connection is extended from the called subscriber's line at the central office to one of the trunks extending to the answering bureau and another connection is extended from this trunk to the jack individual to said subscriber's line.

The attendant at the answering bureau may respond to the flashing lamp individual to a given subscriber's line in a manner desired by the subscriber. The operator or attendant may disregard the lamp at given hours of the day, and the operator or attendant may count the number of rings applied to the subscriber's line before answering the call or at other times she may answer the call as soon as convenient. When the operator or attendant desires to answer the call she will insert a plug in the jack assigned to the subscriber's line and if the light is lit at this time a connection will be established between the operator or attendant at the answering bureau and the called subscriber's line. The ringing current will then be tripped or intercepted and a communication path established between the operator or attendant at the answering bureau and the calling subscriber. The calling subscriber may leave any desired message or other information and then the connection released.

Thus, during light traffic conditions the indications at the answering bureau are substantially the same as if a large number of trunks, substantially equal to the number of subscribers' lines provided with answering service, is extended from the central office to the answering bureau.

As traffic conditions become heavier and the calling rate increases, the times the individual lamps assigned to the various subscribers' lines remain lit and also the times these lines are interconnected with the trunks and the trunks interconnected with the associated jacks are decreased. In an exemplary embodiment of this invention, provision is made for flashing twelve lamps during any given ringing interval of six seconds, one lamp after another. The number of lines assigned to one group of trunks and number of trunks provided are such as to be adequate to handle the normal peak traffic directed to the lines served by the group of trunks to the answering bureau. Of course in answering calls the trunks may be held busy for longer intervals of time so that the trunk circuits and interconnecting equipment are arranged so that the various lamps assigned to the various subscribers will be flashed one after another in the manner indicated above independently of whether or not any of the trunks between the answering bureau and the central office are available for answering calls. In order that the lamps may be flashed independently of the availability of the trunks for answering the calls, signals controlling the lamps are transmitted over one of the line conductors of one of the trunks independently of the use of the trunk for answering called subscribers' lines. Thus, under normal peak traffic conditions, the indications provided at the answering bureau are substantially the same as under light traffic conditions except that the interval during which the lamps individual to the various subscribers' lines are lighted, is decreased.

A further feature of this invention relates to control means such that the lamps at the answering bureau individual to the subscribers' lines which have ringing current applied thereto are energized one after another before any lamp individual to any of the subscribers' lines is energized a second time. This arrangement enables the lamps of all subscribers to be energized even under abnormally heavy traffic conditions so that the attendant at the answering bureau has an indication of the number of subscribers served by the bureau which are being called. The operator may then answer the calls in any desired manner and give preference to any of the calls by selecting the particular lines to be answered. If the operator attempts to answer a call when the lamp of the called line is not energized the connection is not established until the lamp is energized and a trunk is interconnected with the called line and the jack associated therewith.

During light, heavy and abnormally heavy traffic conditions, the lamps individual to the various called subscribers' lines served by the answering bureau are energized one at a time and in succession. If any of the answering trunks are available they are assigned in rotation and interconnected between the called subscribers' lines and the jack assigned thereto so that the operator or attendant at the answering bureau may answer the call during the time the light individual thereto is energized. If all the trunks become busy by the operator or attendant holding them for any reason, the lights nevertheless continue to flash one after another indicating the subscribers' lines which are being called so that the operator or attendant at the answering bureau may have an indication of the traffic conditions. The operator or attendant still may count the number of flashes which will be an indication of the length of time the called line is being rung and when any of the trunks becomes available it is interconnected in a manner described above so that the operator can answer the calls as she desires, or has been instructed.

The switching system, apparatus, and devices employed at the central office and at the answering bureau for interconnecting the trunks with the called subscribers' lines at the central office may be of a different type than the switching system, apparatus and devices employed for interconnecting the trunks and the jacks and lamps assigned to the called subscribers' lines at the answering bureau. The control circuits may be simplified, however, and the complexity of the system reduced if similar types of switching apparatus and devices are employed at both places. In an exemplary embodiment of the invention, the interconnecting equipment comprises one or more crossbar switches and control circuits at the central office and one or more crossbar switches and control circuits at the answering bureau.

Each of the subscribers' lines to be provided with answering service is assigned a location on the crossbar switches at the central office and the lamps and jacks assigned to said subscribers' lines are likewise assigned and connected to the corresponding locations on the crossbar switches at the answering bureau. Each of the locations of the lines, provided with the answering service, on the crossbar switches is designated by means of a two-numeral or two-digit designation. The determination of the two digits so identifying the called line enables the switching circuits at the central exchange to be readily and rapidly controlled to extend connections between the called lines and the trunks in rotation and by transmitting signals representing these designations to the answering bureau, the switching circuits thereat may be similarly readily controlled both for causing lamps assigned to the respective subscribers' lines to be energized and for controlling connections extended from the trunks to the jacks assigned to the corresponding called lines.

One feature of the present invention pertains to means for transmitting the signals identifying the called lines provided with answering service and thus identifying the location of these lines on the crossbar switches at the answering bureau independently of whether or not the trunks between these locations are busy or available for answering calls.

A feature of the invention relates to means for automatically assigning the trunks to the answering bureau in rotation so long as one or more of the trunks are not engaged in answering a call. Upon the assignment of a trunk additional signals are transmitted over the assigned trunk so that these additional signals together with the signals identifying the location of the called line on the crossbar switch when received at the answering bureau may be employed to extend a connection from the trunks at the answering bureau to the jack assigned to the line to which a call has been directed.

Another feature of the present invention pertains to extension of the connections momentarily for short intervals of time during each ringing interval or cycle while ringing current is applied to the called subscriber's line. Thus such connections are established in rotation one at a time at both the central office and answering bureau.

Another object of the invention is to maintain such connections as long as may be desired when a call is answered in order that the attendant at the answering bureau may communicate with the person calling the line or subscriber provided with answering service to the extent that it is necessary or desirable.

In order to provide the proper connections between the crossbar switch and the called lines at the central exchange, auxiliary lines and line circuits are provided which are employed to connect the various called subscribers' lines supplied with answering service to the assigned positions on the crossbar switch. In addition, the auxiliary line circuits are arranged to include means for responding to ringing current supplied to the subscribers' lines without interrupting the supply of ringing current to said lines. Thus the called parties' lines continue to have ringing current applied to them and at the same time an indication thereof is given to the attendant at the answering bureau.

With four interconnecting trunks, when ringing current is applied to a serviced subscriber's line, the originating end identifies the called subscriber and allots one of the four trunks. The identity of the called subscriber is transmitted to the answering bureau which provides a visual indication thereof on a switchboard located at the answering bureau and connects the allotted trunk to the switchboard. The allotted trunk is maintained connected to the switchboard for an interval during which time the attendant can answer the call. While the attendant is answering one call, three other calls may be held on the three other trunks. Even though all four trunks are busy in this manner, the originating end continues to transmit the identity of other incoming calls to the terminating end.

Figure 2:
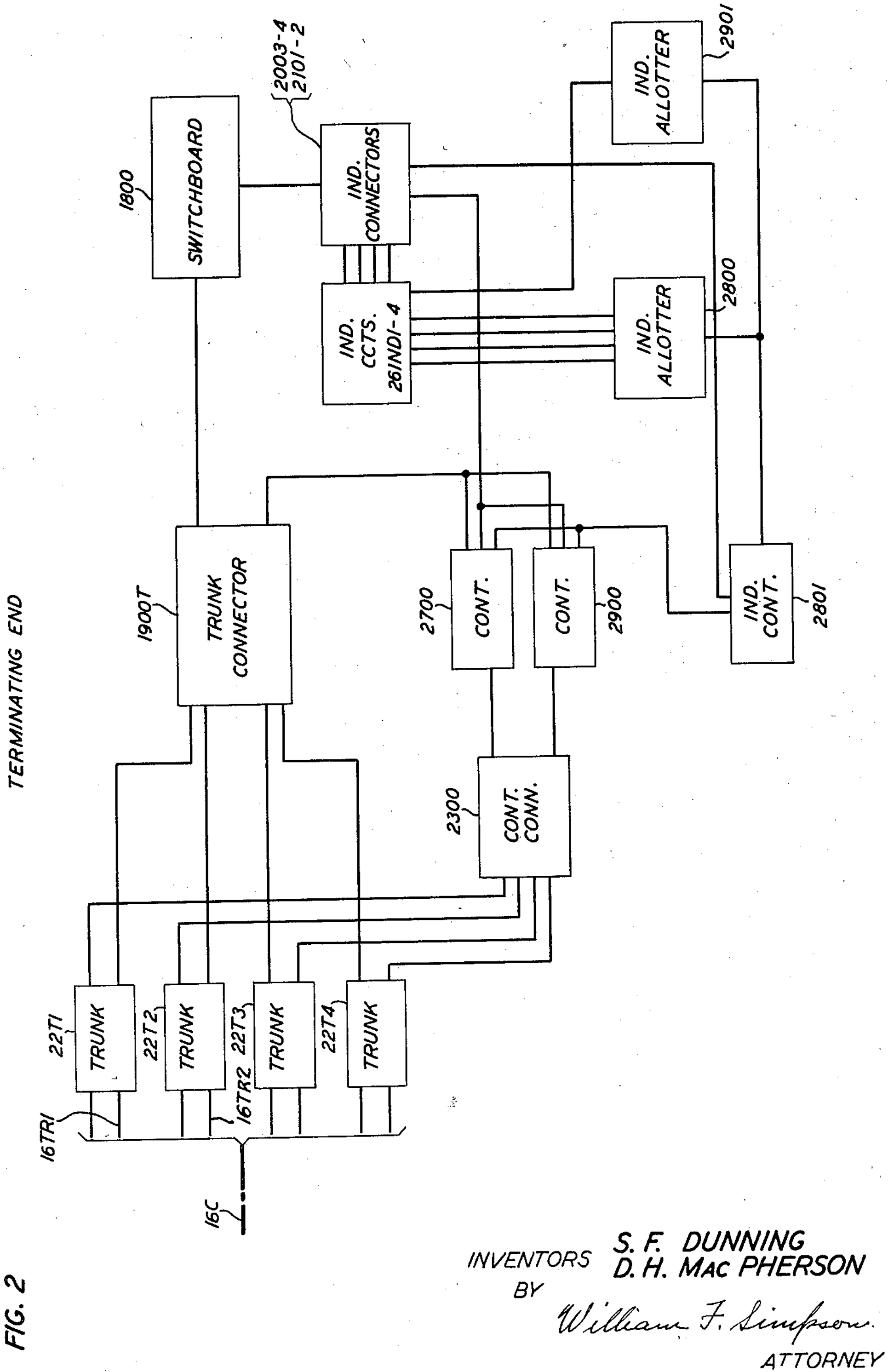
Figure 4:
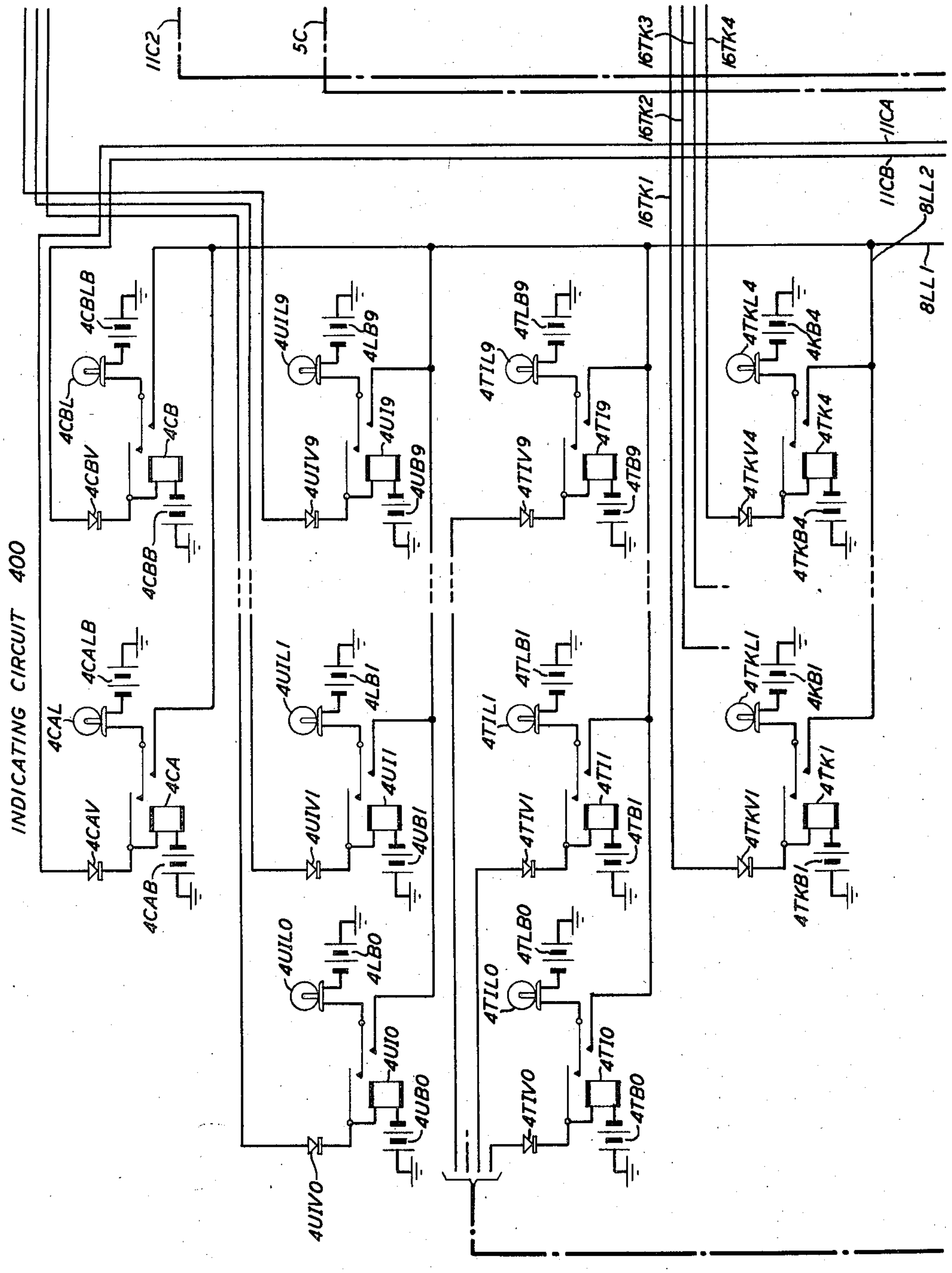
Figure 5:
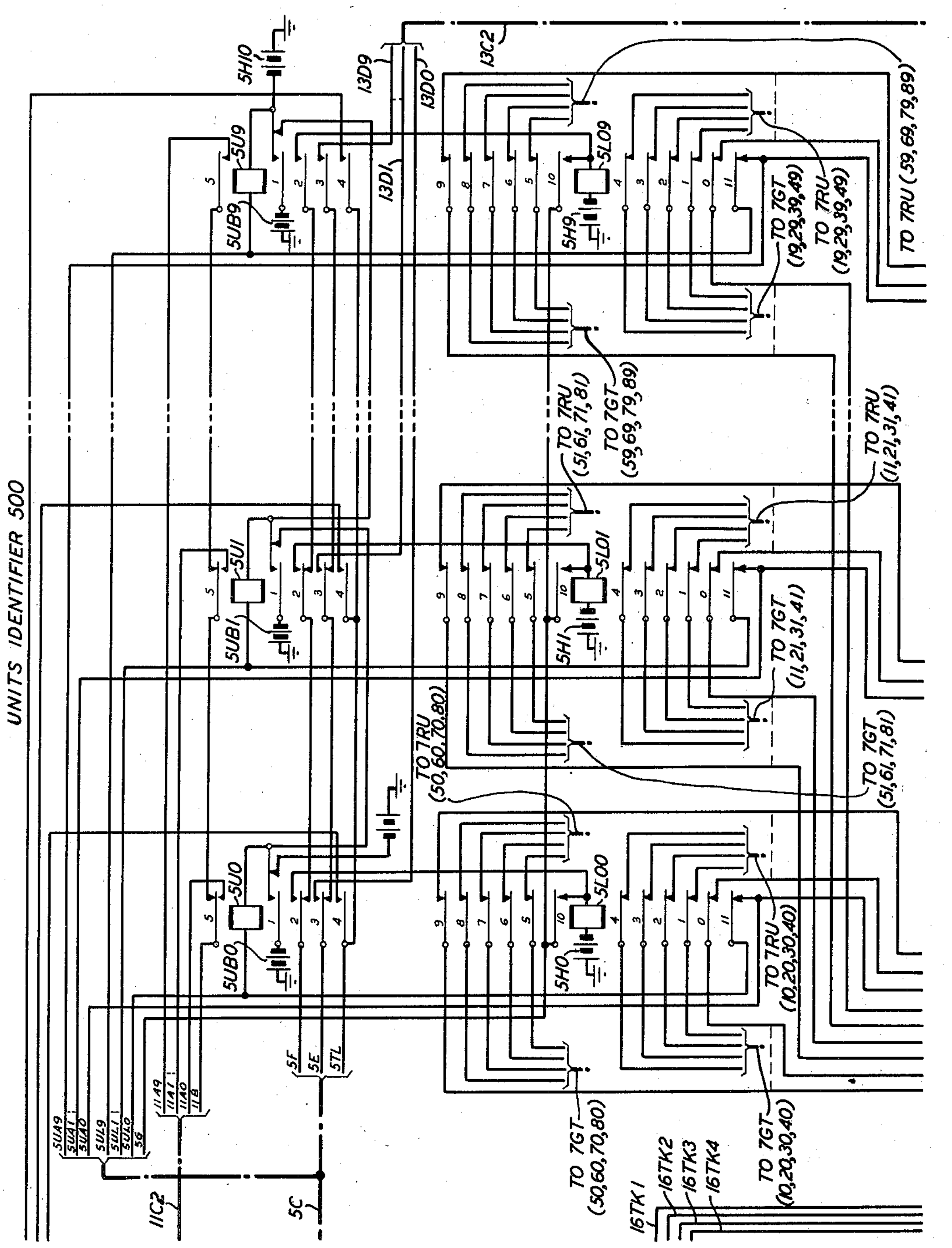
Figure 6:
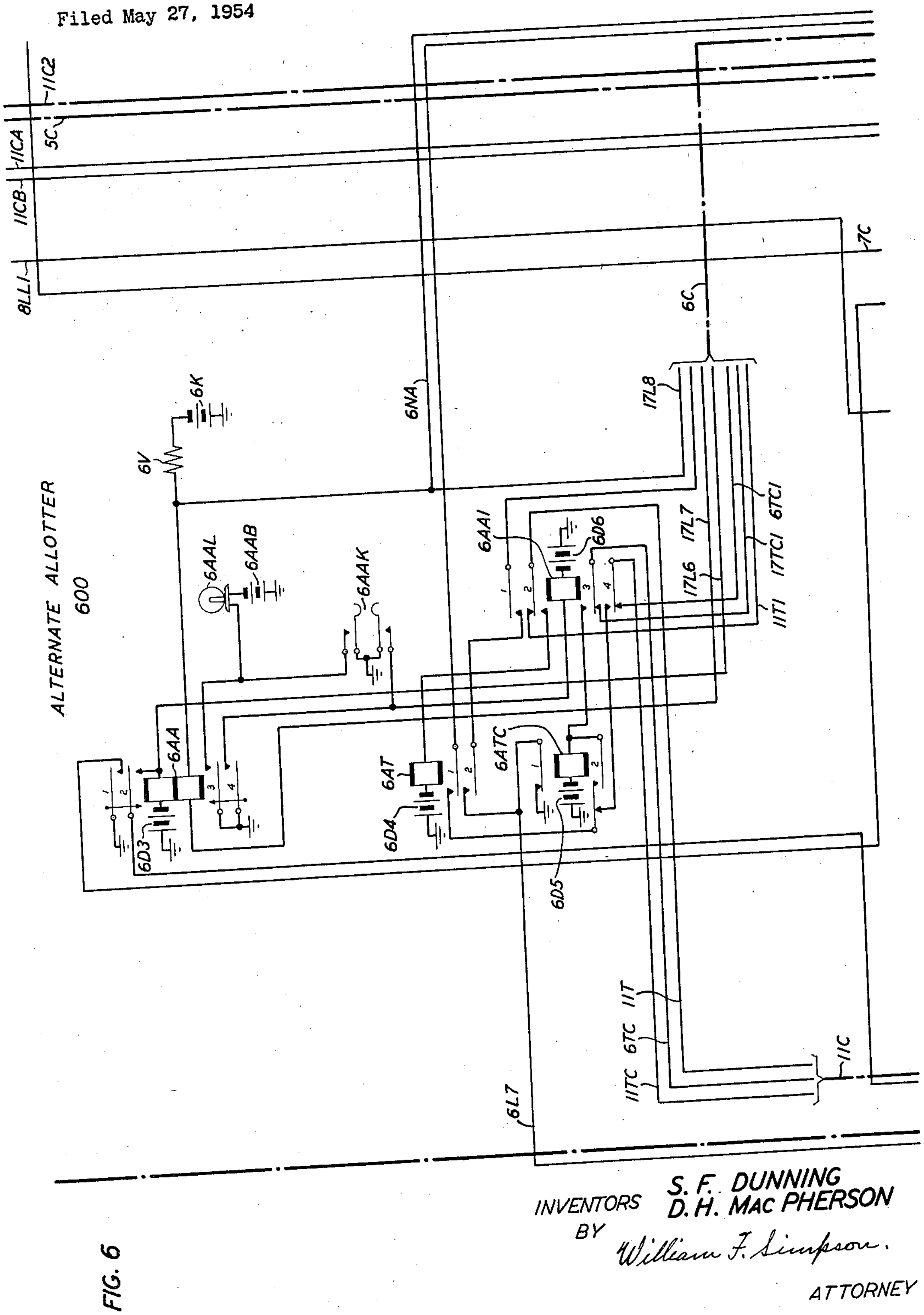
Figure 7:
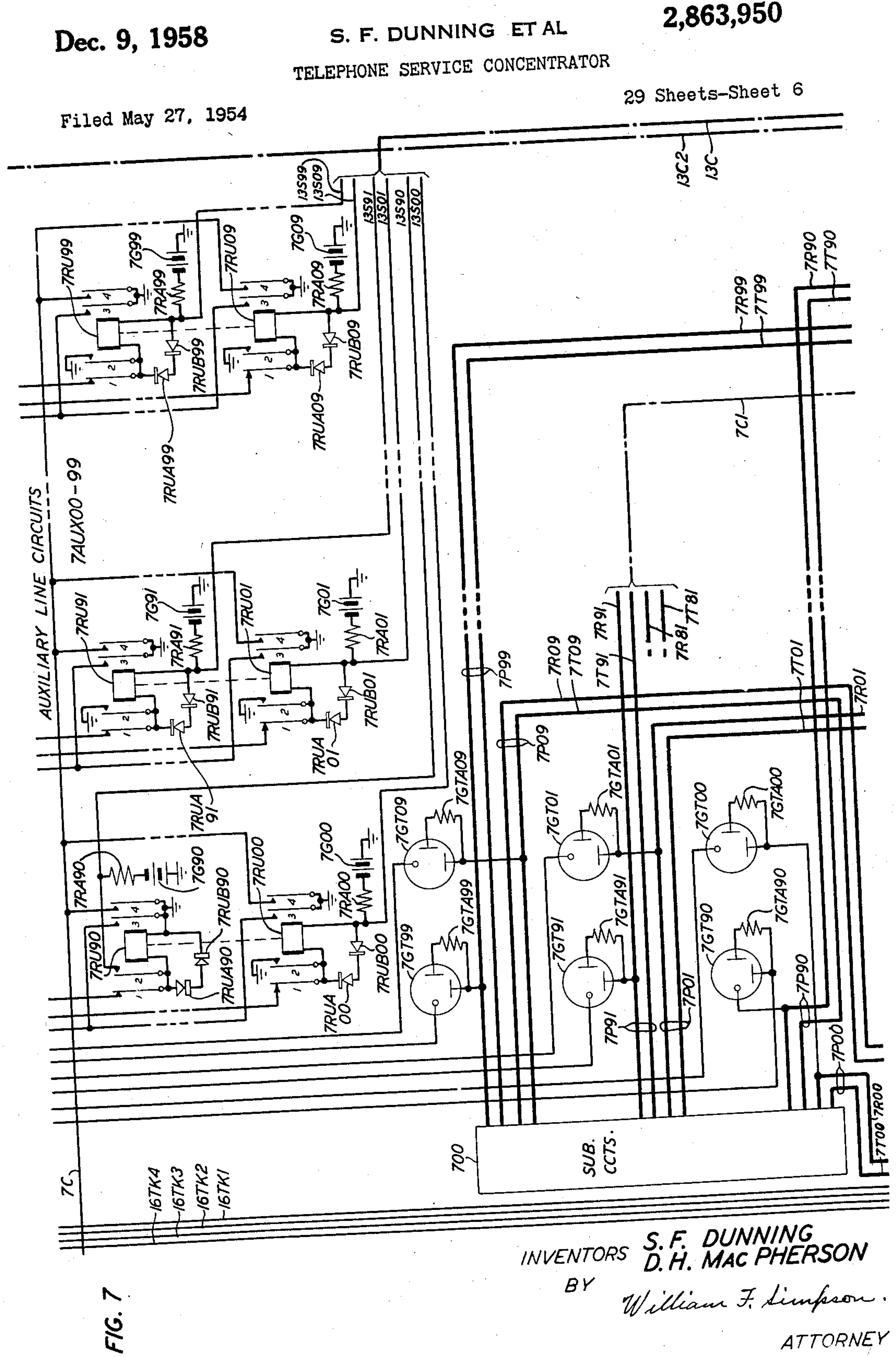
Figure 8:
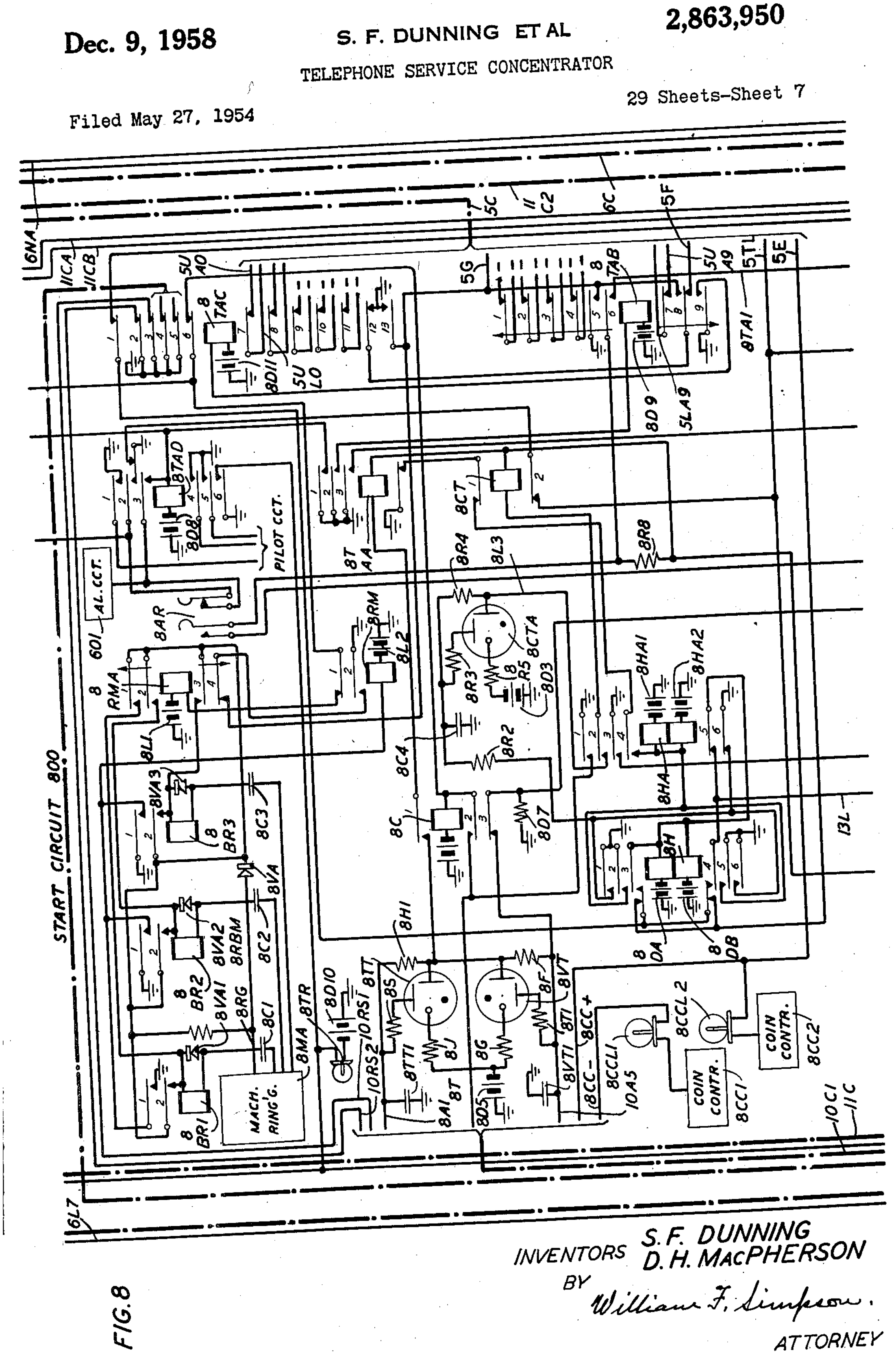
Figure 9:
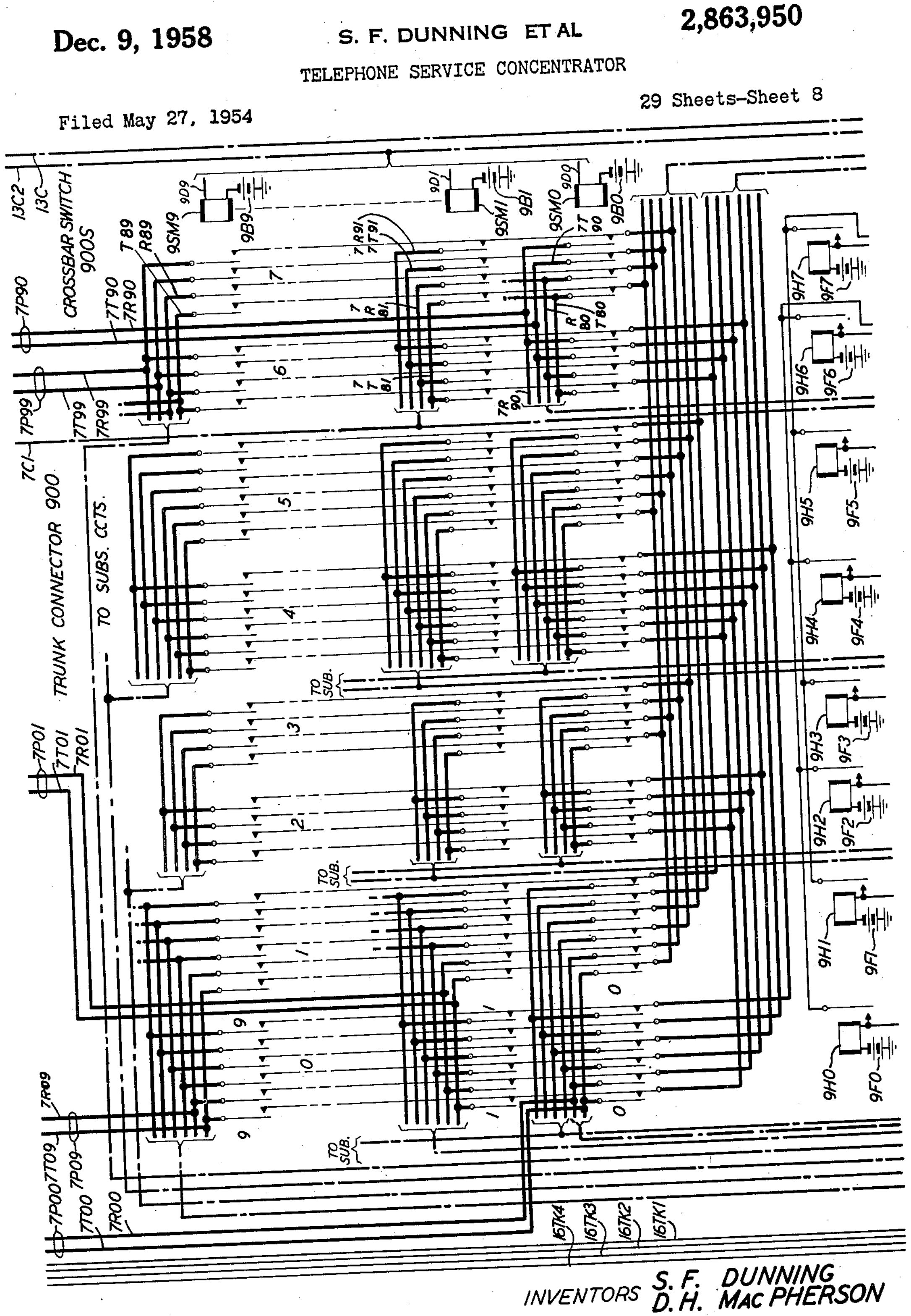
Figure 10:
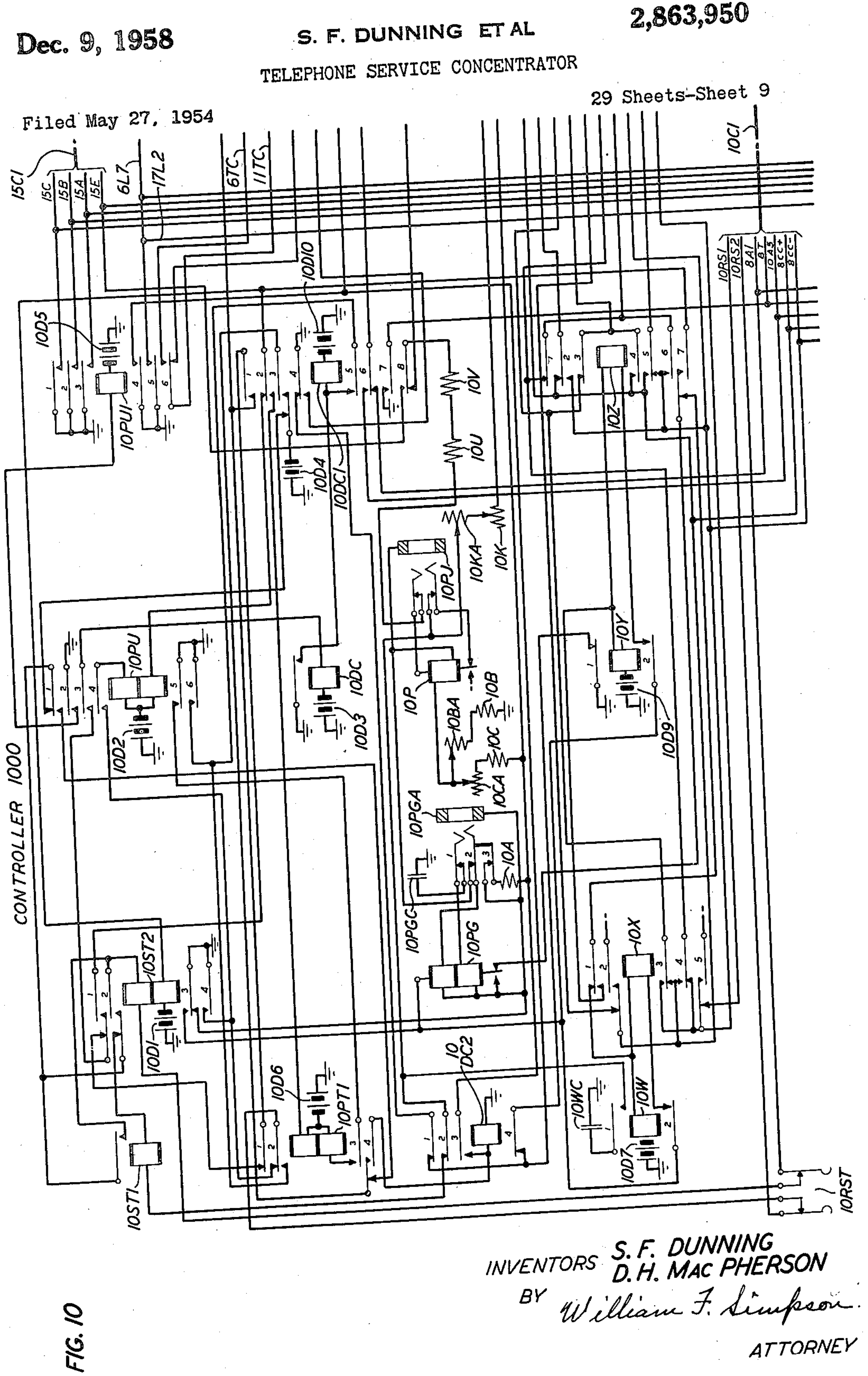
Figure 11:
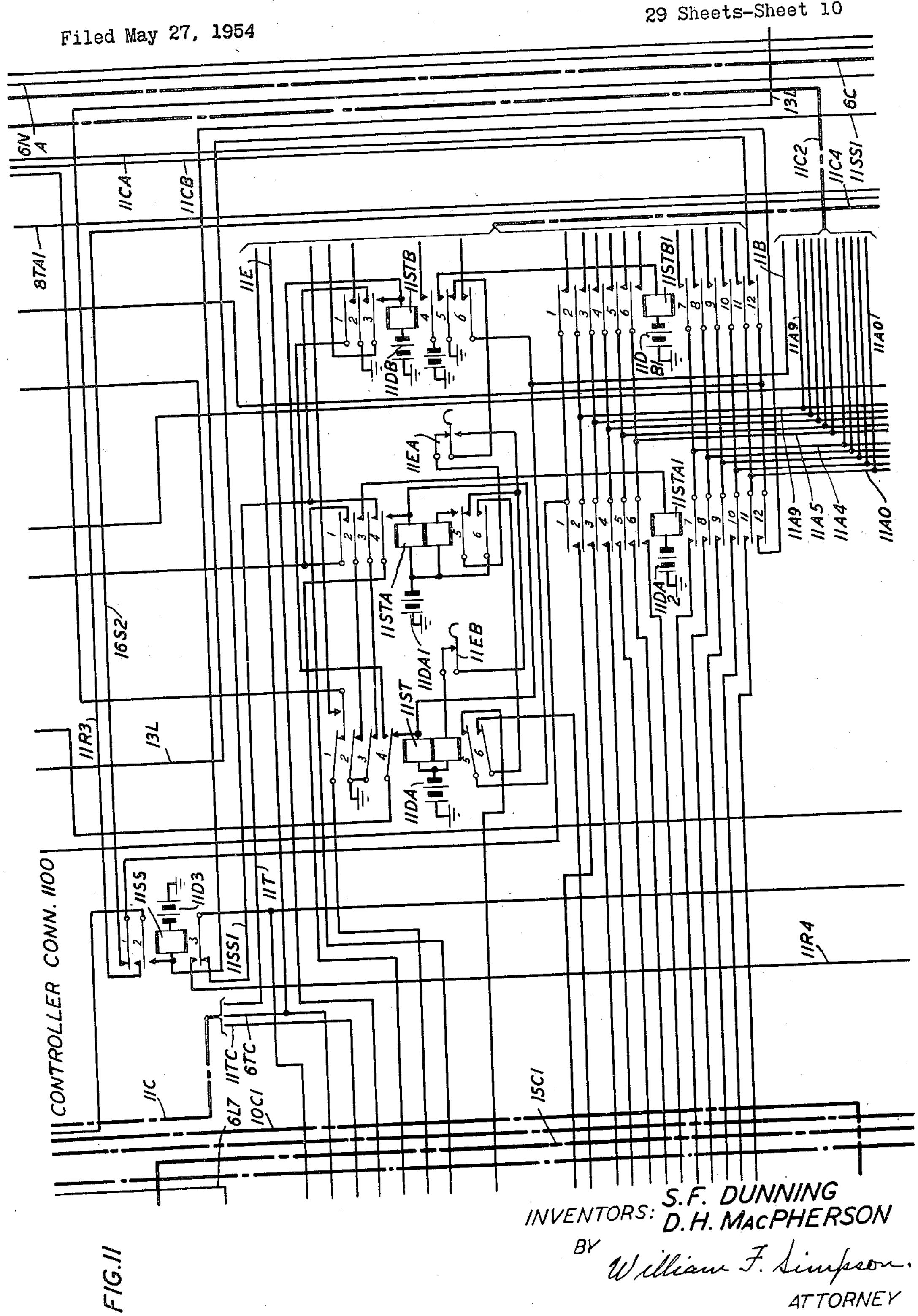
Figure 30:
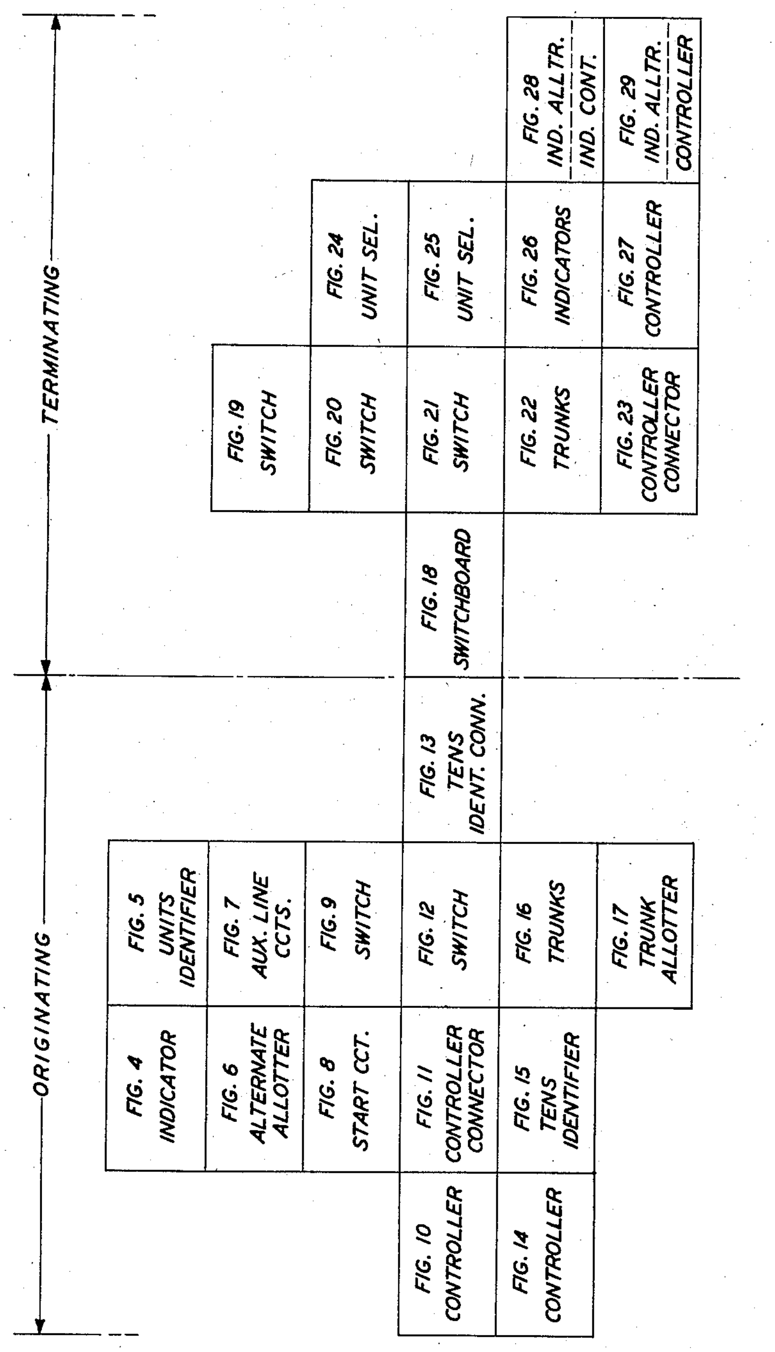

The above-noted and other objects and features will become apparent to those skilled in the art upon consideration of the following detailed description with reference to the drawings wherein:

Figs. 1 and 2, when arranged in accordance with Fig. 3, are a functional or block diagram of an answering service equipment illustrative of one embodiment of the present invention; and Figs. 4 through 29, when arranged in accordance with Fig. 30, are detailed circuit representations of the answering service equipment of this illustrative embodiment.

Referring to the functional block diagram of Figs. 1 and 2 when arranged in accordance with Fig. 3, Fig. 1 is a block diagram of the originating or central office end and Fig. 2 is a block diagram of the terminating or answer bureau end of the answering service equipment in accordance with an exemplary embodiment of this invention. Although in the exemplary embodiment of the invention described herein in detail, facilities are provided for serving one hundred subscribers' lines desiring answering or secretarial service, any number of subscribers' lines either more or less than one hundred may be so provided with answering service. Moreover although four trunks are provided for each one hundred lines, a greater or lesser number of trunks may be provided for each group of subscribers' lines. When desired, the subscribers' lines desiring answering bureau service may be arranged in groups and a specified number of trunks provided for each group and a corresponding number of jacks, lamps, positions, etc. provided at the answering bureau.

The central office switching equipment as well as subscribers' lines per se are not shown in detail herein. The central office equipment as well as the subscribers' lines, line circuits and other related equipment are represented by the rectangle 700. The rectangle 700 may represent any type of switching or interconnecting system and apparatus employed for establishing communication paths between telephone subscribers. The switching equipment may comprise manually operated switching equipment including one or more manually operable switchboards where operators are employed to establish and supervise interconnections between subscribers' line circuits. Switching equipment 700 may also include any suitable type of automatic or dial controlled switching equipment including step-by-step switching equipment and systems, panel switching equipment and systems, crossbar switching systems, community dial switching systems and other types of switching devices. Switching equipment 700 also represents the various subscribers' lines which are terminated at the switching centers. The subscribers' line equipment and the switching equipment of the central exchange represented by rectangle 700 operate in a normal manner in establishing communication paths between calling subscribers and called subscribers' lines.

Each of the subscribers' lines desiring answering or secretarial service is provided with one of the auxiliary line circuits 7AUX00–99 which is bridged across or interconnected by means of the auxiliary lines 7P00–99 with the lines of the subscribers requesting answering service. Each of the subscribers requesting answering service is assigned a two-digit number for identifying such lines in the answering service equipment. The designation of the auxiliary line connected to a subscriber's line identified by the No. 91 is, for example, 7P91 in the drawings. The first digit of the designation 7P91 identifies the figure of the detailed circuit drawing, Figs. 4 through 29, in which the component appears. Thus, apparatus 700 and 7P91, for example, appear in Fig. 7 of the detailed circuit drawings.

The circuits 7AUX00–99 detect ringing tone and provide a connection to a units identifier 500 and a start circuit 800. The units identifier 500 functions to identify the units digit of the two-digit number designating a called subscriber. The units digit also designates the horizontal row of a crossbar switch, not shown in Fig. 1, in a trunk connector 900 and also in a tens identifier connector 1300 in which the auxiliary lines 7P00–99 appear. The determination of the units digit is then employed to operate the select magnets of the crossbar switches in the trunk connectors 900 and the tens identifier connector 1300.

When the called subscriber having the designation 91 is rung the No. 1 select magnet will be operated in both the trunk connector 900 and the tens identifier connector 1300. The hold magnets of the tens identifier connector 1300 are simultaneously operated to connect all of the lines having a units digit of 1 to a tens indentifier 1500. Thus, the lines 01, 11, 21, 31, 41, 51, 61, 71, 81 and 91 are all extended to the tens identifier 1500. If line 91 is the only line being rung at this time the tens identifier 1500 will identify the tens digit as a 9. This information together with the units identification is employed to control one of the controllers 1000 or 1400 through the controller connector 1100. These controllers 1000 and 1400 are alternatively connected by means of the controller connector 1100 in response to the operation of start circuit 800, to the units identifier 500 and function to the tens identifier 1500. The controllers 1000 and 1400 transmit pulses back through the controller connector 1100, over conductor 16S2 and over the ring 16TR1 of trunk 16T1 to the answering bureau.

The start circuit 800 also operates a trunk allotter 1700 through the controller connector 1100 and the alternate allotter 600 to allot one of the four trunks 16T1–4 for answering the call. The tens identification together with an indication of the trunk allotment is provided from the controllers 1000 and 1400 to the connector 900. This information together with the previous operation of the select magnet of the crossbar switches in the trunk connector 900 establishes a connection from the called line designated 91 to the allotted trunk.

It is to be noted that the signals identifying the number of the called line and its location on the crossbar switches are transmited over the ring conductor 16TR1 of trunk 16T1 independently of which of the trunks is allotted by the trunk allotter 1700 and also independently of whether or not the trunk 16T1 is busy or employed in answering another call.

The two controllers 1000 and 1400, which are alternatively operated in this manner by the controller connector 1100, function to pulse a coded representation of the identified line number, one digit at a time, through connector 1100, lead 16S2 and the ring lead 16TR1 of the trunk 16T1 through cable 16C, to the answering bureau or terminating end shown diagrammatically in Fig. 2. The coded representation of each digit is a combination of three pulses at a pulse rate of 20 pulses per second; a plus and a minus 130-volt pulse, and a blank pulse as follows:

| Digit | First Pulse | Second Pulse | Third Pulse |
|---|---|---|---|
| 0 | − | | |
| 1 | − | − | + |
| 2 | − | − | − |
| 3 | − | + | − |
| 4 | − | + | + |
| 5 | + | | |
| 6 | + | − | + |
| 7 | + | − | − |
| 8 | + | + | − |
| 9 | + | + | + |

Before the digits are pulsed to the terminating end, controller 1000, which is the allotted controller in the illustrative example described herein, provides a potential through the connector 1100, lead 16S2, the ring lead 16TR1 of the trunk 16T1 through cable 16C, trunk 22T1, and a controller connector 2300 to one of the controllers 2700 and 2900. The controller connector 2300 allots one of the controllers 2700 and 2900 in the same manner as described above in reference to the controller connector 1100 and the controllers 1000 and 1400. The potential upon the ring lead 16TR1 indicates to the controller 2700, which is the allotted controller in the terminating end for the illustrative example described herein, that the originating end is ready to pulse the identity of a called subscriber. If the allotted controller 2700 is ready to register the pulsed digits identifying the called subscriber, a ground potential is placed upon the ring lead 16TR1. When the allotted controller 2700 is ready to register the pulsed digits, the allotted controller 1000 pulses the units digit of the called subscriber's identity number thereto over the ring lead 16TR1.

During the registration of the units digit the controller 2700 also operates one of the indicator allotters 2800 or 2901 which are selected by an indicator control 2801, and readies indicator connectors 2003–4 and 2101–2 and the trunk connector 1900T. With allotter 2800 being the selected allotter for example, it allots one of four indicator circuits 26IND1–4, which correspond respectively with the connectors 2101–2 and 2003–4, for a predetermined interval if the attendant does not answer. In the illustrative example described herein, circuit 26IND1, for example, is allotted by allotter 2800, so that connector 2101 will be utilized. When connector 2101 releases after the attendant answers, as is hereinafter described, it operates the indicator control 2801 to select the allotter 2901 for the next call. The indicator connectors 2003–4 and 2101–2 provide selective operating paths for one hundred indicating lamps, not shown in Fig. 2, in the switchboard 1800, and the trunk connector 1900T selectively provides connections for the trunks 22T1–4, which are the terminating trunks corresponding to trunks 16T1–4, to one hundred jacks, also not shown in Fig. 2, in the switchboard 1800. The one hundred lamps provide an indication to the attendant of the called subscriber and the one hundred packs which are associated respectively therewith connect to talking paths so that the attendant can converse with the calling subscriber.

When the allotted controller 2700 has completed the registration of the units digit, it opens the path to ring lead 16TR1 and signals back over ring lead 16TR2 that it has registered the units digit. Responsive to the indication that the units digit has been registered the controller 1000 connects a potential over the tip lead of the allotted trunk 16T1–4 to its associated trunk 22T1–4 in the terminating end to ready it for connection through a trunk connector 1900T to a switchboard 1800 as is hereinafter described.

At the completion of the pulsing of the units digit, the allotted controller 1000 in the originating end also operates, as briefly described above, the trunk connector 900 to connect the called auxiliary line 7P91 to the allotted trunk, for example trunk 16T1; removes the potential from ring lead 16TR1; and provides an operating potential over the ring lead 16TR2 of the second trunk 16T2 to the allotted terminating controller 2700. After pulsing the units digit the controller 1000 also releases the auxiliary circuit 7AUX91 and the identifier 500.

When the allotted originating controller 1000 receives an indication over ring lead 16TR2, as described above, that the allotted terminating controller 2700 has registered the units digit, it also once again provides a potential over ring lead 16TR1 to check the readiness of the allotted controller 2700. If the allotted controller 2700 is ready a ground is placed on ring lead 16TR1 as an indication thereof to the controller 1000 which pulses the tens digit thereto.

At the completion of pulsing the tens digit, the allotted originating controller 1000 removes the potential from the ring lead 16TR2, disconnects or releases itself, the controller connector 1100, the identifier 1500, connector 1300 and initiates the release of the start circuit 800. After a predetermined interval the circuit 800 releases and allows the originating end to service another call.

After pulsing the tens digit the controller 1000 also starts a timing operation by the allotter 1700 which releases the connector 900 and the trunk 16T1 after a predetermined interval if the attendant does not answer.

When the tens digit is registered in the allotted controller 2700 and the potential has been removed from the ring lead 16TR2, it operates the allotted indicator circuit 26IND1 and the allotted indicator connector 2101 to energize the subscriber's lamp which corresponds to the called subscriber, and operates connector 2300 to select controller 2900 for the next call. The allotted controller 2700 also operates the trunk connector 1900T to provide a talking connection between the respective answer jack and the trunk 22T1 which is associated with the allotted trunk 16T1.

When the attendant answers, the connection through trunk 16T1 and trunk 22T1 is locked in; the ringing current on line 7P91 is tripped; the connector 2101 and circuit 26IND1 are released; and the timing of allotter 1700 and allotter 2800 is halted. When the conversation between the calling subscriber and the attendant is terminated, the attendant disconnects from the switchboard 1800 and releases the trunk 16T1, the allotter 1700, and the trunk connector 900. When trunk 16T1 releases, it in turn releases the trunk 22T1 which in turn releases the trunk connector 1900T.

The identification pulses of the called line do not interfere with the talking path availability or trunk allotment. Though only four trunks 16T1–4 are provided in the illustrative embodiment of the present invention described herein, a larger number than four called lines can be indicated at the answering bureau end.

Referring now to the detail circuit drawings, Figs. 4 through 29 which are arranged in accordance with Fig. 30, one hundred auxiliary lines 7P00 through 7P99 are connected to the apparatus 700. As described above, the first digit of the designation of each of the circuit components in Figs. 4 through 29 is an indication of the figure in which the component appears. The remaining dgits or letters identify the component in the figure, as for example, the apparatus 700 appears in Fig. 7. The apparatus 700 represents all the circuits and equipment, well known in the art, which are utilized or relate to the provision of ringing current on a subscriber's line. Each subscriber's line, not shown in apparatus 700, which is to be served by the telephone answering service of the present invention, is connected to one of the auxiliary lines 7P00–99.

When ringing current is applied by apparatus 700 to one of the lines 7P00–99, an associated one of the auxiliary line circuits 7AUX00–99 is operated. When ringing current is applied to auxiliary line 7P91, for example, the gas tube 7GT91 in the auxiliary line circuit 7AUX91 is ionized over a path from the start anode of tube 7GT91, which is connected to the ring lead 7R91 of line 7P91, to the cathode of tube 7GT91, normal armature 9 of lockout relay 5L01 in the units identifier 500, normal armature 1 of the ring-up relay 7RU91 in the auxiliary line circuit 7AUX91, the winding of relay 7RU91, resistor 7RA91, and negative battery 7G91 to ground. The ionizer potential of tube 7GT91 is approximately 84 volts so that the sum of the peak voltage of the alternating-current component and the direct-current component of the ringing current must be at least plus 84 volts. The ringing current supplied by apparatus 700 is generally 20 cycles, 84–88 volts root mean square, with the direct-current component being approximately 37–40 volts. The starting anode of tube 7GT91 is connected through resistor 7GTA91 to the main anode of tube 7GT91 to which the ionization is transferred. When tube 7GT91 ionizes, a conductive path is provided as described above through the winding of relay 7RU91 causing it to operate. In this manner when a subscriber served by the answering service equipment of the present invention is called, the ringing current ionizes one of the gas tubes 7GT00–99 and operates the associated ring-up relay 7RU00–99 in the operated one of the auxiliary line circuits 7AUX00–99.

The relays 7RU00–99 are shunted by the series connection of two varistors 7RUA00–99 and 7RUB00–99, respectively, which are poled to allow the relays 7RU00–99 to operate during the positive half cycle of the ringing current.

Some of the gas tubes 7GT00–99 may be reversed with the cathodes instead of the starting anodes connected to the associated ones of ring leads 7R00–99 to distinguish between subscribers on a party line that are rung with negative instead of positive biasing voltages or to distinguish between individual lines in a four-party line office. The auxiliary line 7P90, for example, is rung with a negative biasing potential and the tube 7GT90 is reversed. Ringing current may also be provided over a tip lead instead of the ring lead so that some of the tubes 7GT00–99 may be connected to the tip lead. The auxiliary line 7P09, for example, is supplied with ringing current over the lead 7T09 and tube 7GT09 is connected thereto instead of to ring lead 7R09. When ringing current is supplied over the tip lead, the leads 7T09 and 7R09 may be reversed in the central office equipment 700 so that the connection from tube 7GT09 appears the same.

When relay 7RU91 operates, it opens its operating path through armature 1 and locks to ground through its operated armature 2 so as to remain operated when the positive half cycle of ringing current terminates. When the original operating path of relay 7RU91 is broken, the current path for tube 7GT91 is also broken causing tube 7GT91 to deionize. By operating relay 7RU91 through its own back contact, in this manner, it is disconnected from the subscriber's line 7P91 as soon as it operates to prevent pretripping of the ringing current due to the additional current drain. The varistors 7RUA91 and 7RUB91 allow relay 7RU91 to operate quickly due to their open circuit effect to the positive half cycle of ringing current, but they cause relay 7RU91 to be slow releasing so that it can lock up through its back contact before it can release. As is hereinafter described, the ringing current is tripped when the attendant in the answering bureau answers the call. The operation of relay 7RU91 connects ground through its operated armature 3, normal armature 11 of relay 5LO1, the winding of the units relay 5U1, the serially-connected break contacts of normal armatures 1 of relays 5U2–9, to negative battery 5H10 causing relay 5U1 to operate. The operation of relay 5U1 indicates that the units digit assigned to the called subscriber is 1.

There are ten relays 5U0–9 and ten relays 5LO0–9 in the units identifier 500 which identifies the units digit of the called subscriber's identifying number. In the illustrative example ringing current is provided to the called subscriber's line having an identifying number 91 so that the auxiliary line circuit 7AUX91 is operated. The operation of the auxiliary line circuit 7AUX91 due to the ringing current on line 7P91 causes, as described above, the operation of relay 5U1 in identifier 500 to identify the units digit. The operation of any of the ten relays 7RU (01, 11, 21, 31, 41, 51, 61, 71, 81 or 91) would cause the operation of relay 5U1 as the operated armature 3 of each of these relays is connected to the winding of relay 5U1.

The operation of relay 7RU91 in the auxiliary line circuit 7AUX91 also causes the operation of the off-normal relay 8C in the start circuit 800 by connecting ground from the operated armature 4 of relay 7RU91 to lead 7C, normal armature 6 of relay 8TAC, the winding of relay 8C to negative battery 8J. The operation of relay 8C initiates the operation of a timing circuit 8T as is hereinafter described. The operation of any of the relays 7RU00–99 initiates the operation of the timing circuit 8T.

The operation of relay 7RU91 also initiates the operation of a ringing brush monitor circuit in start circuit 800 by connecting ground through its operated armature 4, lead 7C, normal armature 1 of the ringing monitor relay 8RM, the winding of relay 8RMA, to negative battery 8L1 causing relay 8RMA to operate. One relay 8RMA is provided for each ringing machine that is utilized to provide ringing tone upon one of the lines 7P00–99. The function of relay 8RMA together with relay 8RM, as is hereinafter described, is to monitor the ringing machine 8MA, which is part of apparatus 700 described above, but which is also shown diagrammatically in Fig. 8, to assure that once one of the ring-up relays 7RU0–99 has responded it will not respond more than once per ringing cycle. The operation of relay 8RMA closes operating paths for three brush relays 8BR1–3, which are provided respectively for the three ringing machine brushes, not shown, in machine 8MA. Only one brush at a time is connected to an alternating-current potential source, also not shown, in the ringing machine 8MA, so that only one brush relay 8BR1–3 is operated at any given time. Armatures 1, 2 and 3 of relay 8RMA, when operated, connect the ringing ground lead 8RG from the ringing machine 8MA through the varistor 8VA to the windings of relays 8BR1–3. The windings of relays 8BR1–3 are also connected through capacitors 8C1–3, respectively, to ringing machine 8MA. When ringing tone is supplied by the ringing machine 8MA through one of the capacitors 8C1–3, the associated relay 8BR1–3 is operated. The operating path for relay 8BR3, for example, is from ground on lead 8RG, through varistor 8VA, the operated armature 3 of relay 8RMA, the winding of relay 8BR3, capacitor 8C3, to the potential source, not shown, in machine 8MA. The windings of the relays 8BR1–3 are shunted by the varistors 8VA1–3, respectively, which are poled to short-circuit the windings of relays 8BR1–3 when the positive half cycle of ringing tone is applied thereto.

When the brush relay 8BR3 is operated, it locks to ground on lead 8RG through its operated armature 2, and connects ground through its operated armature 1 to the winding of relay 8RM which is also connected to negative battery 8L2. Relay 8RM accordingly operates. The operation of any one of the three relays 8BR1–3, in this manner, causes the operation of the ringing monitor relay 8RM. The operation of relay 8RM causes the release of relay 8RMA by opening its operating path, described above, at armature 1 of relay 8RM. With relay 8RM operated and relay 8RMA released, any operated relay 5L0–9 associated with the same ringing machine 8MA, as is hereinafter described, will be locked operated. At the end of the two-second ringing interval the brush relay 8BR3 releases and in turn causes the release of relay 8RM by removing the ground connection through armature 1 of relay 8BR3. When relay 8BR releases, it in turn, also as is hereinafter described, causes the release of the operated one of relays 5L0–9.

In the illustrative example, as described above, when ringing tone is applied to auxiliary line 7P91, relay 5U1 in the units identifier 500 is operated to identify the units digit. When relay 5U1 operates, it locks to battery 5UB1 through the front contact and its operated armature 1. The operation of relay 5U1 also causes the operation of a corresponding select magnet 13SM1 in a tens identifier connector 1300. The connector 1300 comprises ten select magnets 13SM0–9 which are selectively associated with the units relays 5U0–9. The operating path for the select magnet 13SM1 is from the potential source 13F1 through the winding of select magnet 13SM1, lead 13D1 through cable 13C2, the front contact and the now operated armature 3 of relay 5U1, the back contact and the normal armature 3 of relay 5U0, lead 5E in cable 5C, the contacts of normal armatures 3 and 4 in parallel of the hold relay 8H in the start circuit 800, the normal armature 1 of relay 8TAC, the back contact and operated armature 1 of the start relay 11ST in the controller connector 1100, the normal armature 4 of the disconnect relay 10DC2 in the controller 1000, and the normal armature 1 of relay 10Y to ground. The operation of relay 11ST is hereinafter described. The select magnets 13SM0–9 are connected respectively to the front contacts of armatures 3 of the units relays 5U0–9. The armatures 3 of relays 5U0–9 are serially connected so that the operation of an armature 3 of one of the relays 5U0–9 connects the respective select magnets 13SM0–9 to the operating path, described above.

The operation of relay 5U1 also causes the operation of select magnet 9SM1 in the trunk connector 900, because the lead 13D1 which connects armature 3 of relay 5U1 to relay 13SM1 is also connected through lead 9D1 and the winding of relay 9SM1 to battery 9V1. There are ten select magnets 9SM0–9 in the trunk connector 900 which are associated respectively in this manner with the units relays 5U0–9. The trunk connector 900 comprises two crossbar switches; switch 900S shown in Fig. 9 and switch 1200S in Fig. 12. The selector magnets 9SM0–9 select the horizontal rows of contacts of the switch 900S. The contacts of the switch 1200S which include the contacts in the two vertical arrays of contacts in the connector 1300, are selected by the select magnets 13SM0–9. The trunk connector 900 functions, as is hereinafter described, to selectively connect the auxiliary lines 7P00–99 to the four trunks 27T1–4.

The operation of relay 5U1, in addition to operating its corresponding select magnets 13SM1 and 9SM1, operates a corresponding one of the ten lockout relays 5LO0–9. The windings of relays 5LO0–9 are connected respectively to the negative potential sources 5H0–9 and to the front contacts of armatures 2 of relays 5U0–9. The armatures 2 of relays 5U0–9 are serially connected to lead 5F which is connected, as is hereinafter described, to ground in the start circuit 800. When relay 5U1 operates therefore, ground potential upon lead 5F connected through the front contact of armature 2 of relay 5U1 to the winding of relay 5LO1, causing it to operate. Lead 5F, which is connected to the serially connected armatures 2 of relays 5U0–9, is also connected through cable 5C, the back contact and the normal armature 8 of relay 8TAB, and normal armature 12 of relay 8TAC to ground.

The operation of relay 5U1 also operates a corresponding units indicator relay 5UI1 which is one of ten indicator relays 4UI0–9 in the indicator circuit 400. The indicator circuit 400, which is not shown in the box diagram of the originating end in Fig. 1, provides an indication of the progress of a call. The operating path for relay 4UI1 is from negative battery 4UB1, the winding of relay 4UI1, varistor 4UIV1, and the operated armature 4 of relay 5U1 to lead 5TL. Ground is applied to lead 5TL, as is hereinafter described, from the start circuit 800. The relays 4UI0 and 4UI2–9 are connected, similarly, through varistors 4UIV0–9, respectively, to the contacts of armatures 4 of relays 5U0–9. The operation of one of the relays 5U0–9 therefore connects ground potential upon lead 5TL through its armature 4 to the corresponding indicator relays 4UI0–9 in the indicating circuit 400. The lead 5TL is connected through cable 5C, the normal armature 2 of relay 8CT, and the break contact of normal armature 2 of relay 8TAD to ground.

The operation of the indicator relay 4UI1 extends the ground potential, which was provided as described above thereto, through its upper contact to the indicator or lamp 4UIL1. The lamp 4UIL1, which is also connected to the negative potential source 4CB1, is in this manner energized to provide a visual indication of the operation of the units identifier 500.

The effects of the operation of relay 5U1 are briefly summarized as follows:

(1) Operates select magnet 13SM1;
(2) Operates select magnet 9SM1;
(3) Operates lockout relay 5LO1; and
(4) Operates indicator relay 4UI1.

When relay 5LO1 operates, it opens the original operating path for relay 7RU91 which, as described above, was operated when ringing tone was applied to line 7P91. Relay 7RU91 remains operated by the locking path through its armature 2. When relay 5LO1 operates, it also locks to ground over a path through its operated armature 10, lead 5G, through cable 5C, the normal armature 4 of relay 8RMA, and the operated armature 2 of relay 8RM. With ring monitor relay 8RM operated and ring monitor relay 8RMA normal, the operated relay 5LO1 is in this manner locked operated. As long as relay 5LO1 is operated, the auxiliary circuits having a units digit of 1 cannot be operated as the operating paths for the gas tubes and ring-up relays therein are opened at the operated armatures of relay 5LO1. At the end of the ringing interval, as described above, the operated one of the brush relays 8BR1–3 releases and, in turn, at its armature 1 causes the release of relay 8RM. When relay 8RM releases, it releases at its armature 2 the operated one of the relays 5LO0–9 which, in the illustrative example described herein, is the relay 5LO1.

When the select magnet 13SM1 described above operates, it extends its ground connection through its operated armature to the windings of the hold magnets 13H8 and 13H9. The hold magnets 13H8 and 13H9, which are also connected respectively to the negative batteries 13L8 and 13L9, therefore operate. The tens identifier connector 1300, which comprises essentially two crossbar vertical sets of contacts 13V1 and 13V2 which are part of the crossbar switch 1200S, shown also in Fig. 12, receives information from the auxiliary line circuits 7AUX00–99 and supplies this information to the tens identifier 1500. The vertical set of contacts 13V1 comprises fifty crosspoints or armatures 13B0–49 and the vertical set of contacts 13V2 comprises the fifty crosspoints or armatures 13B50–99. The armatures 13B0–99 are connected respectively through the leads 13S0–99 and cable 13C to the windings of the ring-up relays 7RU00–99 in the auxiliary line circuits 7AUX00–99. When the select magnet 13SM1 is operated, the ten armatures in the sets 13V1 and 13V2 having a units designation of 1 are operated to provide connections from the ten associated auxiliary line circuits to the leads 13A0–9. In the illustrative example, described above, the ring-up relay 7RU91 is operated. When the ring-up relay 7RU91 is operated, the potential upon lead 13S91 becomes substantially lower due to the voltage drop across resistor 7RA91. The potential provided by the nine normal auxiliary line circuits having a units identification of 1 is relatively higher than that upon lead 13S91. The ten leads 13A0–9 in the tens identifier connector 1300 are connected through cable 13C1 to the tens identifier 1500 wherein they are connected respectively to the windings of the identifier relays 15T0–9. The windings of relays 15T0–9 are also connected respectively to the negative potential sources 15B0–9. The potential provided by the sources 15B0–9 is exactly the same as the potential from the sources 7G00–99 in the auxiliary line circuits 7AUX00–99. The nine normal auxiliary line circuits having a units indication of 1 that are connected by the connector 1300 to the nine relays 15T0–8 do not perform an operative function since the potentials supplied thereby are canceled by the potentials supplied by batteries 15B0–8. The operated auxiliary line circuit 7AUX91, however, provides a substantially lower potential due to the voltage drop across resistor 7RA91 to allow the relay 15T9 in the tens identifier 1500 to operate. The operating path for the relay 15T9 is from ground on armature 2 of relay 7RU91, the winding of relay 7RU91, lead 13SN91 through cable 13C, the operated armature 13B91, lead 13A9 through cable 13C1 and the winding of relay 15T9 to the negative potential source 15B9.

If only one of the auxiliary line circuits 7AUX00–99 was operated at any given time, all of the select magnets 13SM0–9 could be simultaneously operated with the similar result being achieved of the identification of the tens digit by the tens identifier 1500. Only one of the ten potential sources 15B0–9 would be effective to energize its associated one of the ten relays 15T0–9. When, however, two or more of the auxiliary line circuits 7AUX00–99 are substantially simultaneously energized, it is necessary to restrict the identification to only one of the energized auxiliary line circuits 7AUX00–99. The select magnets 13SM0–9 are utilized to select ten of the one hundred line circuits 7AUX00–99 in accordance with the identified units digit. If, for example, the auxiliary line circuit 7AUX92 is energized soon after the energization of the auxiliary line circuit 7AUX91, relay 5U2 operates as well as relay 5U1. The operation of relay 5U1 however breaks the operating path for the select magnets 13SM2–9 through its armature 12 so that only the select magnet 13SM1 operates. The energized auxiliary line circuit having the lowest units digit assigned thereto is effective to provide a connection through the connector 1300. If the auxiliary line circuit 7AUX91 was energized soon after the energization of auxiliary line circuit 7AUX92, relay 5U1 would not operate as the operating path for relay 5U1 passes through the normal contacts of armatures 1 of relays 5U2–9. If any one of the relays 5U2–9 is operated, relay 5U1 does not operate. In this manner the first one of auxiliary line circuits 7TUX00–99 that is energized is effective to provide an indication through connector 1300; the associated one of units relays 5U0–9 does not operate if the auxiliary line circuit that is later energized has a smaller units indication, and the associated selecting magnet operating path is broken if the units indication is larger.

When only line 7P91 is being called, the ringing current which is applied every six seconds causes the units relay 5U1 to reoperate during each cycle and reidentify the called subscriber. When however, other calls are waiting to be identified, all calls will be identified once before any are repeated.

If lines 7P91, 7P92 and 7P93 are rung simultaneously, all three units relays 5U1, 5U2 and 5U3 will be simultaneously operated. Due to the preferential connections, however, described above, only the select magnet 13S1 will operate and the line 7P91 will be served. When relay 5U1 is released as is hereinafter described, after the units digit is pulsed to the terminating end, and the start circuit 800 is thereafter released, relay 5U2 is effective as was relay 5U1 to ready the connector 1300 and the connector 900. Relay 5U1 cannot reoperate until all the higher numbered units relays have been released. If ringing tone is reapplied to line 7P91 while some of the higher number units relays are still operated, relay 5U1 waits until they are released so that the connection through to battery 5H10 is available again. All calls are therefore indicated once before any indications are repeated.

The operation of the hold magnets 13H8 and 13H9 described above in the connector 1300 also extends the ground connection applied thereto from the operated armature of relay 13SM1, to lead 13L and the normal armature 5 of relay 8HA in start circuit 800, to the windings of the relay 8H which are also connected respectively to the potential sources 8DA and 8DB. The operation of relay 8H, in turn, causes the operation of relay 8HA by connecting ground thereto through the operated armatures 2 and 6 of relay 8H. The operation of relay 8HA, in turn, causes the operation of relay 11STA or 11STB dependent upon whether relay 11ST is operated or normal. When relay 11ST in the controller connector 1100 is in its operated condition, ground is connected from the operated armature 3 of relay 8HA, through the operated armature 4 and the front contact associated therewith of relay 11ST to the upper winding of relay 11STA which is also connected to negative battery 11DA1 so that relay 11STA is operated. The winding of relay 11STB, which is connected to the negative battery 11DB, is also connected to the back contact associated with armature 4 of relay 11ST. When relay 11ST is in its operated condition therefore, the ground potential provided upon the operation of relay 8HA in the start circuit 800 is connected to the winding of relay 11STA, and when relay 11ST is normal it is connected to the winding of relay 11STB. Relay 11ST is operated from its lower winding through the maual switch 11EB, armature 5 of relay 11STA, the upper contact of switch 11EA, and break contact and armature 5 of relay 11STB to ground. The selective operation of the relays 11STA and 11STB determines which one of the two identical controllers 1000 or 1400 is to be utilized. The operation of relay 11STA selects, as is hereinafter described, the controller 1000 and the operation of relay 11STB selects the controller 1400.

The manual switches 11EA and 11EB are utilized to predetermined the selection of the controllers 1000 and 1400. When switch 11EA is operated, ground is connected from armature 5 of relay 11STB through the operated armature of switch 11EA, the normal armature of switch 11EB and the lower winding of relay 11ST to negative battery 11DA, causing relay 11ST to operate. Relay 11ST will be maintained operated over this operative path and the operation of relay 8HA in the start circuit 800 will always cause the operation of relay 11STA to select the controller 1000. Relay 11STB will not be operated and controller 1400 will not be utilized. If the controller 1400 is to be selected and the controller 1000 not utilized, switch 11EB is operated and switch 11EA remains normal. The operation of switch 11EB maintains the relay 11ST normal so that the ground potential provided upon the operation of relay 11HA is connected through the normal armature 4 of relay 11ST to the winding of relay 11STB causing it to operate and select the controller 1400.

When relay 11STA is operated, it opens at its armature 5 the original operating path for relay 11ST. Relay 11ST remains operated through its upper winding and armature 4 which is connected to ground at armature 3 of relay 8HA. The operation of relay 11STA performs, as is hereinafter described, the following functions:

(1) Operates relay 11STA1 in controller connector 1100;
(2) Operates relay 17T in trunk allotter 1700;
(3) Operates relay 10P in controller 1000; and
(4) Releases relay 10PG in controller 1000.

When relay 11STA operates, it causes the operation of the relay 11STA1. The winding of relay 11STA1, is connected to ground through the operated armature 2 of relay 11STA and the operated armature 2 of relay 11ST and it is also connected to the negative battery 11DA2.

The operation of relay 11STA also initiates the operation of the trunk allotter 1700. Ground from the operated armature 3 of relay 11ST is connected through the operated armature 3 of relay 11STA, lead 11T through cable 11C, the normal armature 2 of relay 6AA1 in the alternate allotter 600, lead 11T1 through cable 6C, to the winding of relay 17T in the trunk allotter 1700. The winding of relay 17T, being also connected to the battery 17C1, is accordingly operated. The trunk allotter 1700, the operation of which is initiated upon the operation of relay 17T, provides for the seizure, as is hereinafter described, of an idle one of four trunks 16T1–4.

Assuming that all four trunks 16T1–4 are idle and relay 17TA0 in the trunk allotter 1700 is operated, the operation of relay 17T causes relay 17TA1 to operate. When the trunk allotter 1700 is normal with none of the four trunks 16T1–4 allotted, one of the relays 17TA0–3 is in an operated condition. The operation of relay 17T causes the next higher numbered one of relays 17TA1–4 to operate, which is relay 17TA1 when relay 17TA0 is operated. The lower winding of relay 17TA0 is connected from battery 17TC0 through resistor 17R, the serially connected normal armatures 7 of relays 17TA4–1, and through the normal armature 1 and back contact of relay 17TC to ground. When relay 17T operates, it connects ground through its operated armature 3, the operated armature 2 of relay 17TA0, the upper winding of relay 17TA0, the normal armature 4 of relay 17TB1 to the lower winding of relay 17TA1 which is also connected to battery 17TC1. Relay 17TA0 remains operated in series with relay 17TA1 though its original operating path through armature 7 of relay 17TA1 is opened.

If one of the trunks 16T1–4 is in a busy condition, the associated one of the trunk busy relays 17TB1–4 will be operated, as is hereinafter described, to prevent the operation of the associated one of relays 17TA1–4, and to shift the operating connection to the next one of relays 17TA1–4.

When relay 17TA1 operates, it causes the operation of the relay 16TS in trunk 16T1. Ground through the normal armature 1 of relay 17TC, the operated armature 3 of relay 17TA0 is connected through the operated armature 6 of relay 17TA1 to the winding of relay 16TS which is also connected to battery 16D1. The operation of relay 16TS prepares operating paths for the hold magnets 12H0–7 and 9H0–7 in the trunk connector 900 and relays 16C11 and 16C10 in the trunk 16T1. When the units digit is pulsed by the controller 1000, as is hereinafter described, relay 16S1 in the trunk 16T1 is operated to seize trunk 16T1 and a talking path is extended from the auxiliary line 7P91 through trunk 16T1 to the terminating end of the answering bureau equipment of the present invention.

When relay 16TS operates, it in turn operates the relay 4TK1 in the indicator circuit 400 to cause the energization of the lamp 4TKL1 corresponding to the allotted trunk 16T1. The relay 4TK1 is connected to battery 4TKB1 and through varistor 4TKV1, through lead 16TK1, the operated armature 9 of relay 16TS, normal armature 2 of relay 8CT, the break contact of normal armature 2 of relay 8TAD, to ground. When relay 4TK1 operates, it extends the ground through the varistor 4TKV1 through its operated armature to the lamp 4TKL1 which is also connected to the battery 4TKB1. The energization of lamp 4TKL1 indicates the allotting of the trunk 16T1 by the allotter 1700.

If a call is originated as described above and the trunk allotter 1700, due to some trouble condition, cannot allot an available idle trunk, relay 6AA in the alternate allotter 600 is operated. If all five relays 17TA0–4 are normal a trouble condition is indicated since at least one should be operated at any time. When the relays 17TA0–4 are normal, the operation of relay 17T causes the operation of relay 6AA by connecting ground through its operated armature 3, the normal armature 2 of relay 17TA0, the serially connected normal armatures 4 of relays 17TA1–4, lead 17L6 through cable 6C, and the upper winding of relay 6AA to battery 6D3. Relay 6AA in the alternate allotter 600 is also operated if the operation of one of the relays 17TA1–4 fails to cause the operation of the associated one of the relays 16TS in the trunks 16T1–4. For example, if relay 17TA0 was operated and now relay 17TA1 is operated but fails to operate the relay 16TS in trunk 16T1, ground is connected when relay 17TC operates to the winding of relay 6AA. Relay 17TC operates as is hereinafter described after the units digit is pulsed to the terminating end. Ground is connected by the operation of relay 17TC through the normal armature 1 of relay 6ATC, lead 6L7, lead 17L7, the operated armature 1 of relay 17TC, varistor 17VA, lead 17C7 through cable 6C, the lower winding of relay 6AA, and resistor 6U, to battery 6K. If relay 16TS of trunk 16T1 is operated upon the operation of relay 17TA1, relay 6AA does not operate because relay 16TS provides a shunting path through its operated armature 1 and lead 6NA so that relay 6AA does not operate upon the operation of relay 17TC.

In this manner the alternate allotter 600 is operated when the allotter 1700 fails to allot one of the trunks 16T1–4. If all four trunks 16T1–4 are busy, however, the slow operate relay 6AA is also shunted when relay 17TC operates and fails to operate by the ground connection through the normal armature 1 of relay 6ATC, lead 6L7, lead 17L7, the operated armature 1 of relay 17TC, the serially connected normal armatures 2 of relays 17TA4–1, and lead 17L8 through cable 6C.

When relay 6AA operates, it operates relays 8TAD and 6AA1, energizes lamp 6AAL and locks under control of relay 8TAD. The winding of relay 8TAD is connected to ground through the operated armature 1 of relay 6AA1 and the winding of relay 6AA1 is connected to battery 6D6 and to ground through the operated armature 4 of relay 6AA. When relay 8TAD operates, it provides a locking ground through its armature 5 and the operated armature 2 of relay 6AA1 for relay 6AA1, and energized the trouble indicator lamp 8TR and the alarm circuit 601. The lamp 6AAL, which is connected to battery 6AAB and to ground through the operated armature 3 of relay 6AA1, provides an indication that the allotter 600 is being utilized.

When relay 6AA1 operates, it takes the regular trunk allotter 1700 out of service and replaces it with the allotter 600 by transferring at its armatures 4, 3 and 2 the leads 11TC, 6TC and 11T which are connected to connector 1100 through cable 11C from the allotter 1700. Relays 6AT and 6ATC thereafter perform the same functions, some of which are described above and some of which are hereinafter described, as do relays 17T and 17TC in the allotter 1700, and all calls are served by the trunk 16T1. The winding of relay 6AT is connected through the operated armature 2 of relay 6AA1 to lead 11T and accordingly operates from ground through the operated armature 3 of relay 11STA just as relay 11T was operated as described above. When relay 6AA1 operates, it connects the winding of relay 6ATC through its operated armature 3 to lead 6TC and when relay 6AT operates it connects the winding of relay 16S1 through its operated armature 1 and the operated armature 4 of relay 6AA1 to lead 11TC. In this manner allotter 600 is substituted for allotter 1700.

When relay 8TAD operates, it energizes the lamp 8TR to provide an indication of the trouble condition. When the trouble condition has been corrected, key 8AR is operated to cause the release of relay 8TAD. The release of relay 8TAD causes the release of circuit 601, lamp 8TR and relay 6AA which in turn releases relay 6AA1 and extinguishes lamp 6AAL. When relay 6AA1 releases, it returns the connections to allotter 1700 which serves subsequent calls.

The key 6AAK is provided to force the use of allotter 600 for maintenance of allotter 1700 since its operation energizes lamp 6AAL and operates relay 6AA1.

Returning now to the operation of relay 11STA as tabulated above, with no trouble condition relay 11STA also causes the operation of relay 10P to ready the controller 1000. When relay 11STA operates, it connects the battery 11DA1 through its operated armature 6, the operated armature 6 of relay 11ST, resistor 10C, rheostat 10CA, the winding of relay 10P, the normal armature 2 associated with the relay adjusting jack 10PGA, through the upper winding of the polar relay 10PG and the back contact of the normal armature 3 of the adjusting relay 10ST2, to ground. The armature of relay 10P is driven to the left and the armature of relay 10PG is driven to the right upon the closure of the operative path by the operation of relay 11STA. The positioning of the armature of relay 10PG to the right is essentially a releasing operation since the current from the ground connection at the normal armature 3 of relay 10ST2 through the upper winding of relay 10PG is in the non-operate direction. The relays 10P and 10PG together with a capacitor 10PGC form a pulse generator which is readied by the operation of the relay 11STA as described above, and which is initiated in operation upon the operation of the relay 10ST2, as is hereinafter described.

The operation of relay 11STA1, due to the operation of relay 11STA as described above, energizes a lamp 4CAL in the indicating circuit 400. Ground is connected from the break contact of armature 2 of relay 8TAD in the start circuit 800, through the normal armature 2 of relay 8CT, the now operated armature 12 of relay 11STA1, lead 11CA and the varistor 4CAV to the winding of the controller indicator relay 4CA which is also connected to the negative potential source 4CAB. The operation of relay 4CA extends the ground connection upon lead 11CA to the lamp 4CAL which is also connected to the negative potential source 4CALB causing the energization of the lamp 4CAL. The energization of lamp 4CAL indicates that the controller 1000 has been seized by the controller connector 1100. A lamp 4CBL is provided for the controller 1400.

The operation of relay 11STA1 also extends the ring lead 16TR1 of trunk 16T1 through the lower serially connected windings of coils 16TC1 and 16TC2, lead 16S2, the back contact of normal armature 1 of relay 11SS, the operated armature 1 of relay 11STA1, the rheostat 10K, rheostat 10KA, normal contact 2 of the disconnect relay 10DC2 to the winding of the start relay 10ST1 in the controller 1000. The winding of relay 10ST1 is also connected through the break contact of the normal armature 2 of relay 10ST2, briefly described above, through the normal armature 1 of relay 10PU and the back contact associated therewith, the break contact of normal armature 3 of relay 10DC1, to the negative potential source 10D4. The winding of relay 10ST1 is therefore connected to the source 10D4, and to the ring lead 16TR1 of the trunk 16T1 upon the operation of relay 11STA1.

As described above, assuming controller 1000 is utilized, whenever the originating end of the answering service equipment of the present invention has a call waiting to be served, it connects the high resistance battery 10D4 in controller 1000 to the ring lead 16TR1 of the first trunk 16T1. The ring lead 16TR1 is connected through cable 16C to the terminating end of the answering service equipment of the present invention. The ring lead 16TR1 is connected through the serially connected lower windings of coils 22TC1 and 22TC2 of the trunk 22T1, lead 22R0 through cable 22C, the back contact and the normal armature 1 of relay 23T0 in the controller connector 2300, the operated armature 1 and front contact associated therewith of the relay 23CA, lead 23R0, through cable 23C, the windings of the polar relays 27PP and 27PN in the controller 2700, the normal armature 3 of relay 27PC, the break contact of armature 5 of relay 27SM and the back contact and normal armature 1 of the disconnect relay 27DC1, to ground. Relay 10ST1 is therefore connected between ground on armature 1 of relay 27DC1 in the terminating end of the answering service equipment of the present invention and battery 10D4 in the originating end and accordingly operates. Though the battery 10D4 is connected, as described above, to the windings of the relays 27PP and 27PN, the high resistance of rheostats 10KA and 10K prevents the operation of these relays at this time. The rheostats 10KA and 10K and the relays 27PP and 27PN are so adjusted as to prevent the operation of the relays 27PP and 27PN and to allow the operation of the relay 10ST1 when the relay 11STA1 operates. The presence of ground on the ring lead 16TR1 indicates to the controller 1000 in the originating end that the terminating end is ready for the pulsing operation.

The controller 2700 is one of two controllers 2700 and 2900 in the terminating equipment of the present invention which are utilized alternately on successive calls, and which receive the pulses from the originating equipment and pass the pulsed information to indicating circuits 26IND1–4, hereinafter described. Assume that the controller 2700 is being utilized to record the digits from the originating end of the answering service equipment of the present invention for the call on line 7P91.

When relay 10ST1 operates due to the ground connection on lead 16TR1, it extends a connection from the battery 10D4 through the break contact of normal armature 3 of relay 10DC1, the break contact of normal armature 1 of relay 10PU through the operated armature of relay 10ST1 to the upper winding of relay 10ST2. The upper winding of relay 10ST2 is also connected through the right armature of the controller isolating key 10RST, lead 10RS2 through cable 10C1, the normal armature 3 of relay 8TAC to ground. With the upper winding of relay 10ST2 connected between ground and battery 10D4, relay 10ST2 is operated. The operation of relay 10ST2, as described above, initiates the operation of the pulse generator circuit comprising the relays 10P and 10PG and the capacitor 10PGC.

When relay 10ST2 operates, it transfers the ground connection through the back contact of its armature 3 to the front contact thereof, to allow the capacitor 10PGC to charge. The capacitor 10PGC charges through the normal armature 1 of jack 10PGA, the lower windings of relay 10PG, armature 3 of jack 10PGA, resistor 109, the operated armature 6 of relay 11ST, the operated armature 6 of relay 11STA, to the negative battery 11DA1. When ground is removed from the back contact associated with armature 3 of relay 10ST2, the operating path described above for relay 10P is broken since the winding of relay 10P was connected to ground through the normal armature 2 of jack 10PGA, the upper winding of relay 10PG and the back contact and armature 3 of relay 10ST2. The winding of relay 10P is transferred from its connection to ground upon armature 3 of the relay 10ST2 to a connection through armature 2 of jack 10PGA, the upper winding of relay 10PG, armature 3 of jack 10PGA, resistor 10A, the operated armature 6 of relay 11ST, and the operated armature 6 of relay 11STA, to battery 11DA1. The other end of the relay 10P is connected through the rheostat 10BA and the resistor 10B to ground completing the conductive path from the battery 11DA1 to ground. The current reversal through the winding of relay 10P operates its armature to the right or release position. The effect therefor of the operation of armature 3 of relay 10ST2 is to release the relay 10P, positioning its armature to the right, and to commence charging the capacitor 10PGA. The release of the relay 10P, as is hereinafter described, pulses the first code of the units digit identifying the called line to the terminating end. Relay 10PG does not operate at this time due to the differential or cancelling action of the currents through the upper and lower windings thereof while the capacitor 10PGC is charging.

When the capacitor 10PGC is charged, the current in the lower or secondary winding of relay 10PG is reduced and the current in the upper or primary winding becomes effective to operate relay 10PG. When relay 10PG operates, a path is closed from battery 11DA1 through the operated armatures 6 of relays 11STA and 11ST, resistor 10C, rheostat 10CA, the winding of relay 10P, the upper winding of relay 10PG, the operated armature of relay 10PG, and the operated armature 3 of relay 10ST2 to ground, causing a reversal of current through the winding of relay 10P. Relay 10P in this manner operates, moving its armature to the left, to end the identifying pulse, hereinafter described, to the terminating end of the answering service equipment of the present invention. When relay 10PG operates, it also connects the capacitor 10PGC to ground through the armature 1 of jack 10PGA, the lower winding of relay 10PG, the operated armature of relay 10PG and the armature 3 of relay 10ST2 causing the capacitor 10PGC to discharge. When the capacitor 10PGC becomes discharged the current through the secondary or lower winding of relay 10PG reduces to zero and allows relay 10PG to release which thereupon releases relay 10P and repeats the pulsing cycle.

The operation of relay 10ST2 which, as described above, initiated the operation of the pulse generator comprising the relays 10PG and 10P and the capacitor 10PGC, also causes the release of relay 10ST1 and the operation of relay 10W. The path to battery 10D4 from the winding of relay 10ST1 is opened by the operation of armature 2 of relay 10ST2 causing relay 10ST1 to release and the winding of relay 10W is connected to battery 10D7 and through the back contact and armature 1 of relay 10X, the break contact of armature 7 of relay 10Z, the released armature of relay 10PG and the operated armature 3 of relay 10ST2, to ground. When the relays 10P and 10PG are released and relay 10W is operated, the first pulse of the units digit of the identifying number of the called line is transmitted to the terminating end or answering bureau.

The units and tens digits are each pulsed by means of three pulses; a plus potential, a minus potential or an open circuit as shown below:

| Units or Tens Digit | First Pulse | Second Pulse | Third Pulse |
|---|---|---|---|
| 0 | − | ---- | ---- |
| 1 | − | − | + |
| 2 | − | − | − |
| 3 | − | + | − |
| 4 | − | + | + |
| 5 | + | ---- | ---- |
| 6 | + | − | + |
| 7 | + | − | − |
| 8 | + | + | − |
| 9 | + | + | + |

When the pulsing relay 10P releases, the sources 8CC1 and 8CC2 are connected, as is hereinafter described, through paths established by the sequential operation of relays 10W, 10X, 10Y and 10Z, under control of the tens identifier 1500 and the units identifier 500, relay 10DC1 and the relay 10P to the ring lead 16TR1 of the trunk 16T1. The relay 10DC1, also as is hereinafter described, determines whether the units identifier 500 or the tens identifier 1500 is to provide the digit to be pulsed to the conductive path for the potentials supplied from the sources 8CC1 and 8CC2 in the start circuit 800.

In the illustrative embodiment described above ringing tone was applied upon the auxiliary line 7P91. When ringing tone is applied upon line 7P91, the units relay 5U1 in the identifier 500 is operated and the tens relay 15T9 in the identifier 1500 is operated. The potential source 8CC1, which provides a negative potential, is connected for the first pulse, through the protective lamp 8CCL1 to lead 8CC− through cable 10C1, through the back contact of the normal armature 5 of relay 10Z, the operated armature 10 of relay 11STA1, lead 11A1 through cable 11C2, the front contact of the operated armature 5 of relay 5U1, the back contact of normal armature 5 of relay 5U0, lead 11B through cable 11C2, the operated armature 5 of relay 11ST, the back contact of normal armature 8 of relay 10DC1, resistors 10V and 10U, the upper normal armature of jack 10PJ, the released armature of relay 10P, the lower normal armature of jack 10PJ, rheostats 10KA and 10K, the operated armature 1 of relay 11STA1, the normal armature 1 of relay 11SS, lead 16S2, the lower windings of coils 6TC2 and 16TC1 in trunk 16T1, through the ring lead 16TR1, to the terminating end of the answering service equipment of the present invention. In this manner the operation of the relay 5U1 in the units identifier 500 determines whether a plus, minus or open potential is connected to the ring lead 16TR1.

The relays 10W, 10X, 10Y and 10Z determine as is hereinafter described which one of the three pulses is being transmitted and the relay 10PU1, as is also hereinafter described, determines whether it is the units or the tens pulse that is being transmitted.

When the capacitor 10PGC in the pulse generator circuit comprising the relays 10PG and 10P charges, relay 10PG operates as the current through its lower winding ceases to cancel the effect of the current through its upper winding. When relay 10PG operates, it causes, as described above, relay 10P to operate and open the conductive path from the negative source 11CC1 to the ring lead 16TR1 to terminate the first pulse and also causes the operation of relay 10X. Relays 10X, 10Y and 10Z, as is hereinafter described, are operated, in order, as relay 10PG operates and releases to control the connections for the three pulses of a digit indication. When relay 10PG operates for the first time is removes a shunting ground connection from relay 10X allowing it to operate. One side of relay 10X was connected to ground through the operated armature 2 of relay 10W and the operated armature 3 of relay 10ST2, and the other side of the winding of relay 10X was connected through the break contact and armature 1 of relay 10X, the break contact and armature 7 of relay 10Z, the released armature of relay 10PG and the operated armature 3 of relay 10ST2 to ground. When relay 10PG operates, it removes the shunting ground and allows relay 10X to operate serially with relay 10W.

With relay 10PG operated, the capacitor 10PGC discharges. When the capacitor 10PGC is discharged, it allows relay 10PG to release which thereupon causes relay 10P to release and relay 10Y to operate. The operation of relay 10Y and the release of relay 10P indicates the initiation of the second pulse of the units digit to the terminating end. Relay 10Y is operated over a path from negative battery 10D9 through the winding of relay 10Y, the front contact and the operated armature 1 of relay 10X, the back contact of armature 7 of relay 10Z, the normal armature of relay 10PG, the back contact and operated armature 3 of relay 10ST2 to ground. With relay 10P released, either a plus potential, a minus potential or an open will be applied to the ring 27TR1 of the trunk 27T1 to signal the second pulse of the units digit. For the second pulse the lead 8CC− from the start circuit 800 is connected through the back contact and operated armature 5 of relay 10Z, the operated armature 10 of relay 11STA, lead 11A1 through cable 11C2, the front contact and operated armature 5 of relay 5U1, the back contact and normal armature 5 of relay 5U0, lead 11B through cable 11C2, the operated armature 5 of relay 11ST, the back contact and normal armature 8 of relay 10D1, resistors 10V and 10U, the normal upper armature of jack 10PJ through the released armature of relay 10P, the lower normal armature of jack 10PJ, rheostats 10KA and 10K, the operated armature 1 of relay 11STA1, the normal armature 1 of relay 11SS to lead 16S2 which is connected to the ring lead 27TR1. In this manner the second pulse of the units digit is also a negative potential.

When relay 10PG reoperates, relays 10Z and 10P also operate to terminate the second pulse. The winding of relay 10Z is connected through the operated armature 2 of relay 10Y and the operated armature 3 of relay 10ST2 to ground and also to the negative potential source 10D9 through the winding of relay 10Y. Relay 10Y is maintained operated at this time by the connection through its operated armature 2 and the winding of relay 10Z to ground.

When relay 10PG once again releases, relay 10P releases to provide the third pulse and relay 10PU is operated. When relay 10P releases, a plus potential, a minus potential or an open is applied to the ring lead 27TR1 to signal the third pulse of the units digit. In the illustrative embodiment described herein, with the units digit being 1, the third pulse is a plus potential. The lead 8CC+ is connected through the operated armature 5 of relay 10Z over the same path, described above, for the connection of the negative potential for the first and second pulse of the units digit to the ring lead 16TR1. With relay 5U1 in the units identifier 500 operated, the three pulses are therefore a minus, a minus and a plus as indicated in the table above. The operation of each one of the units relays 5U0–9 provides for a unique or different combination of the three possible pulses. If more than one of the relays 5U0–9 are operated the relay corresponding to the lowest digit is served first since the serial connection through the normal armatures 5 of the relays 5U0–9 is broken, and a connection remains only through the relay corresponding to the lowest digit.

When relay 10PG releases to initiate the third pulse, it causes, as described above, the operation of relay 10PO. The lower winding of relay 10PU is connected to the negative potential source 10D2 and also through the back contact and normal armature 2 of relay 10DC1, the operated armature 7 of relay 10Z, the normal armature of relay 10PG and the operated armature 3 of relay 10ST2 to ground. When relay 10PU operates, it operates relay 10PU1 by applying ground through its operated armature 2 to the winding of relay 10PU1 which is also connected to the negative potential source 10D5. As is hereinafter described, the operation of relay 10PU1 causes the serial operation of relay 17TC in the trunk allotter 1700, and relay 16S1 in the trunk 16T1 as a seizure signal; shunts relay 7RU91 in the auxiliary line circuit 7AUX91 causing it to release; operates one of the relays 16C11 or 16C10; and operates one of the hold magnets 9H0–7 and 12H0–7 in the trunk connector 900.

When relay 10PU1 operates, it provides an operating path for relays 17TC and 16S1 from battery 17C1 through the winding of relay 17TC, lead 17TC1 through cable 6C, the back contact and normal armature 3 of relay 6AA1, lead 6TC through cable 11C, the front contact and operated armature 6 of relay 10PU1, lead 11TC through cable 11C, the normal armature 4 and back contact of relay 6AA1, lead 6TC1 through cable 6C, the back contact of armature 2 of relay 17TC, the operated armature 2 of relay 17T, the serially connected normal armatures 3 of relays 17TA4–2, the operated armature 3 of relay 17TA1, lead 17L1, and the winding of relay 16S1 to ground. The relays 17TC and 16S1 are serially operated in this manner upon the operation of relay 10PU1 during the pulsing of the third pulse of the units digit by the controller 1000.

When relay 17TC operates, it locks to ground through its operated armature 2 shunting its operating path through the alternate allotter 600 and the operated armature 6 of relay 10PU1 in the controller 1000 and operates, as described above, the relay 6AA in the allotter 600 if the allotter 1700 has not functioned properly.

When relay 16S1 operates, it does not lock to the battery 16D2 through its operated armature 2 because relay 16TS is operated at this time. After the controller 1000 pulses the tens digit, as is hereinafter described, relay 16TS is released and provides, through its armature 7, the connection from the battery 16D2 to lock the relay 16S1 operated. The operation of relay 16S1 provides a connection from battery 16D3 through the winding of the seizure relay 16S of trunk 16T1, the operated armature 3 of relay 16S1, the serially connected upper windings of coils 16TC2 and 16TC1 to the tip lead 16TT1 of trunk 16T1 to the terminating end of the answering service equipment of the present invention. The trunk 16TT1 is connected through cable 16C, the serially connected upper windings of coils 22TC2 and 22TC1, lead 22L1 through cable 22C, the negatively poled varistor 22V1, lead 22L2 through cable 22C and the windings of relay 22TC to ground. Relay 22C is in this manner connected between ground in the trunk 22T1 and battery 16D3 in the trunk 16T1 and accordingly operates as an indication that the trunks 16T1 and 22T1 have been seized. Relay 16S does not operate at this time due to the high resistance of the windings of relay 22TC. When the attendant at the terminating end plugs into a jack 18J91, which is one of the one hundred jacks 18J0–99 corresponding respectively to the auxiliary lines 7P0–99, as is hereinafter described, the lower winding of relay 22TC is short-circuited to allow relay 16S to operate and lock the connection through the trunk 16T1. When relay 22TC is operated in this manner at the termination of the pulsing of the units digit from the controller 1000, it in turn causes the operation of the relay 22TC02 by connecting ground through its operated armature and the back contact of the normal armature 2 of relay 22TC01 thereto. The winding of relay 22TC0, which is also connected to the battery 22D2, is accordingly operated to prepare operating paths for the relays 21A, 21B, 21C and 21D of the crossbar switch 2100 to the controller 2700. The relays 21A, 21B, 21C and 21D are hold relays associated respectively with the left four verticals of the crossbar switch 2100. The left four verticals of the crossbar switch 2100 are effectively a trunk connector for the trunk 22T1 to provide a talking connection between the leads 16TT1 and 16TR1 and the tip and ring leads connected to one of the jacks 18J0–99. The relays 21A, 21B, 21C and 21D and also the select magnets 25S0–9 associated with the crossbar switch 2100 are selectively operated by the controller 2700, as is hereinafter described, responsive to the pulsing of the digits from the controller 1000.

When relay 10PU1 operates, as briefly described above, it also causes the release of the operated one of the ring-up relays 7RU0–99. In the illustrative example described herein relay 7RU91 was operated. The operating path for relay 7RU91 is from ground through its operated armature 2 through the winding of relay 7RU91 and resistor 7RA91 to the negative battery 7G91. The operation of relay 10PU1 connects ground to the junction between the resistor 7RA91 and the winding of relay 7RU91 over a path through the operated armature 3 of relay 10PU1, lead 15A through cable 15C1, the operated armature 3 of relay 15T9, lead 13A9 through cable 13C1, the operated armature 13S91 in the tens identifier connector 1300, lead 13S91 through cable 13C to the resistor 7RA91 and the winding of relay 7RU91. When relay 7RU91 releases, it in turn causes the release of the operated units relay 5U1, the operating path of which was from ground through the operated armature 3 of relay 7RU91, lead 5UA1 through cable 5C, the normal armature 8 of relay 8TAC, lead 5UL1 through cable 5C and the winding of relay 5U1 to the battery 5UB1. When relay 5U1 releases, it in turn causes the release of the relay 4UI1 in the indicating circuit 400. The operating path for the relay 4UI1 was from ground through the back contact of the normal armature 2 of relay 8TAD in the start circuit 800, the normal armature 2 of relay 8CT, lead 5T0 through cable 5C, the operated armature 4 of relay 5U1, the varistor 4UIV1 and the winding of relay 4UI1 to the battery 4UB1. When relay 4UI1 releases, it opens the path to ground through its operated armature from the lamp 4UIL1 causing it to extinguish and accordingly remove the indication of the operation of relay 5U1 in the units identifier 500.

When relay 10PU1 in the controller 1000 operates, it also, as briefly described above, causes the operation of one of the hold magnets 12H0–7 and 9H0–7 under control of the operated one of relays 15T0–9 in the tens identifier 1500.

The one hundred subscribers' auxiliary lines 7P00–99 in the answering service equipment of the present invention are connected through the trunk connector 900 by the selective operation of the hold magnets 9H0–7 and 12H0–7 to the four trunks 16T1–4. Each trunk 16T1–4 has access to the one hundred auxiliary lines 7P00–99 through the verticals of crossbar switches 1200S and 900S in the trunk connector 900. Connected to the horizontals associated with the four verticals of the crossbar switch are the auxiliary lines 7P00–99 of the one hundred subscribers; thirty on the first vertical, twenty on the second, thirty on the third, and forty on the fourth. By the operation of one of the select magnets 9SM0–9, and one of the magnets 13SM0–9, after the units identification, and one of the hold magnets 9H0–9 and 12H0–9, after the pulsing of the units digit, two or three subscribers are extended to the allotted one of trunks 16T1–4. The operation, as is hereinafter described, of relays 16C10 and 16C11 in the allotted trunk 16T1 extends one of the two or three subscribers to the repeat coil 16RP which is also connected through leads 16TR1 and 16TT1 to the answering bureau or terminating end.

The operation of one of the hold magnates 9H0–7 and 12H0–7 also depends upon which one of the four trunks 16T1–4 is being utilized. The hold magnet which is operated is indicated in the following table:

| Identifier Relay | Allotted Trunk | Hold Magnet |
|---|---|---|
| 15T0-2 | 16T3 | 9H0 |
| 15T0-2 | 16T4 | 9H1 |
| 15T3-4 | 16T3 | 9H2 |
| 15T3-4 | 16T4 | 9H3 |
| 15T5-7 | 16T3 | 9H4 |
| 15T5-7 | 16T4 | 9H5 |
| 15T8-9 | 16T3 | 9H6 |
| 15T8-9 | 16T4 | 9H7 |
| 15T0-2 | 16T1 | 12H0 |
| 15T0-2 | 16T2 | 12H1 |
| 15T3-4 | 16T1 | 12H2 |
| 15T3-4 | 16T2 | 12H3 |
| 15T5-7 | 16T1 | 12H4 |
| 15T5-7 | 16T2 | 12H5 |
| 15T8-9 | 16T1 | 12H6 |
| 15T8-9 | 16T2 | 12H7 |

Figure 12:
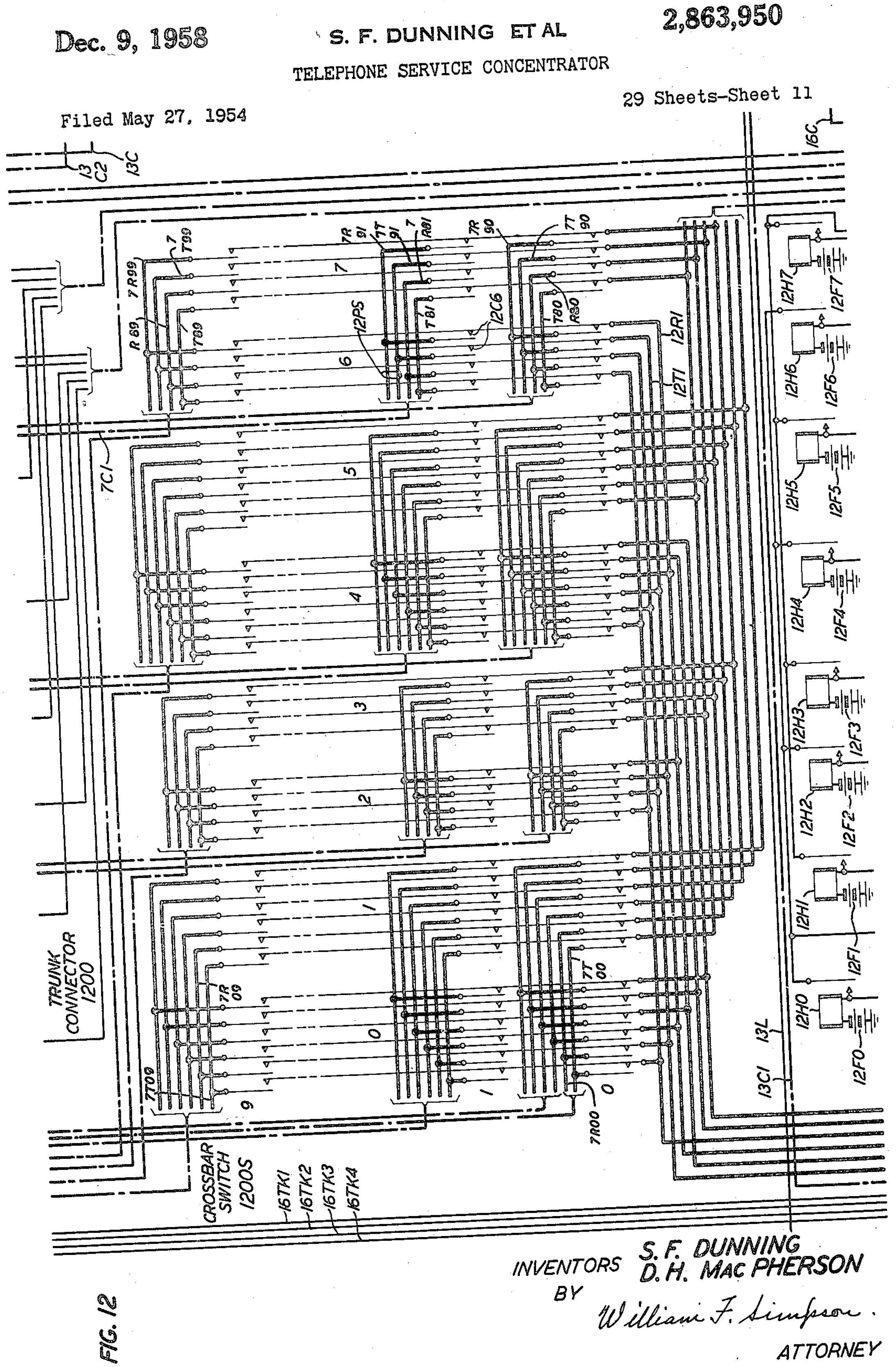
Figure 13:
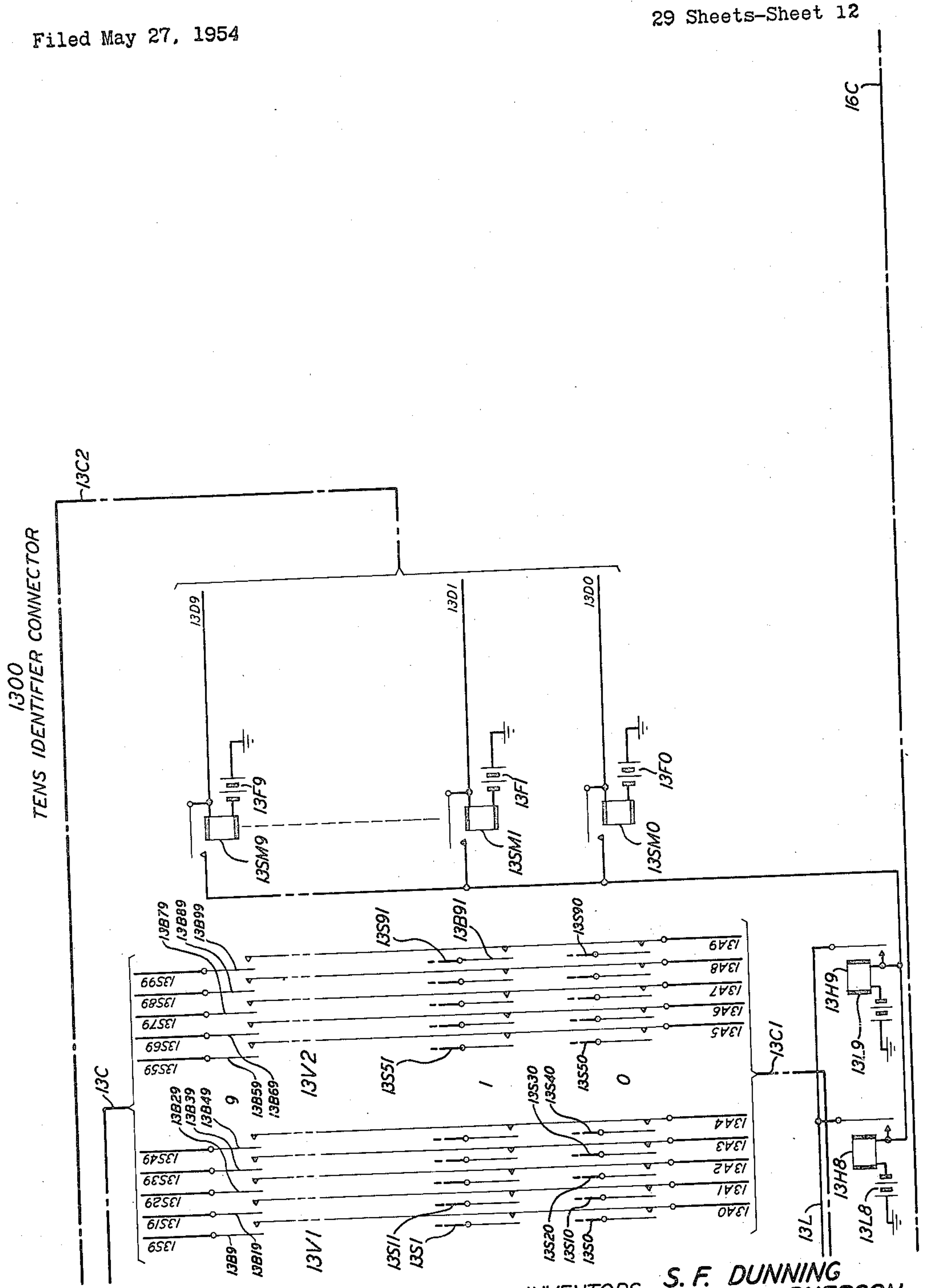
Figure 14:
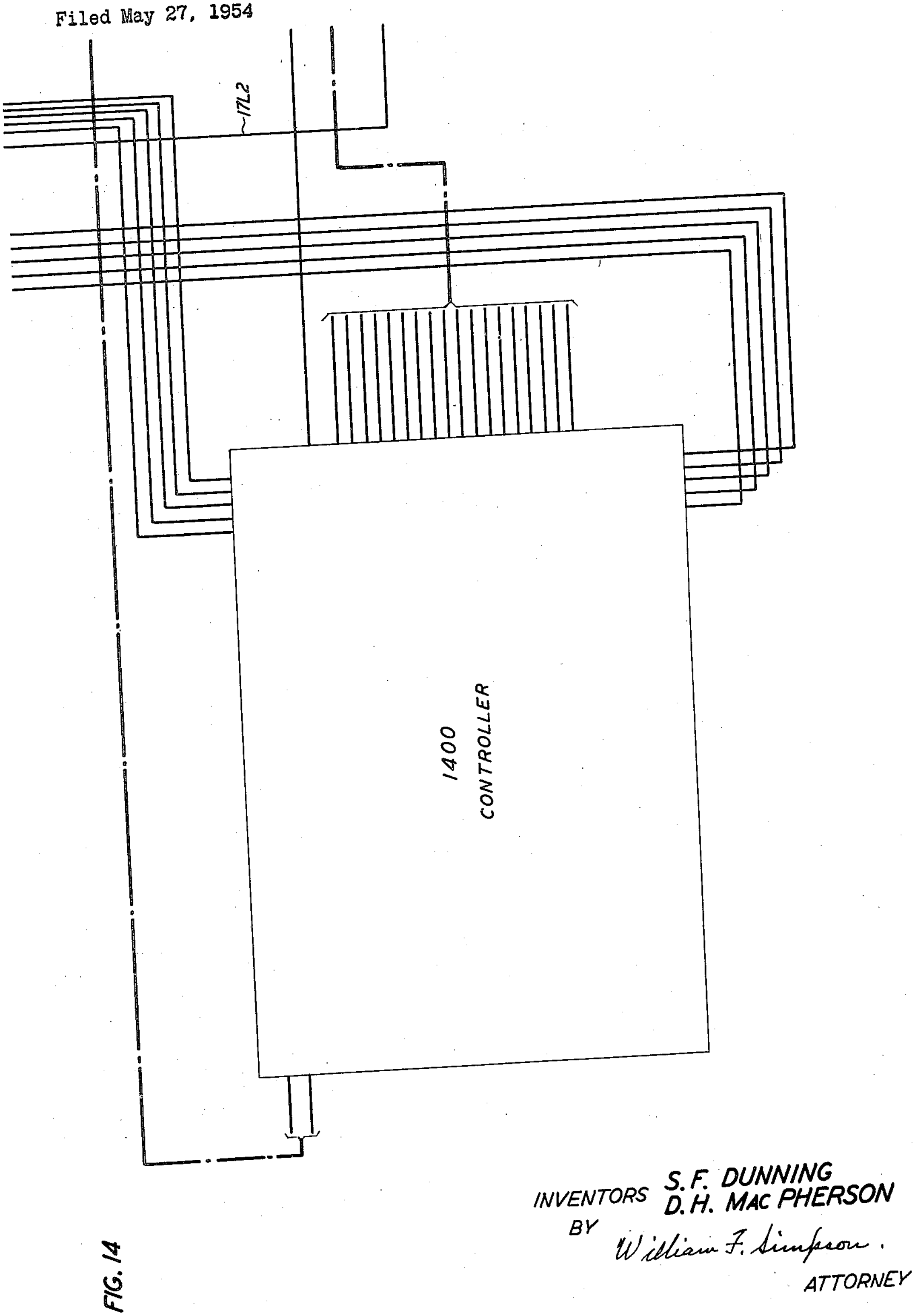
Figure 15:
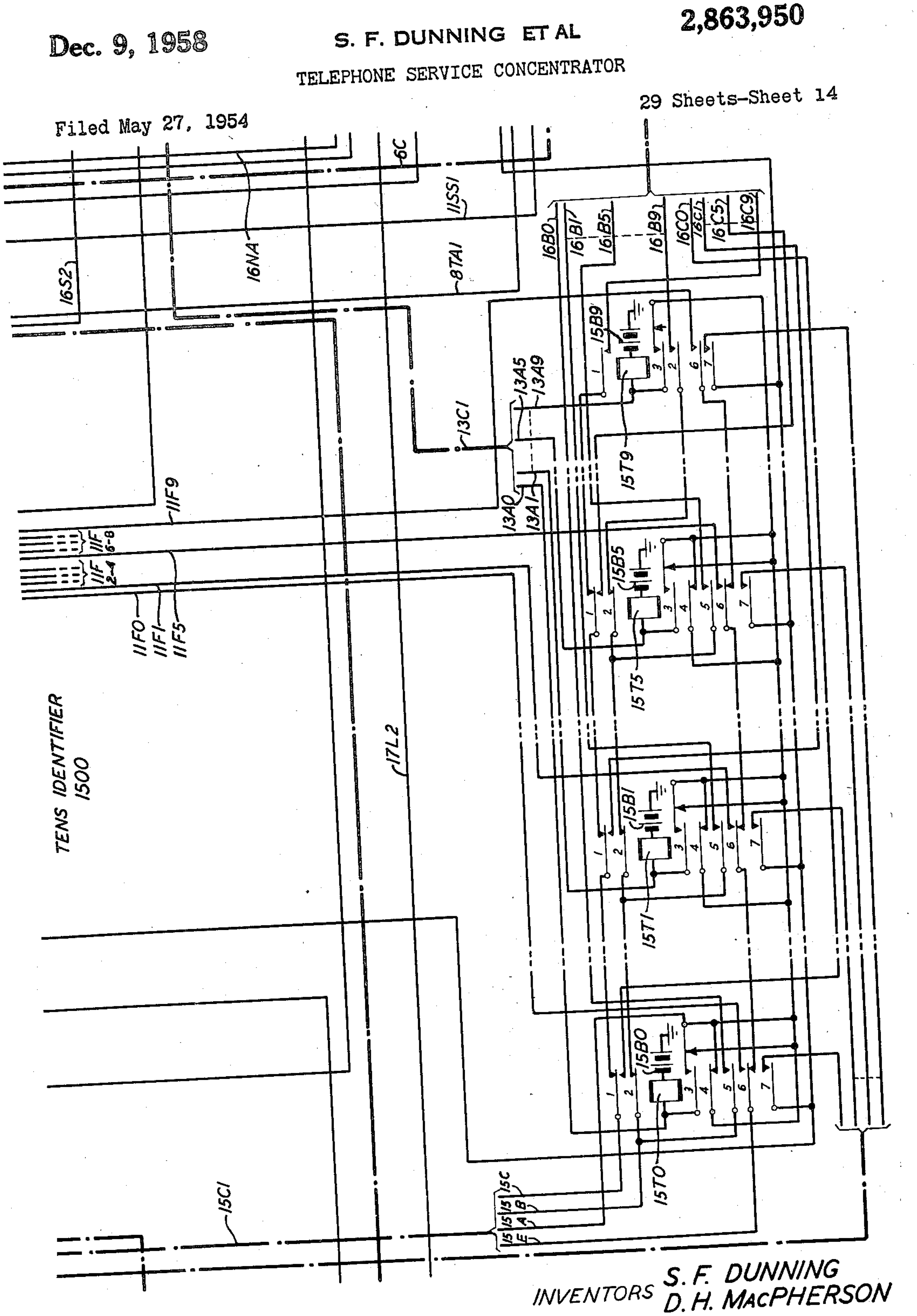
Figure 16:
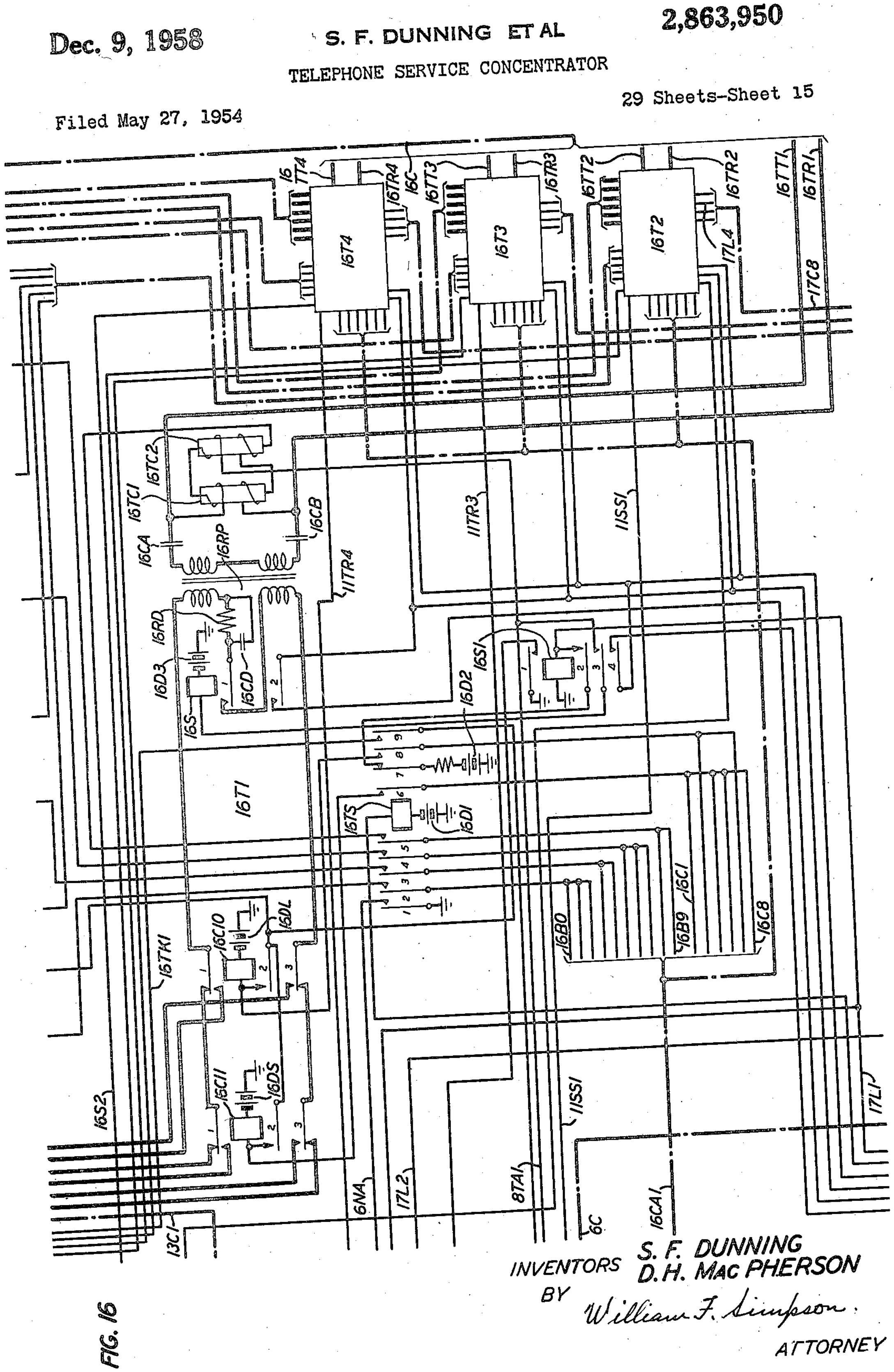
Figure 17:
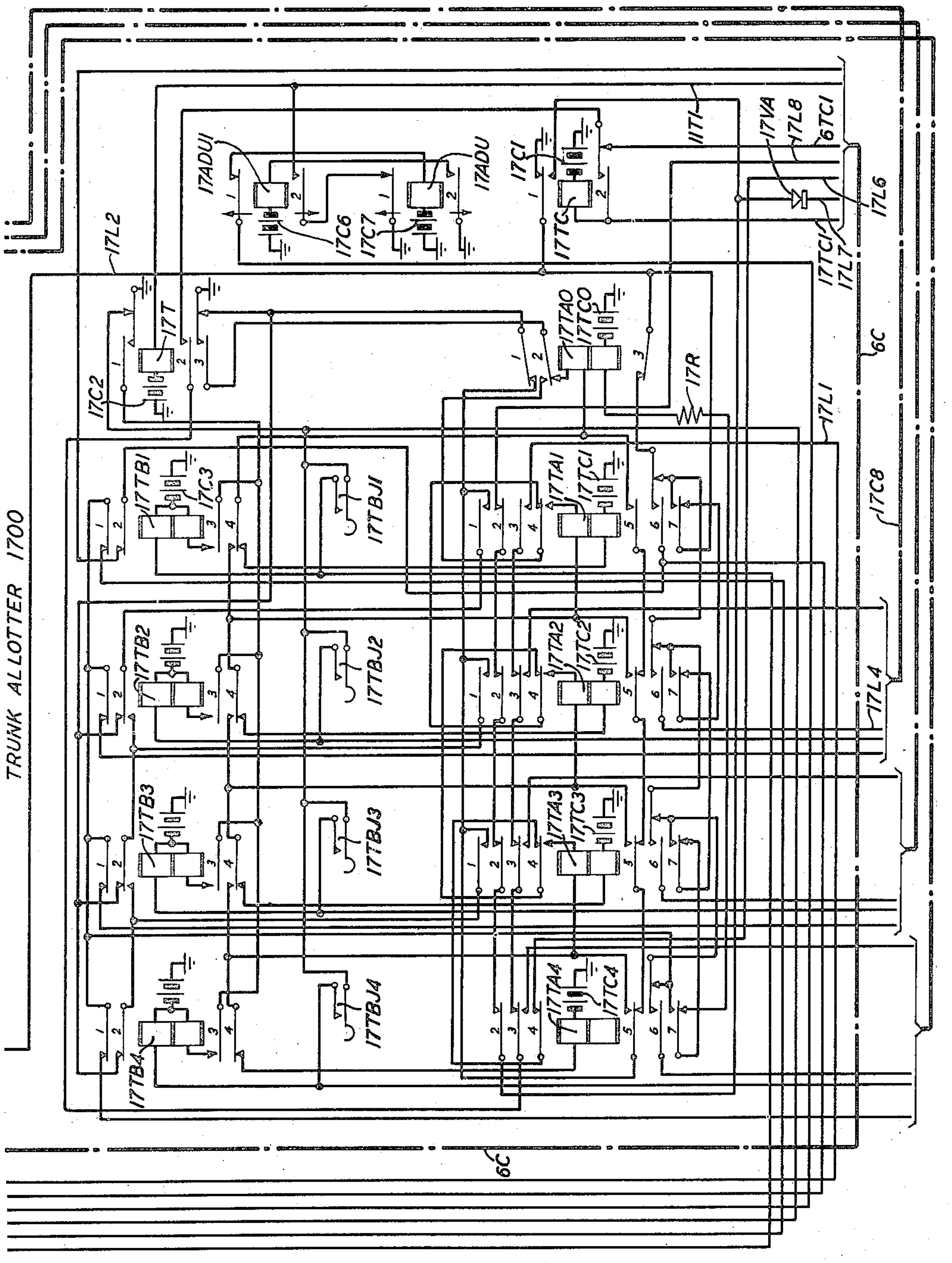
Figure 18:
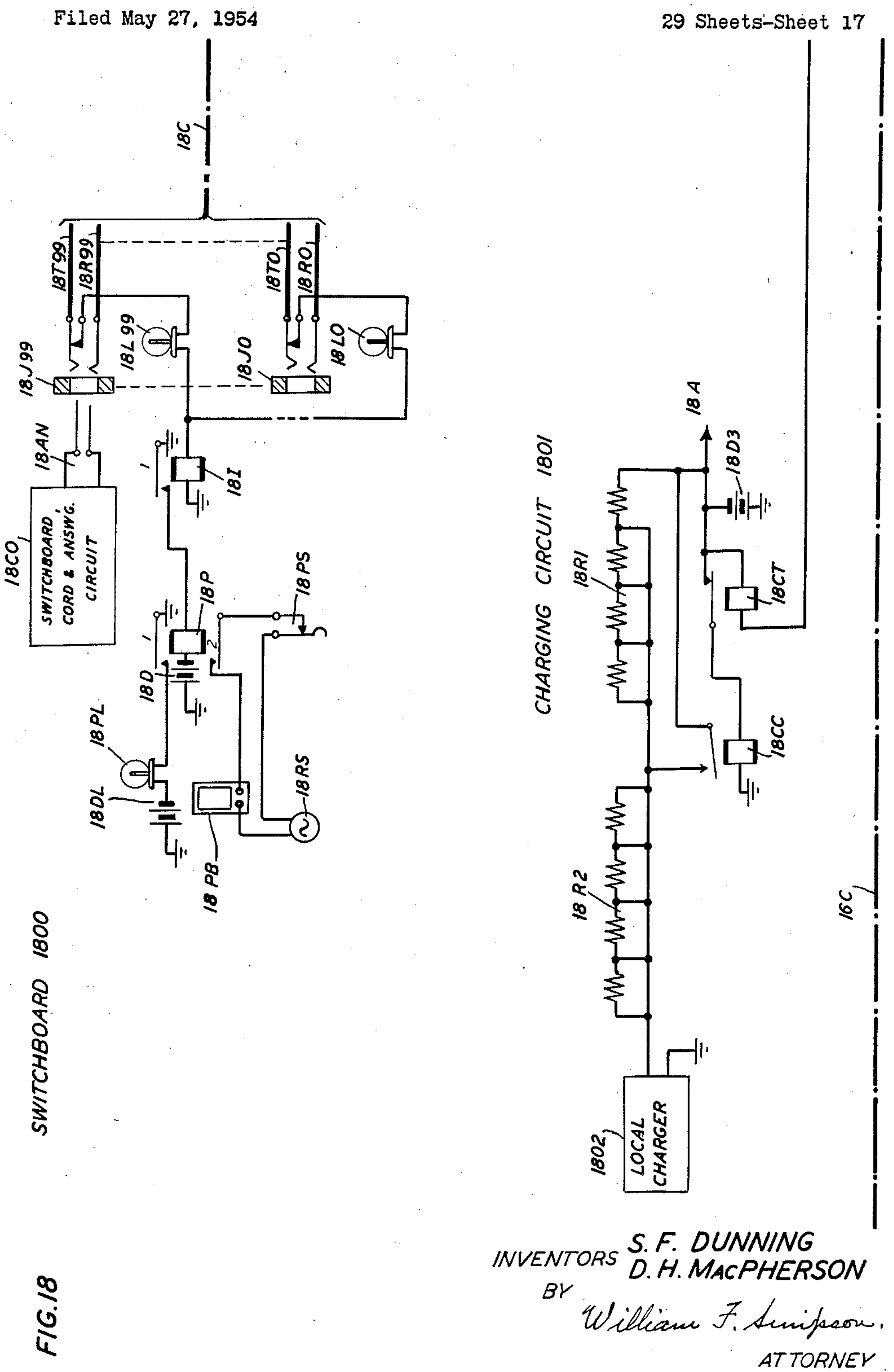
Figure 19:
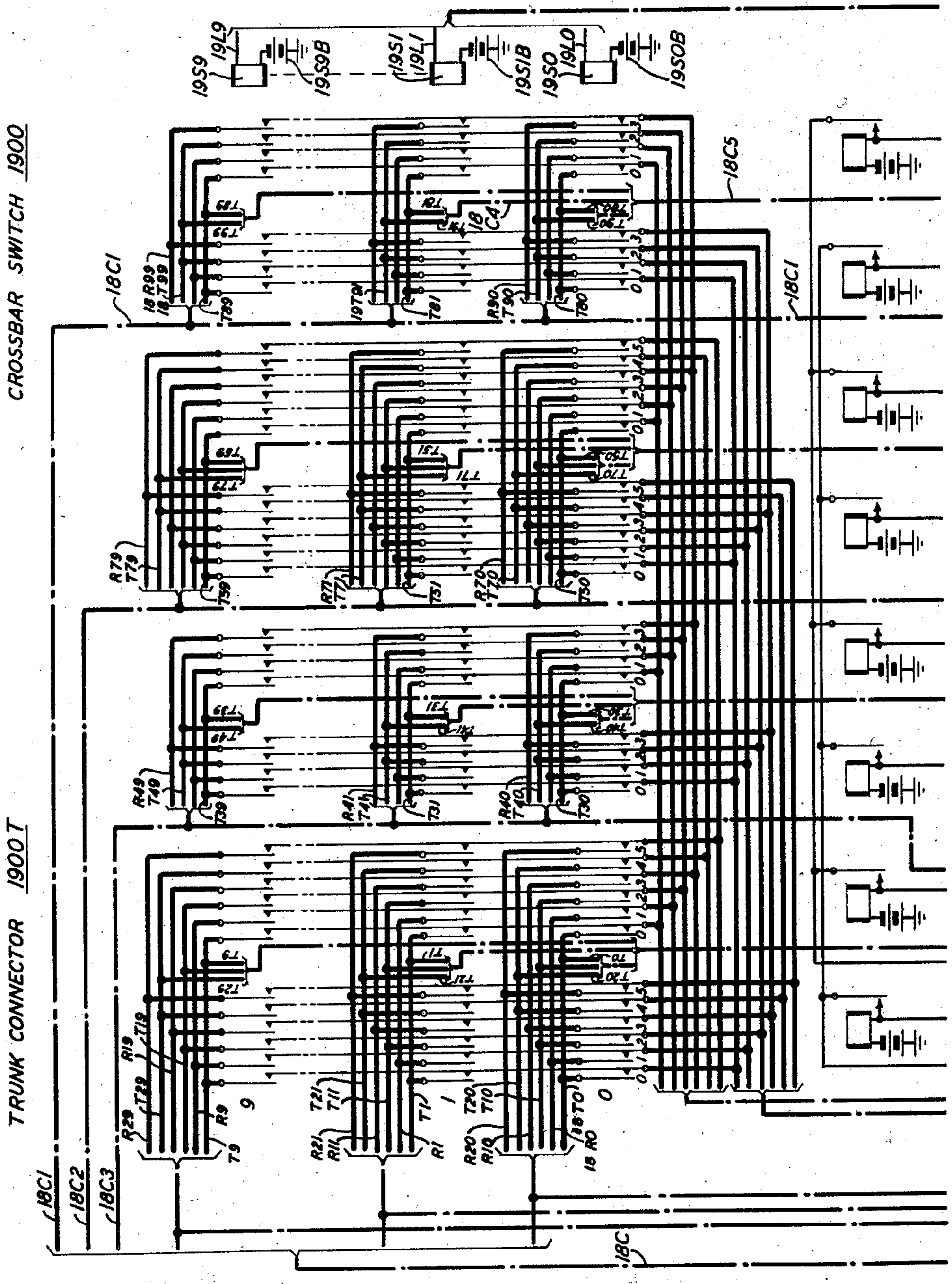
Figure 20:
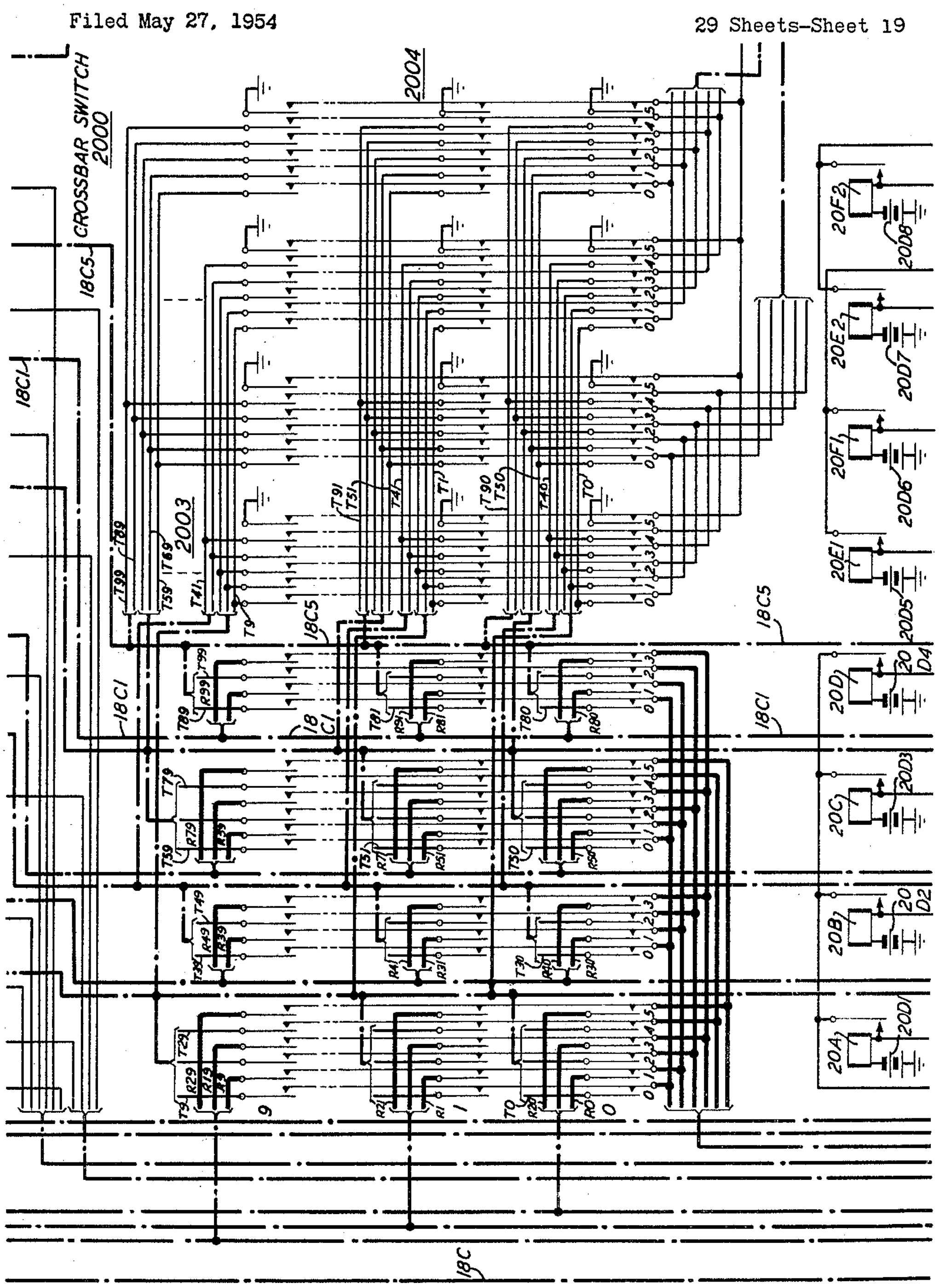
Figure 21:
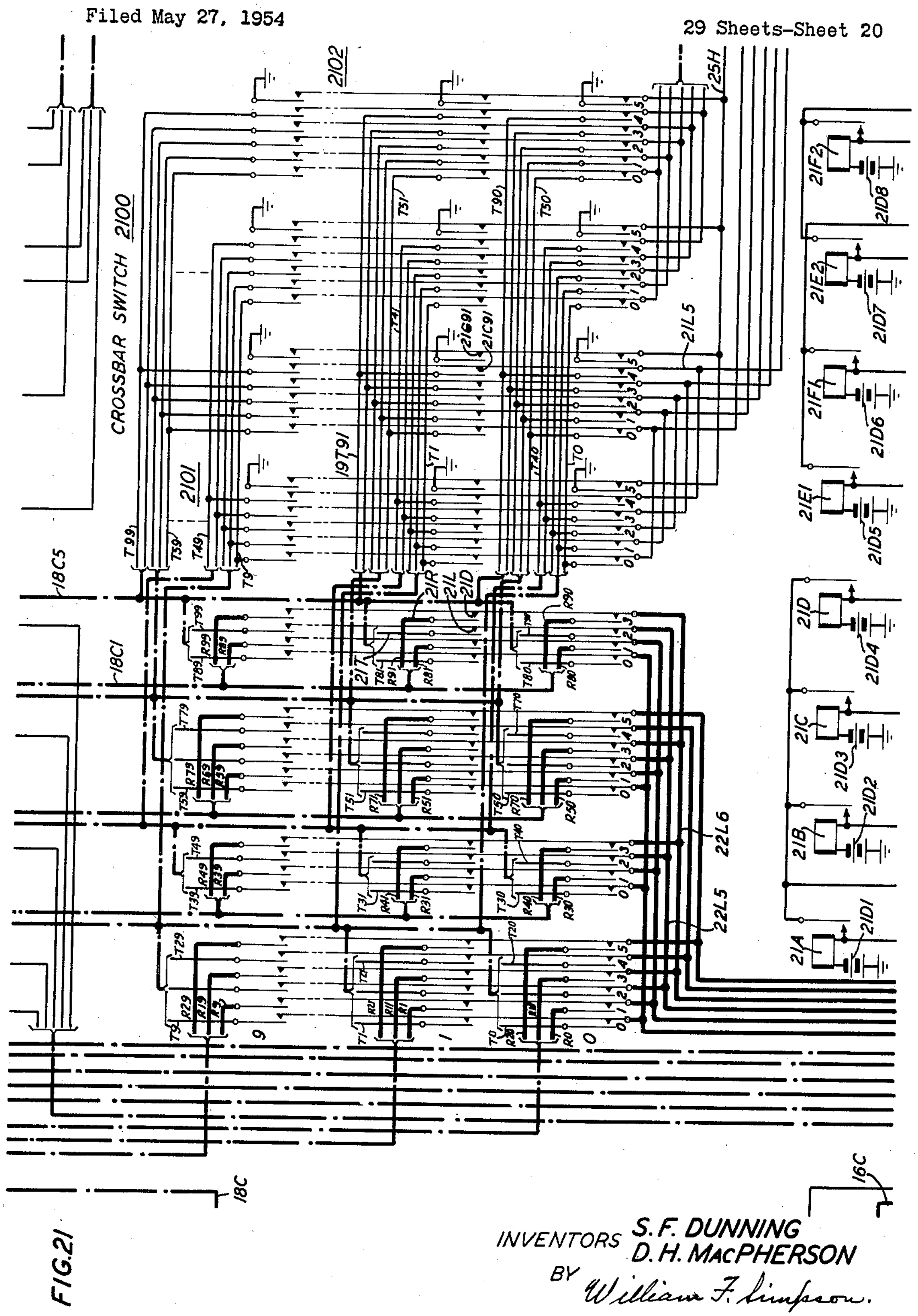
Figure 22:
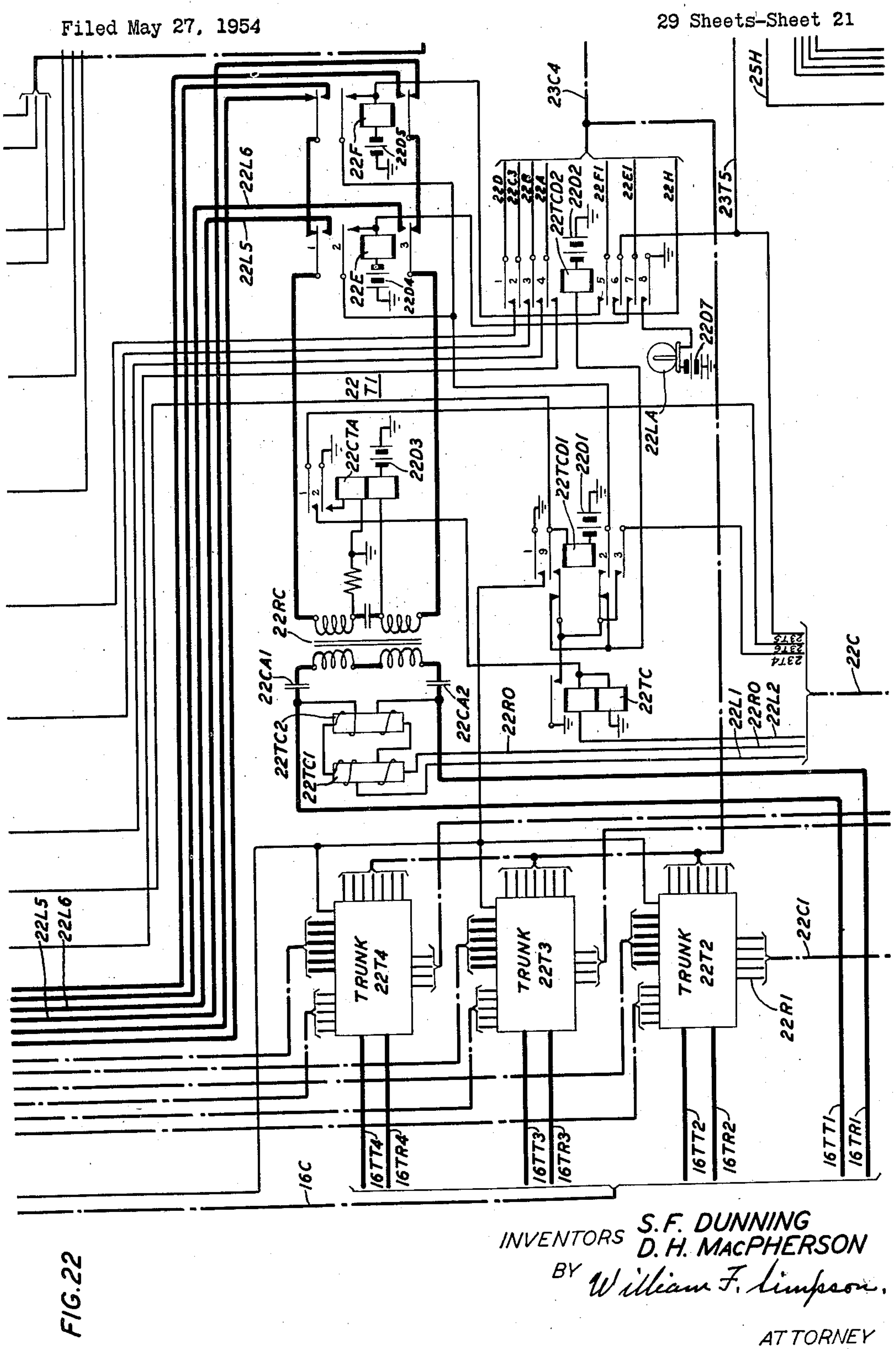
Figure 23:
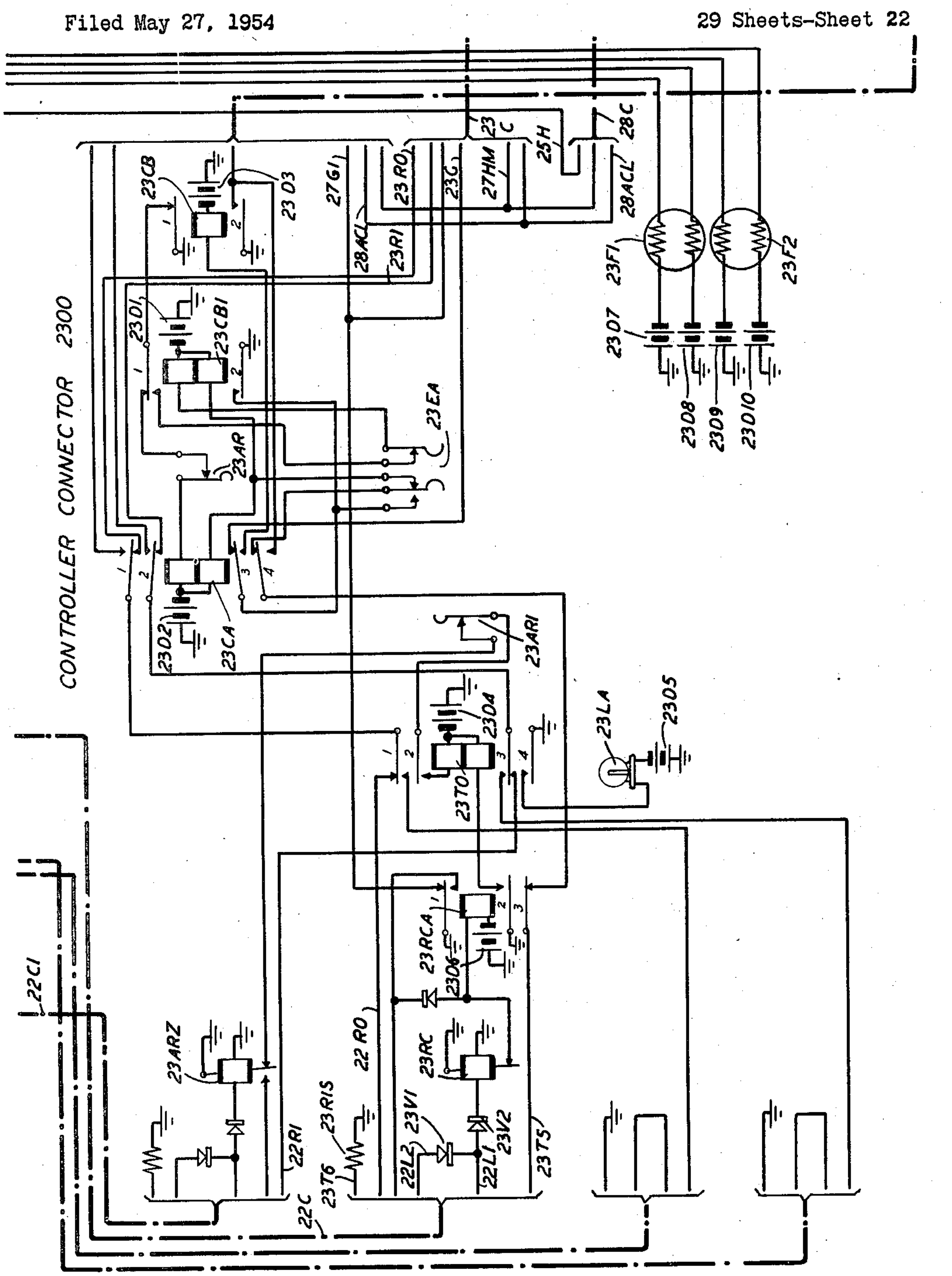
Figure 24:
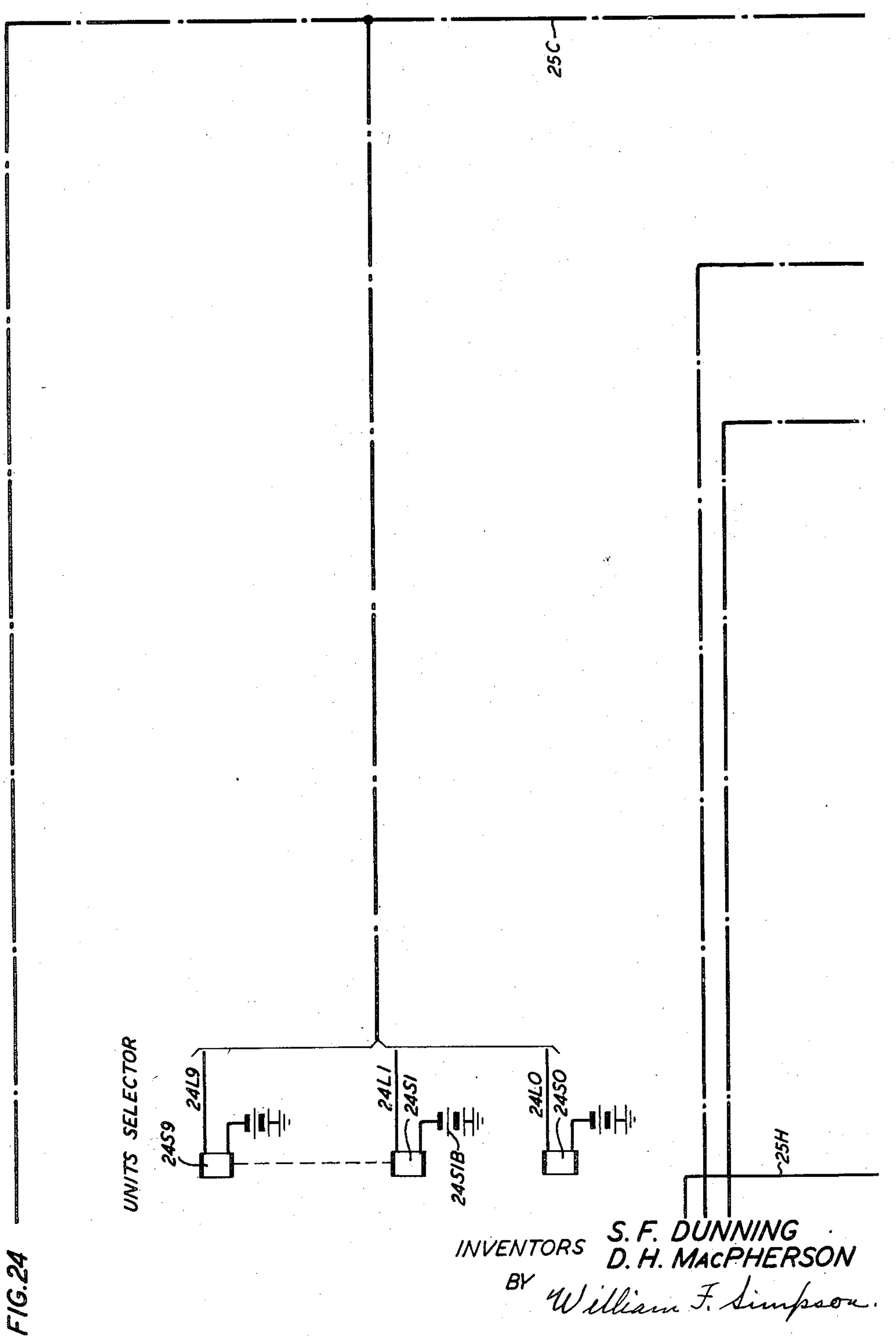
Figure 25:
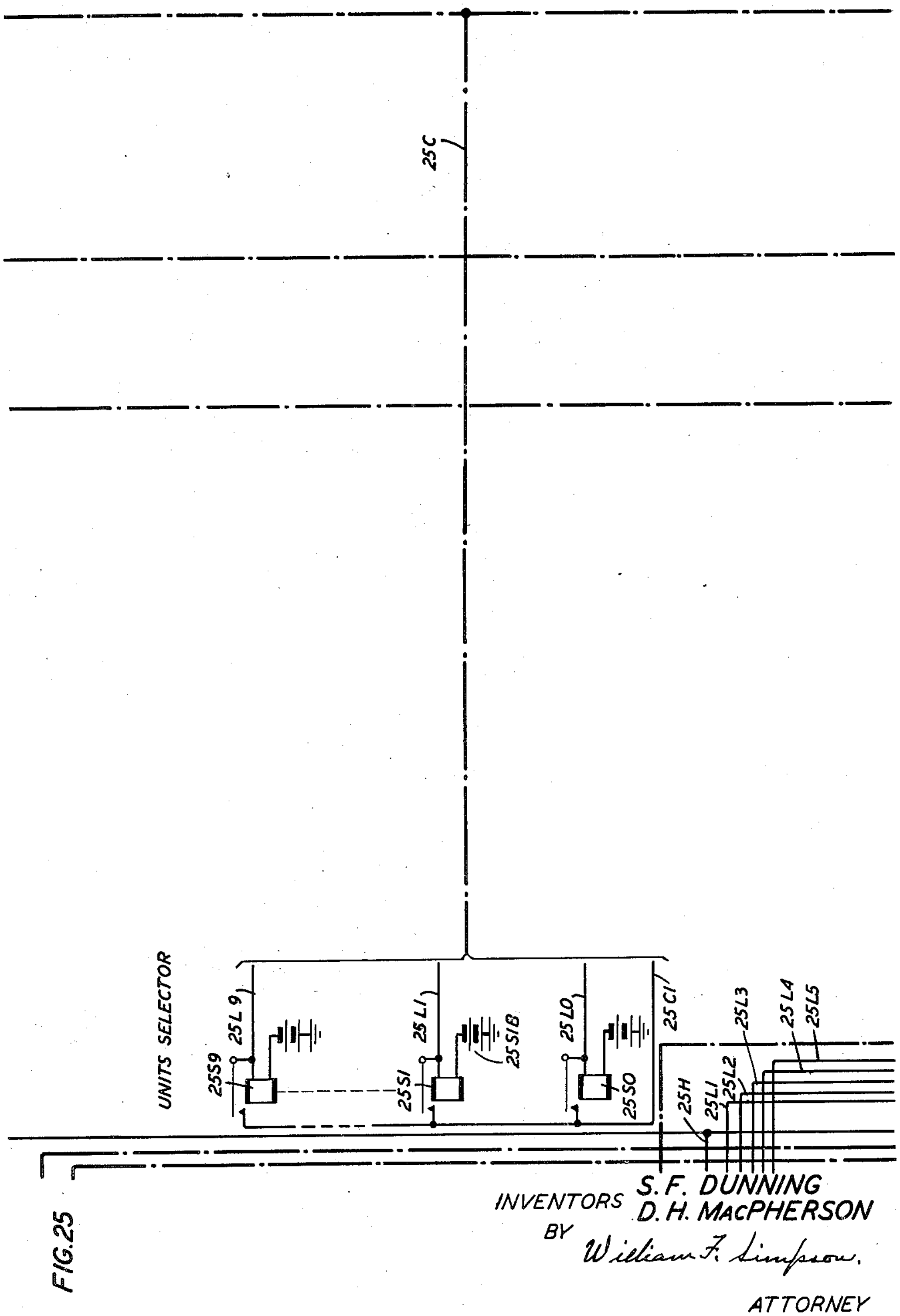
Figure 26:
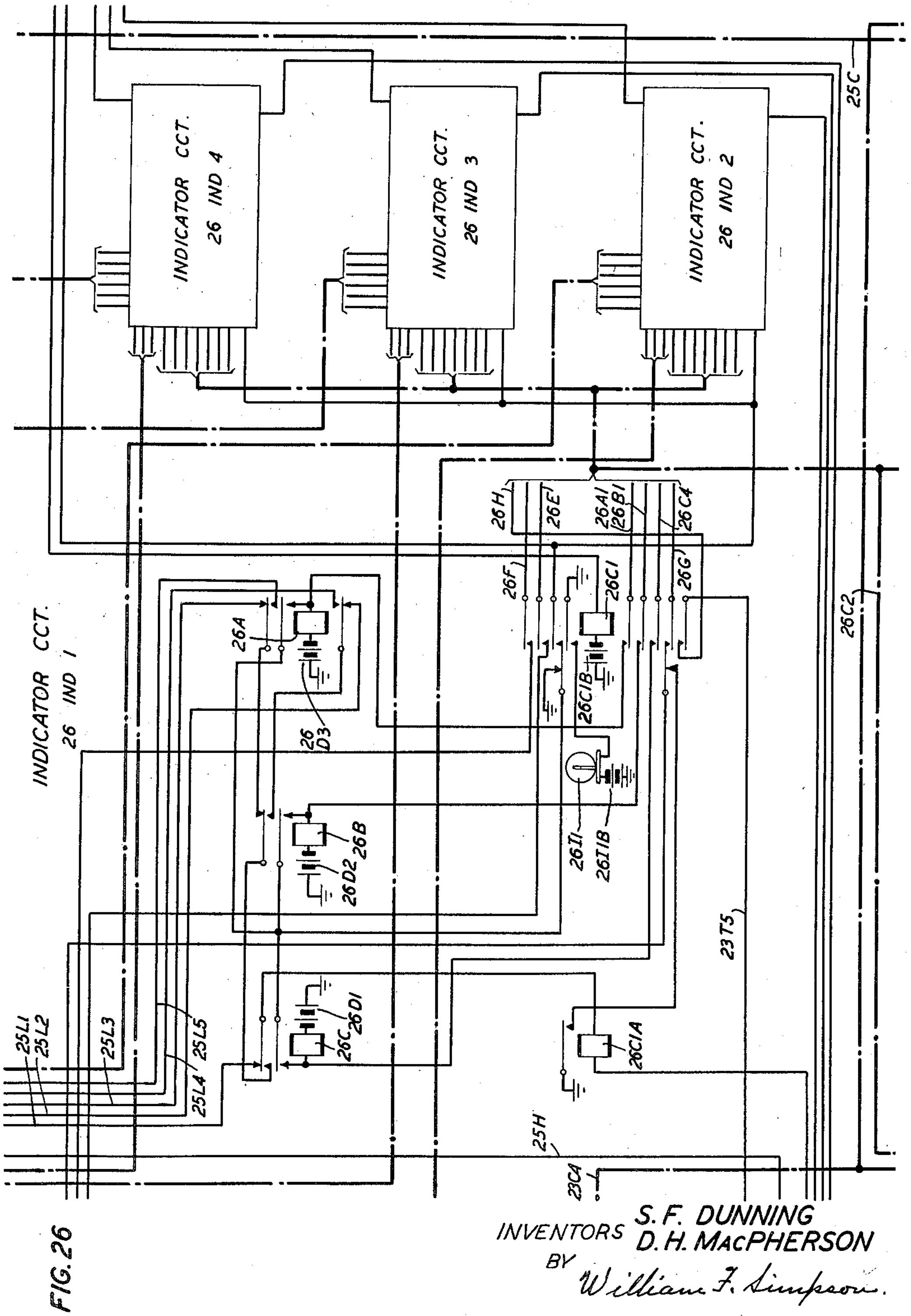
Figure 27:
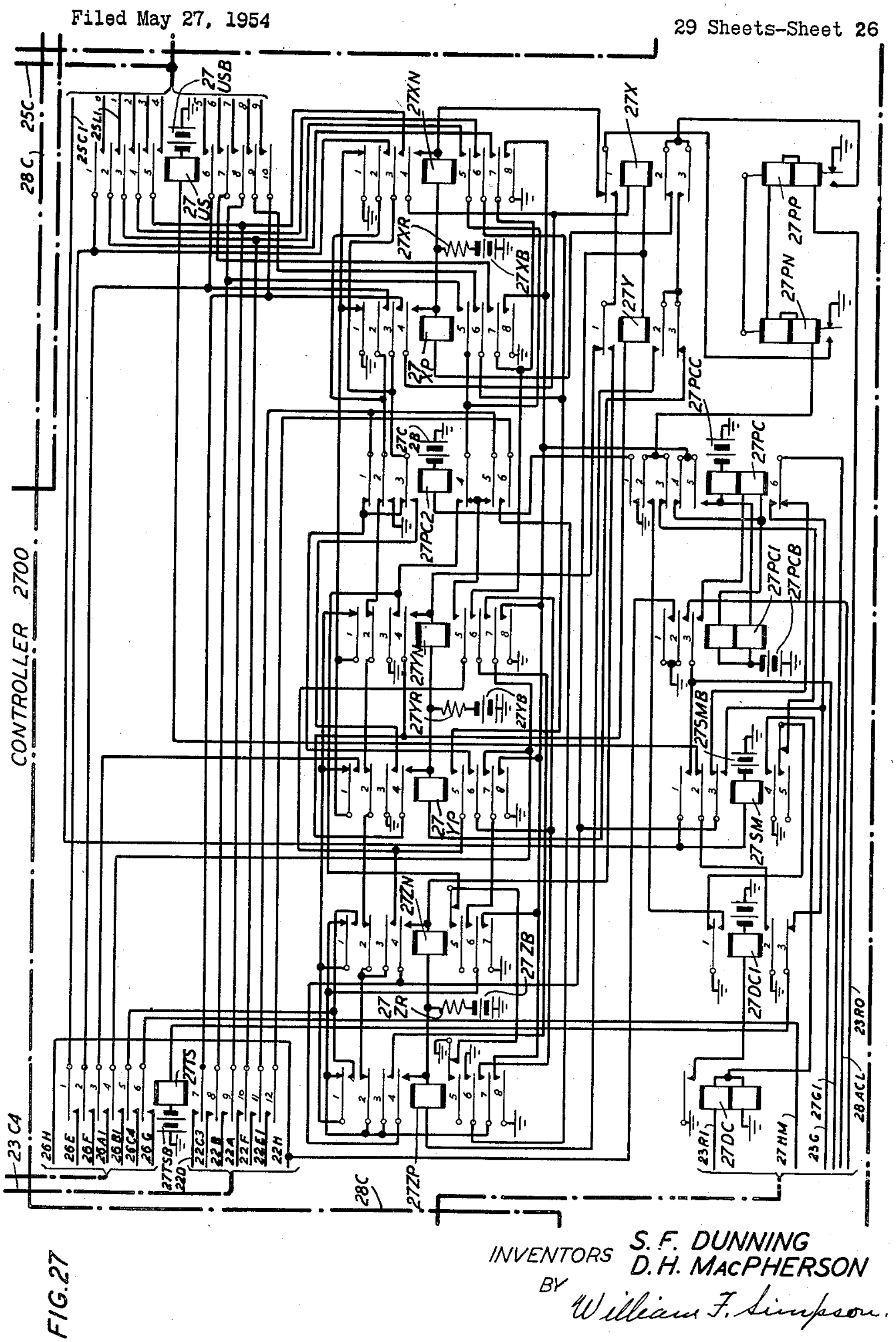
Figure 28:
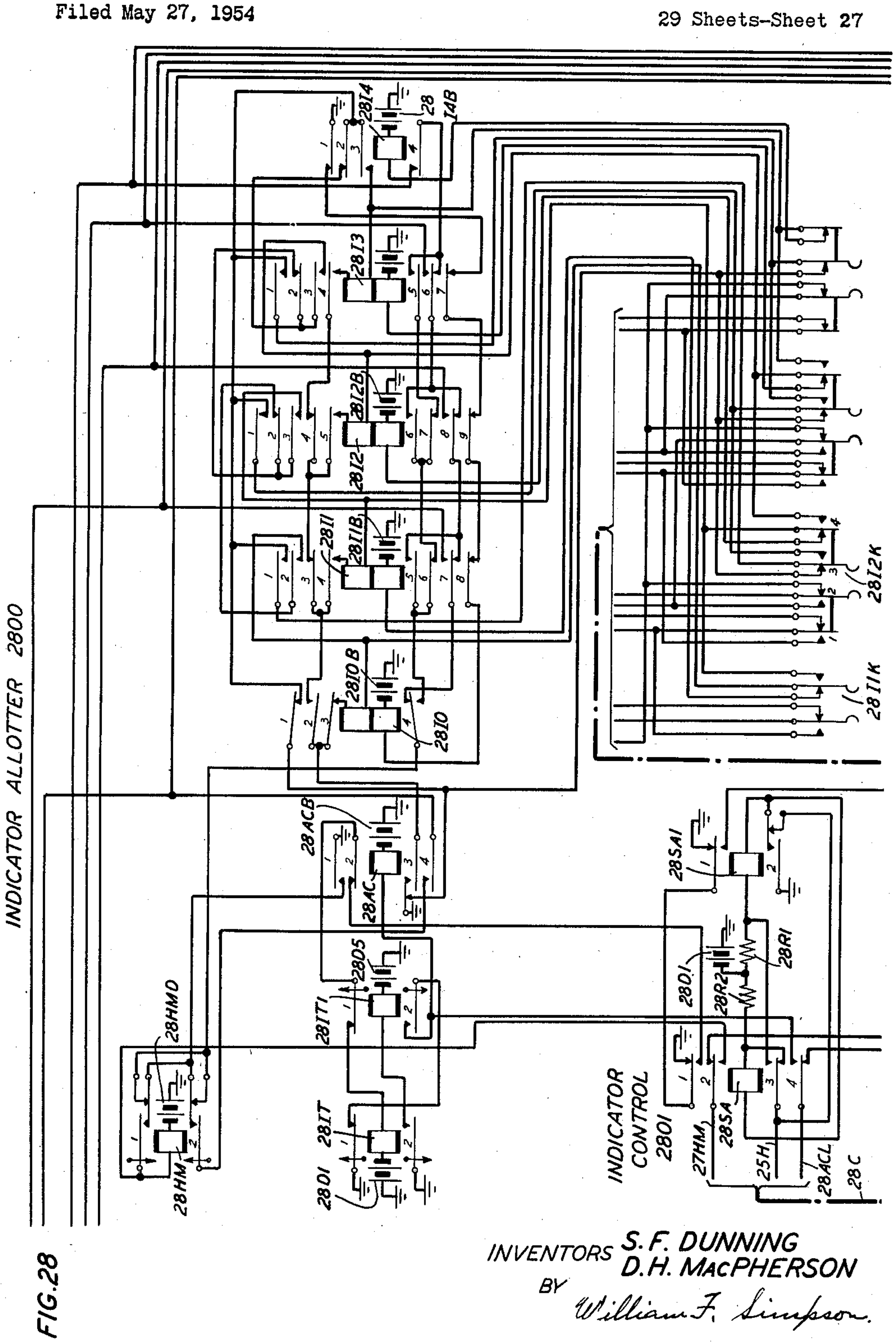
Figure 29:
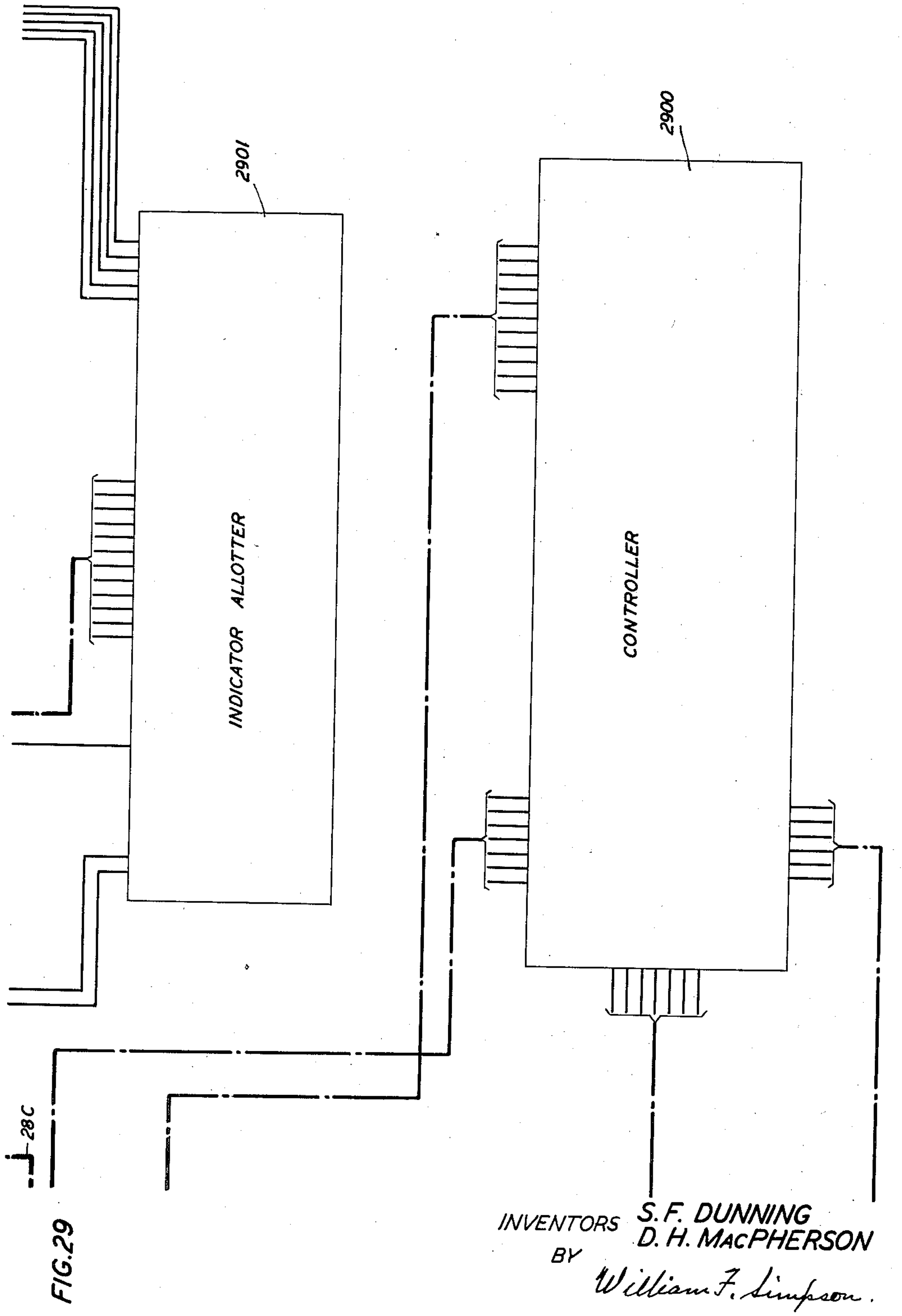

In the illustrative operation being described herein, the relay 15T9 in the tens identifier 1500 is operated and the trunk 16T1 is being utilized so that the hold magnet 12H6 is energized. The operating path for magnet 12H6 is from ground through the operated armature 2 of relay 10PU1, lead 15B through cable 15C1, the serially connected normal armatures 2 of relays 15T0–8, the operated armature 2 of relay 15T9, lead 16B9 through cable 16CA1, the operated armature 5 of relay 16TS to the winding of relay 12H6 which is also connected to the battery 12F6. The first, the third, the fifth and the seventh verticals from the left of the crossbar switch 1200S are associated respectively with the first trunk 16T1; the remaining verticals of the crossbar switch 1200S shown in Fig. 12 are associated with the trunk 16T2; the first, third, fifth and seventh verticals from the left of switch 900S of the trunk connector 900 are associated with the trunk 16T3; and the remaining verticals in the switch 900S are associated with the trunk 16T4. Since, as described above, the select magnet 13SM1, which is associated with the crossbar switch 1200S, was operated by the units identifier 500, a connection is provided from the subscriber's auxiliary line 7P91 to the trunk 16T1. The leads 7R91 and 7T91 of the line 7P91 are connected through cable 7C1, leads 12P6, contacts 12C6, leads 12T1 and 12R1 to the front contacts of armatures 1 and 3 of relay 16C11 in trunk 16T1.

When relay 10PU1 operated, it also operated the relay 16C10 or 16C11 depending upon which one of the register relays 15T0–9 is operated in accordance with the following table:

| Register Relay | Relays 16C10 and 16C11 |
|---|---|
| 15T0, 15T3, 15T5 or 15T8 | Neither. |
| 15T1, 15T4, 15T6 or 15T9 | 16C11. |
| 15T2 or 15T7 | 16C10. |

With the relay 15T9 being operated therefor, the relay 16C11 is operated. The operating path for relay 16C11 is from ground through the operated armature 1 of relay 10PU1, lead 15C through cable 15C1, the serially connected normal armatures 1 of relays 15T0–8, the operated armature 1 of relay 15T9, lead 16C9 through cable 16CA1 through the operated armature 6 of relay 16TS to the winding of relay 16C11 which is also connected to the battery 16D5. When relay 16C11 operates, it extends the connection through the crossbar switch 12S of the trunk connector 900 from the line 7P91 through its operated armatures 1 and 3 and the normal armatures 1 and 3 of relay 16C10 to the repeat coil 16RP in the trunk 16T1. Relay 16S remains normal until, as described above, the attendant at the terminating end answers the call. The connection between the primaries of coil 16RP is therefore open at the normal armature 1 of relay 16S at this time.

When relay 10PG operates, after capacitor 10PGC is charged for the third time, it causes the reoperation of relay 10P to terminate the third pulse of the units digit, and it also causes the release of relay 10ST2. The operating path through the upper winding of relay 10ST2 was broken when relay 10PU operated at the armature 1 of relay 10PU, and the operating path through the lower winding is opened upon the operation of relay 10PG causing relay 10ST2 to release. The operating path through the lower winding of relay 10ST2 was from ground through the operated armature 3 of relay 10ST2, the normal armature of relay 10PG, the front contact and operated armature 7 of relay 10Z, and the lower winding of relay 10ST2 to negative battery 10D1.

When relay 10ST2 releases, it opens, at its armature 3, the operating paths for relays 10W, 10X, 10Y and 10Z causing them to release. As described above, the windings of relays 10W and 10X and the windings of relays 10Y and 10Z were serially connected through the operated armatures 2 of relays 10W and 10Y, respectively, to the front contact of armature 3 of relay 10ST2. When relay 10ST2 releases, it maintains relay 10P operated by connecting ground thereto from the normal armature 3 thereof through the upper winding of relay 10PG and armature 2 of jack 10PGA. When the capacitor 10PGC discharges for the third time, the relay 10PG thereafter releases and the pulse generator circuit is normalized or released.

When the relay 10ST2 releases, it also connects the winding of the disconnect relay 10DC to the ring 16TR2 of the second trunk 16T2. The winding of relay 10DC is connected to the negative potential source 10D3 and through the operated armature 3 of relay 10PU, the front contact of normal armature 1 of relay 10ST2, normal armature 1 of relay 10PT1, the normal armature 3 and back contact of relay 11SS through lead 11SS1 to the ring lead 16TR2 of the trunk 16T2. The ring lead 16TR2 is connected through cable 16C to trunk 22T2, lead 22R1 through cable 22C1, the back contact and normal armature 3 of relay 23T0, the operated armature 2 and front contact of relay 23CA, lead 23R1 through cable 23C, and the serially connected high resistance windings of the disconnect relay 27DC in controller 2700 to ground. The winding of relay 10DC is therefore connected through the ring 16TR2 in series with the high resistance of relay 27DC at the terminating end of the answering service equipment of the present invention. When the terminating disconnect relay 27DC operates, it opens, as is hereinafter described, the pulsing circuit through the ring 16TR1 of the first trunk 16T1 as a signal that the first digit has been received. When relay 27DC operates, it connects ground to the winding of relay 27DC1 causing it to operate. The operation of relay 27DC1 removes, at its armature 1, ground from the back contact thereof which is connected, as described above, through the back contact of normal armature 5 of relay 27SM, normal armature 3 of relay 27PC, the windings of relays 27PN and 27PP, lead 23R0 through cable 23C, the front contact and operated armature 1 of relay 23CA, the normal armature 1 and back contact of relay 23T0, lead 22R0 through cable 22C, and through the lower winding of coils 22TC1 and 22TC2 to the ring lead 16TR1. The relay 10DC in the controller 1000, however, does not operate at this time due to the high resistance windings of relay 27DC in the path at the terminating end. When the terminating end, as is hereinafter described, registers the units digit, the high resistance winding of relay 27DC in the terminating end is short-circuited causing the relay 10DC to operate.

The controller 2700 is one of two controllers 2700 and 2900 in the terminating equipment of the present invention, which are utilized alternately on successive calls, and which receive the pulses from the originating equipment and pass the pulsed information to indicating circuits 26IND1–4, hereinafter described. In the illustrative operation being described, the controller 2700 is being utilized to record the digits from the originating end of the answering service equipment of the present invention. As described above, seizure of the controller 2700 is effected when the originating equipment connects the battery 10D4 through the windings of the relays 27PP and 27PN to ground on the normal armature 1 of the relay 27DC1. The presence of the ground connection on the ring lead 16TR1 indicates to the originating equipment that the controller 2700 is ready for pulsing.

As described above, when the pulsed units digit is 1, the three pulses are a minus potential, a minus potential and a plus potential. When the negative first pulse is applied to the ring 16TR1 of the first trunk 16T1 by the controller 1000, it is placed on the lead 22R0 and thence through the controller connector 2300, as lescribed above, and the windings of the relays 27PP and 27PN, to ground. The relay 27PN is responsive to negative pulses and the relay 27PP is responsive to positive pulses so that the negative first pulse causes the negative pulse relay 27PN to operate. When relay 27PN operates, it in turn causes the operation of the relay 27XN by connecting ground from the normal armature of relay 27PP through the operated armature of relay 27PN, the normal armature 1 and back contact of relay 27X, to the winding of relay 27XN which is also connected through the resistor 27XR to the negative potential source 27XB.

The removal of the negative pulse from the ring lead 16TR1 at the termination of the first pulse by the controller 1000, described above, allows the relay 27PN to release. When the relay 27PN releases, it causes the operation of relays 27X and 27XN. The winding of relay 27X, which is connected in series with the winding of the relay 27XN to the battery 27XB, is also connected through the normal armature 3 and back contact of relay 27SN, the back contact and normal armature 6 of relay 27PC, lead 27G1 through cable 23C and the back contact and normal armature 1 of relay 23RCA to ground.

When relay 27XN operates, it in turn causes the operation of relay 27PC1 by connecting ground from its operated armature 8 through the normal armature 4 of relay 27PC through the upper winding of relay 27PC1 to the negative battery 27PCB. Relay 27PC does not operate at this time due to the ground connection from the operated armature 8 of relay 27XN which shunts its lower winding. Relay 27PC1 operates and, in turn, causes the operation of the relay 28AC in the indicator allotter 2800. The winding of the relay 28AC is connected to the negative battery 28ACB, and through the operated armature 2 of relay 28SA, lead 28ACL through cables 28C and 23C, and the operated armature 2 of relay 27PC1 to ground. When relay 28SA in the indicator control 2801 is operated, it connects the indicator allotter 2800, which is one of two allotters 2800 and 2901 that alternatively function, to seize an idle one of the four indicator circuits 26IND1–4.

The indicator allotters 2800 and 2901 are similar to the trunk allotter 1700 providing a walking sequence for timing the seizure of the circuits 26IND1–4 if the attendant does not answer as is hereinafter described.

If relay 28I0 is operated at this time, the operation of relay 28AC in turn causes the operation of the indicator relay 28I1, the lower winding of which is connected to the negative battery 28I1B and through the right normal armature of key 28I1K, the upper winding of the relay 28I0, the operated armature 3 of relay 28I0, the operated armature 3 and back contact of relay 28AC, to ground. The relay 28I0 was operated from ground on armature 1 of relay 28I4 through the normal armature 7 of relay 28I3, the normal armature 9 of relay 28I2, the normal armature 8 of relay 28I1, and the lower winding of relay 28I0, to the negative battery 28I0B.

If any one of the relays 28I1–3 is operated from a previous call, the next higher one of relays 28I2–4 will operate as is hereinafter described. If relay 28I1 is operated, for example as described above, the operating path through the lower winding of relay 28I0 is opened at armature 8 of relay 28I1 so that relay 28I0 is released. The operation of relay 28AC from the controller 2700 will cause the operation of relay 28I2, if relay 28I1 is operated, from the ground connection on the operated armature 3 of relay 28AC through the normal armature 2 of relay 28I0, the operated armature 4 of relay 28I1, the upper winding of relay 28I1, the normal armature 4 of key 28I2K, and the lower winding of relay 28I2 to the negative battery 28I2B. In this manner if one of the relays 28I1, 28I2 or 28I3 is operated from a previous call, the next higher one of relays 28I2, 28I3 and 28I4 is operated.

Returning now to the illustrative operation described above wherein none of the relays 28I1–3 is operated, when relay 28I1 operates, it in turn causes the operation of the relay 26C1 in the indicator circuit 26IND1. The indicator allotter 2800, in this manner, seizes an idle one of the four indicator circuits 26IND1–4 to provide an indication, as is hereinafter described, of the called subscriber being serviced. The operating path for the relay 26C1 in the indicator circuit 26IND1 is from ground on the operated armature 1 of relay 28AC through the back contact of normal armature 2 of relay 28HM, the operated armature 4 and front contact of relay 28I0, the operated armature 7 and front contact of relay 28I1, the winding of relay 28C1, to the negative battery 28C1B.

There is a corresponding relay 26C1 in each of the indicator circuits 26IND2–4 which is operated respectively upon the operation of the relays 28I2–4 in the indicator allotter 2800. The operation of the relays 28I1–4 in this manner effectively allots one of the four indicator circuits 26IND1–4. When relay 26C1 in the indicator circuit 26IND1 operates, it causes the energization of the lamp 26I1 by connecting ground through its operated armature 4 thereto since the lamp 26I1 is also connected to the negative battery 26I1B. The energization of the lamp 26I1 provides an indication that the indicator circuit 26IND1 has been selected.

The operation of the relay 26C1 also prepares the indicator circuit 26IND1 to ready the indicator connectors 2003–4 and 2101–2 and in addition causes the operation of the relay 23CB1 in the controller connector 2300 to set the controller connector 2300 to allot the controller 2900 for the next call. The operating path for relay 23CB1 from negative battery 23D1 is through the lower winding of relay 23CB1, the left normal armature of the key 23EA, the front contact and operated armature 4 of relay 23CA, the normal armature 3 of relay 23RCA, lead 23T5 through cable 22C through the now operated armature 9 of relay 26C1, to lead 26H through cable 26C2 and the operated armature 1 of relay 27PC1 in the controller 2700 to ground.

Returning now to the operation of the controller 2700 during the transmission of the three pulses of the units digit from the orginating end of the answering service equipment of the present invention, relay 27X is operated when relay 27PN releases upon the termination of the first pulse as described above. When the units digit is 1, as described above, the second pulse is also a minus potential so that the relay 27PN is once again operated over the ring lead 16TR1 from the originating end. The operation of relay 27PN connects ground from the normal armature of relay 27PP through the operated armature of relay 27PN, the operated armature 1 and front contact of relay 27X, the normal armature 1 and back contact of relay 27Y, to the winding of relay 27YN which is also connected through the resistor 27YR, to the negative battery 27YB so that relay 27YN accordingly operates.

At the termination of the second pulse, relay 27PN once again releases and causes the operation of relay 27Y in series with the winding of relay 27YN. The operating path for the relays 27Y and 27YN is from ground on the normal armature 1 of relay 23RCA, lead 27G1 through cable 23C, the normal armature 6 and back contact of relay 27PC, the back contact and normal armature 3 of relay 27SM, the winding of relay 27Y, the operated armature 4 of relay 27YN through the winding of relay 27YN and resistor 27YR to the battery 27YB. The relay 27YN in this manner locks to ground through the winding of relay 27Y. The ground connection from the normal armature 1 of relay 23RCA is provided, in this manner, to the parallel circuit connection comprising relays 27Y, 27YN, 27X and 27XN wherein the relays 27Y and 27YN and the relays 27X and 27XN are operated in series.

When the originating controller 1000 applies the third or last pulse, which in the illustration described herein is a positive pulse, to the ring lead 16TR1, relay 27PP operates from the ground connection on armature 1 of relay 27DC1 as described above. When relay 27PP opeartes, it in turn causes the operation of the relay 27ZP, the operating path of which is from ground on the normal armature of relay 27PN through the now operated armature of relay 27PP, the operated armature 3 of relay 27X, the operated armature 2 of relay 27Y through the winding of relay 27ZP and resistor 27ZR to the negative battery 27ZB. Relay 27ZP locks to ground through its operated armature 4, the normal armature 3 and back contact of relay 27SM, the back contact and normal armature 6 of relay 27PC, lead 27G1 through cable 23C, and the back contact and normal armature 1 of relay 23RCA. At the termination of the third pulse the relay 27PP releases but performs no immediate function thereby.

In this manner the three pulses which identify the units digit 1 of the called subscriber's line provide for the operation of the register relays 27XN, 27YN and 27ZP in the controller 2700. The following table indicates the register relay operation in the controller 2700 corresponding to the units or tens digits 0–9:

| Units or Tens Digit | Register Relay Operated | | |
|---|---|---|---|
| 0 | 27XN | ------ | ------ |
| 1 | 27XN | 27YN | 27ZP |
| 2 | 27XN | 27YN | 27ZN |
| 3 | 27XN | 27YP | 27ZN |
| 4 | 27XN | 27YP | 27ZP |
| 5 | 27XP | ------ | ------ |
| 6 | 27XP | 27YN | 27ZP |
| 7 | 27XP | 27YN | 27ZN |
| 8 | 27XP | 27YP | 27ZN |
| 9 | 27XP | 27YP | 27ZP |

As described above and indicated in the register relay table, the relays 27XN, 27YN and 27ZP are operated responsive to the pulsing of the units digit 1. The relay 27X is always operated at the termination of the first pulse and the relay 27Y is always operated at the termination of the second pulse. The symbols X, Y and Z of the register relay reference designations correspond to the first, second and third pulses, respectively, and the symbols P and N corerspond to positive and negative pulses. The register relay 27XN, for example, operates when the first pulse is negative and the register relay 27ZP operates when the third pulse is positive.

Also as descrbied above, when the controller 1000 in the originating end of the answering service equipment of the present invention completes pulsing the first or units digit, it connects battery 10D3 to the ring 16TR2 of the second trunk 16T2 causing relay 27DC to operate and in turn cause the operation of relay 27DC1. The operation of relay 27DC1 opens the signaling path, at its armature 1, through the ring lead 16TR1 and connects ground through its operated armature 2 to the winding of relay 27US. The winding of relay 27US is also connected to the battery 27USB and accordingly operates. Responsive to the operation of the relay 27US, under control of the operated ones of the register relays in the controller 2700, one of the select magnets 25S0–9, one of the select magnets 24S0–9 and one of the select magnets 19S0–9 are operated, in accordance with the units digit pulsed from the originating controller 1000. In the illustrative embodiment being described herein the operation of relay 27US causes the operation of the select magnet 25S1, the select magnet 19S1 and the select magnet 24S1, all corresponding to the units digit of 1. The operate paths for the select magnets 25S1, 24S1 and 19S1 are from the negative batteries 25S1B, 24S1B and 19S1B, respectively, through the windings of relays 25S1, 24S1 and 19S1 to leads 25L1, 24L1 and 19L1 which are connected together, and through cable 25C, the operated armature 2 of relay 27US, the operated armature 7 of relay 27XN, the operated armature 6 of relay 27YN, the operated armature 3 of relay 27ZP, the normal armature 1 of relay 27ZN, the normal armature 1 of relay 27YN, and the normal armature 1 of relay 27XP, to ground.

The operation of the three select magnets 25S1, 24S1 and 19S1 readies the three crossbar switches 2100, 2000 and 1900, respectively, which provide, as is hereinafter described, a trunk connection to the jack 18J91 and an operating path for the indicator lamp 18L91.

The operation of relay 25S1 extends the ground connection upon lead 25L1, through its operated armature, lead 25C1 through cable 25C, to the winding of relay 27SM which is also connected to the negative battery 27SMB, and accordingly operates.

The operation of the select magnet relay 27SM in the controller 2700 causes the release of the relays 27XN, 27YN and 27ZP, which were the operated ones of the register relays in the controller 2700, and also causes the release of the relays 27X, 27Y and 27US. The operating paths as described above for the relays 27XN, 27YN, 27ZP, 27X and 27Y were through the normal armature 3 of relay 27SM and the operating path of the relay 27US was through the normal armature 2 of relay 27SM also as described above.

The release of the relays 27XN, 27YN and 27ZP causes the operation of the relay 27PC by removing the ground connection shunting its lower winding through its normal armature 4. The operating path for relay 27PC is from ground on armature 2 of relay 23CB1, the operated armature 3 of relay 23CA, lead 23G through cable 23C, the operated armature 3 of relay 27PC1, the lower winding of relay 27PC and the upper winding of relay 27PC1 to negative battery 27PCB. The operation of relay 27PC in turn causes the operation of the relay 27PC2 by connecting ground through its operated armature 1 to the winding of relay 27PC2 which is also connected to the negative battery 27C2B.

When the relay 27SM operates, it also short-circuits the high resistance winding of the relay 27DC to reduce the resistance to ground on the ring 16TR2 of the second trunk 16T2 by connecting ground through the operated armature 4 of relay 27SM to the junction of the windings of relay 27DC. The originating controller 1000, as is hereinafter described, recognizes this change in condition as a signal to commence pulsing the tens digit.

When the high resistance winding of relay 27DC is shunted to ground, relay 10DC, which is connected to the ring lead 16TR1, as described above, is allowed to operate. When relay 10DC operates, it in turn causes the operation of relay 10DC1 by connecting ground to the winding thereof through its operated armature as the winding of relay 10DC1 is also connected to battery 10D10. The operation of relay 10DC1 completes an operating path for the winding of relay 10ST1 through the ring 16TR1 of trunk 16T1, permitting it to operate if one of the terminating controllers 2700 or 2900 is ready to receive pulsing. The winding of relay 10ST1 is connected to the ring 16TR1 through the normal armature 2 of relay 10DC2, rheostats 10KA and 10K, the operated armature 1 of relay 11STA1, the normal armature 1 and back contact of relay 11SS, lead 16S2, and the lower windings of coils 16TC1 and 16TC2. The winding of relay 10ST1 by the operation of relay 10DC1 is also connected to the battery 10D4 through the back contact of normal armature 2 of relay 10ST2, the operated armature 1 and front contact of relay 10PU, the back contact of normal armature 4 of relay 10PT1, and the operated armature 3 of relay 10DC1. The originating controller 1000, in this manner, again places battery 10D4 on the ring 16TR1 of the first trunk 16T1 to insure that the terminating controller 2700 is once again ready to receive pulsing. This path is through the windings of the relay 27PP and 27PN in the controller 2700, to ground through the operated armature 2 of relay 27PC and the operated armature 1 of relay 27DC1. At this time in the controller 2700, the relays 27DC, 27DC1, 27PC, 27PC1, 27PC2 and 27SM are operated with all the others being normal.

When relay 10DC1 operates, it also recycles the timing circuit 8T, briefly described above, in the start circuit 800. The operation of timing circuit 8T was initiated when relay 8C operated responsive to the operation of the auxiliary line circuit 7AUX91 at the start of a call. When relay 8C operates at the start of a call, it connects the positive potential source 8CC2 through lamp 8CCL2, and the winding of relay 8TAA, through operated armature 1 of relay 8C, to resistor 8F and capacitor 8VT1 which begins to charge. Before relay 8C operated capacitor 8VT1 was connected to ground through the normal armature 3 of relay 8C and resistor 8D7 to ground. The capacitor 8VT1 is connected through resistor 8T1 to the start anode of the gaseous triode 8VT which is ionized after approximately four seconds under control of the capacitor 8VT1 if relay 10DC1, described above, does not operate. Relay 10DC1 will not operate if some trouble occurs prior to or during the pulsing of the units digit. If, however, no trouble condition exists as described above in the illustrative example, relay 10DC1 operates before the gas tube 8VT ionizes. When relay 10DC1 operates, it transfers the connection from ground at resistor 8D7 from a capacitor 8TT1 to the capacitor 8VT1. Resistor 8D7 is connected, upon the operation of relay 10DC1, through the operated armature 1 of relay 11STA, the operated armature 6 of relay 10DC1, lead 11A5 through cable 10C1 to the capacitor 8VT1. With ground transferred to capacitor 8VT1, it starts to discharge. The removal of the ground through lead 8A1, and the normal armature 6 of relay 10DC1 from capacitor 8TT1 allows capacitor 8TT1 to charge from source 8CC2 through the operated armature 1 of relay 8C and resistor 8H1. Once again the timing circuit 8T commences a timing function, but this time utilizing the tube 8TT instead of the tube 8VT. In this manner when relay 10DC1 operates it recycles the circuit 8T.

After another four-second interval under control of capacitor 8TT1, the tube 8TT is ionized if relay 10DC1 does not release. Relay 10DC1 is released, as is hereinafter described, after the tens digit is pulsed to the terminating end if no trouble condition exists during the second interval. If other calls are waiting to be served, relay 8C does not release and the timing cycle is repeated in circuit 8T. When the last waiting call is served, relay 8C is released and the timing circuit 8T is returned to normal with both capacitors 8VT1 and 8TT1 discharged.

If relay 10DC1 does not operate during the first timing interval, the tube 8VT ionizes, and if relay 10DC1 does not release during the second timing interval, tube 8TT ionizes. If either one of the tubes 8VT or 8TT ionizes, it causes the operation of relay 8TAA which is connected to the source 8CC2 and also to the anodes of tubes 8VT and 8TT. In this manner if for any reason the circuit 8T completes a timing function with either tube 8VT or 8TT ionizing, relay 8TAA is operated to register a trouble condition.

When relay 8TAA operates, it causes the operation of relays 8TAD, 8TAB and 11SS which provide respectively for the provision of an audible and visual alarm, the release of the various operated components in the originating and terminating end, and the switching to an auxiliary signaling path.

Relay 8TAD is operated over a path from ground through the operated armature 1 of relay 8TAA, the winding of relay 8TAD to battery 8D8. When relay 8TAD operates, it locks to ground through its operated armature 3, key 8AR and its operated armature 2. The operation of relay 2TAD provides a locking circuit for the relays 4TK1, 4U11, 4CA and 4T19 in the indicator circuit 400 and operates the audible and visual alarm signals of the office alarm circuit 601. Ground is provided from the operated armature of relay 8TAA through lead 8LL1 and the operated armatures of relays 4U11, 4CA and 4T19 to the windings of relays 4U11, 4CA and 4T19 and through lead 8LL2 and the operated armature of relay 4TK1 to the winding of relay 4TK1. The operated ones of relays 4U11, 4CA, 4T19 and 4TK1 will be held operated to indicate the progress of the call when it times out. Ground through the operated armature 2 of relay 8TAD is also connected through the key 8AR to the alarm circuit 601 which provides an audible and visual alarm indication.

Relay 8TAA operates relay 11SS by connecting ground through the operated armature 3 of relay 8TAA to the winding of relay 11SS which is also connected to battery 11D3. When relay 11SS operates, it extends its operating ground through its armature 2, to the lamp 8TR which is connected to battery 8D10. The lamp 8TR is also connected to ground through the operated armature 5 of relay 8TAD so that the operation of either relay 11SS or relay 8TAD causes the energization of lamp 8TR. Relay 11SS in this manner locks under control of relay 8TAD. The operation of relay 11SS transfers the pulsing and signal path through ring leads 16TR1 and 16TR2 to pass through the ring leads 16TR3 and 16TR4. The operation of armature 1 of relay 11SS transfers the connection from controller 1000 through the operated armature 1 of relay 11STA1 to lead 11R3 which is connected to lead 16TR3 in trunk 16T3 instead of to lead 16S2 which is connected to lead 16TR1 in trunk 16T1. The operation of armature 3 of relay 11SS transfers the connection from controller 1000 to lead 11R4 which is connected to lead 16TR4 in trunk 16T4 instead of to lead 11SS1 which is connected to lead 16TR2 in trunk 16T2. When relay 8TAB operates it signals to the terminating end to shift in a similar manner to the leads 16TR3 and 16TR4.

Relay 8TAA operates relay 8TAB by connecting ground through the operated armature 2 of relay 8TAA to the winding of relay 8TAB which is also connected to battery 8D9. When relay 8TAB operates, it provides an additional locking path through its armature 5 for relay 5LO1 in the identifier 500; it operates relay 8TAC; it provides a signal to the terminating end to shift to leads 16TR3 and 16TR4; and it releases together with relay 8TAC the preferred units relay in the identifier 500. The operating path for relay 8TAC is from ground through the operated armature 9 of relay 8TAB and the winding of relay 8TAC to battery 8D11. The units relay 5U1, which is the preferred units relay, was locked to ground as described above through the normal armature 8 of relay 8TAB, and accordingly releases when relay 8TAB is operated.

When relay 8TAB operates, it connects the source 8CC2 through lamp 8CCL2, resistor 8R8, through the operated armature 6 of relay 8TAB to lead 8TA1, the upper windings of coils 16TC2 and 16TC1, the tip lead 16TT1, the upper windings of coils 22TC2 and 22TC1, lead 22L1 through cable 22C, the varistor 22V2 and the winding of the recycle relay 23RC to ground. When relay 23RC operates, it in turn causes the operation of relay 23RCA by connecting ground through the operated armature of relay 23RC and the winding of relay 23RCA to the battery 23D6. The operation of relay 23RCA in turn causes the operation of relay 23T0 by connecting ground through the operated armature 2 of relay 23RCA through the lower winding of relay 23T0 to the battery 23D4. When relay 23T0 operates, it locks to ground through its upper winding, its operated armature 2, the normal armature of key 23AR1 and the normal armature of relay 23AR2 to ground.

When relay 23RCA operates, it also removes the locking ground at its armature 1 for the register relays in the controller 2700 causing them to release if they are operated at this time. The release of any of the register relays in the controller 2700 in turn causes the release of the relays 27PC, 27PC1 and 27PC2 if they are operated as is hereinafter described in reference to the release of the controller 2700 after the registration of the tens digit.

When relay 23T0 operates, it connects ground through its operated armature 4 to the lamp 23LA, which is also connected to the battery 23D5, to indicate the time-out operation; it causes the operation of either relay 23CB or 23CB1 to provide for the utilization of either the controller 2700 or 2900 which was not in service at the time that the time-out occurred; and it transfers the pulsing and signaling leads from the ring leads 16TR1 and 16TR2 to the ring leads 16TR3 and 16TR4 to conform with the transfer of the pulsing and signaling leads made in the originating end as described above. The operation of armature 1 of relay 23T0 transfers the connection from the ring lead 16TR1 to the ring lead 16TR3 and the operation of the armature 3 of relay 23T0 transfers the connection from the ring lead 16TR2 to the ring lead 16TR4. Returning now to the start circuit 800 in the originating end, when relay 8TAC releases it causes the release of the relays 8H and 8C by opening the operating path respectively through its armatures 6 and 1. When relay 8H releases it in turn causes the release of the relay 8HA by opening the operating path therefor through its armatures 1 and 6 and the release of relay 8CTA as is hereinafter described. When relay 8HA releases it in turn causes the release of the relay 11ST by opening the operating path therefor through its normal armature 3. The release of relay 11ST prepares the controller connector 1100 to select the controller 1400 for the next call instead of the controller 1000.

When relay 8C releases in the start circuit 800, it in turn causes the release of the relay 8TAA and the ionized one of the tubes 8VT and 8TT, the operating paths of which are through the operated armature 1 of relay 8C. When relay 8TAA releases, it in turn causes the release of the relay 8TAB by opening its operating path through the normal armature 3 of relay 8TAA. When relay 8TAB releases, it causes the release of relay 8TAC by opening its operating path through the normal armature 9 of relay 8TAB and also together with the released relay 8TAC causes the release of the lockout relay 5LL1 when relay 8TAC releases.

When the key 8AR is operated by the attendant responsive to the indication by the lamp 8TR and the alarm circuit 601, the alarm circuit 601 is released and relay 8TAD is also released if the trouble has been cleared, and the circuit restores to normal. When the circuit is restored to normal, relay 8C can once again operate to start the sequences of events for the next call. When relay 8TAD releases, it in turn causes the release of relay 11SS which shifts back the connections to the ring leads to its standard condition to the ring leads 16TR1 and 16TR2 and provides an indication to the terminating end to ring back in a like manner. This method of operation insures that the pulsing and signaling leads are always matched at both ends of the system. The operation of the key 23AR1 in the connector 2300 causes the release of relay 23T0 which transfers the pulsing and signaling leads back to the ring leads 16TR1 and 16TR2. The operation of the alarm release key 8AR in the originating end causes the operation of the relay 23AR2 in the connector 2300 which in turn can also release the relay 23T0 if it is still operated and so provide for the transfer of the pulsing and signaling leads.

Relay 10ST1, which is connected as described above to the ring lead 16TR1, operates when controller 2700 is available and ground is connected to lead 16TR1 thereby. The operation of relay 10ST1 in turn causes the operation of relay 10ST2 by extending the connection to battery 10D4 through its operated armature to the upper winding of relay 10ST2. The operation of relay 10ST2, as described above, starts the pulse generator comprising the relays 10PG and 10P and the capacitor 10PGC operates relay 10W and releases relays 10ST1 and 10P.

The pulse generating circuit comprising the relays 10PG and 10P and the capacitor 10PGC repeat the cycle of operations described above in reference to pulsing the units digit. With relay 10P released either a plus potential, a minus potential or an open, depending upon which one of the tens relays 15T0–9 is operated, is connected to the ring 16TR1 of the trunk 16T1 to signal the first pulse of the tens digit. With relay 15T9 operated in accordance with a tens digit of 9, the first pulse is a positive pulse and the source 8CC2 is connected through lamp 8CCL2, lead 8CC+ through cable 10C1, operated armature 2 of relay 11SA1, lead 11A9, lead 11F9, the operated armature 6 of relay 15T9, the serially connected normal armatures 6 of relays 15T8 through 15T0, lead 15E through cable 15C1, the front contact and operated armature 8 of relay 10DC1, resistors 10V and 10U, the upper normal armature of jack 10PJ, the released armature of relay 10P, the lower normal armature of jack 10PJ, rheostats 10KA and 10K, the operated armature 1 of relay 11STA1, the normal armature 1 and back contact of relay 11SS, lead 16S2, the serially connected lower windings of coils 16TC1 and 16TC2, ring lead 16TR1 through cable 16C, the serially connected lower windings of coils 22TC2 and 22TC1, lead 22R0 through cable 22C, the back contact and normal armature 1 of relay 23T0, the operated armature 1 and front contact of relay 23CA, lead 23R0 through cable 23C, the windings of relays 27PP and 27PN, the operated armature 2 of relay 27PC, and the operated armature 1 of relay 27DC to ground. When relay 10DC1 operated, it transferred at its armature 8 the pulsing path to pass through the tens identifier 1500 instead of through the units identifier 500. The units identifier in any event was released, as described above, after the pulsing of the units digit.

When the capacitor 10PGC is charged from the ground on the operated armature 3 of relay 10ST2, relay 10PG operates as described above in reference to the operation of the pulse generator circuit to cause the operation of relays 10P and 10X to terminate the first pulse. When relay 10PG operates, it also initiates the discharge of the capacitor 10PGC which in turn thereafter causes relay 10PG to release. When relay 10PG releases for the second time, it causes the release of relay 10P and the operation of relay 10Y to commence the second pulse. When relay 10P is released, it connects plus potential source 8CC2, over the same path as provided for the first pulse, to the ring 16TR1 to signal the second pulse of the tens digit 9.

When the capacitor 10PGC is charged, relay 10PG reoperates for the second time and causes the operation of relays 10P and 10Z to terminate the second pulse. When relay 10PG thereafter releases it causes the operation of relay 10PT1 and releases relay 10P to apply the third pulse of the tens digit 9, which is also positive, to the ring 16TR1. The upper winding of relay 10TP1 is connected to the battery 10D6 and through the back contact and operated armature 2 of relay 10DC1, the operated armature 7 and front contact of relay 10Z, the operated armature of relay 10PG and the front contact and operated armature 3 of relay 10ST2, to ground.

When relay 10PT1 operates, it causes the operation of relay 10DC2 the winding of which is connected to ground and through the operated armature 4 and front contact of relay 10PT1, the operated armature 3 and front contact of relay 10DC1, to the negative battery 10D4. When relay 10DC2 operates, it in turn locks through its operated armature 3 and the operated armatures 6 of relays 11ST and 11STA and opens the operating path of the already released relay 10ST1 which was through the normal armature 2 of relay 10DC2.

When relay 10PG reoperates for the third time, it reoperates relay 10P to terminate the third pulse of the tens digit and also causes the release of relay 10ST2. The operating path for the lower winding of relay 10ST2 was through the operated armature 7 and front contact of relay 10Z, the operated armature of relay 10PG, and the front contact and operated armature 3 of relay 10ST2 to ground. When relay 10ST2 releases, it releases the relays 10W, 10X, 10Y, 10Z and 10PG by opening the connection to ground at its armature 3 to stop the pulse generator and also releases the relays 10PU and 10DC. The operation path for relay 10PU is through its upper winding and through its operated armature 4, and the operated armature 4 of relay 10ST2 to ground and the operating path for relay 10DC is through the operated armature 3 of relay 10PU and the operated armature 1 of relay 10ST2, the operated armature 1 of relay 10DC1, the normal armature 3 and back contact of relay 11SS, lead 11SS1, trunk 16T2 to ring lead 16TR2. The operation of relay 10ST2 therefore causes the release of relay 10DC and functions thereby to remove the battery 10D3 from the ring lead 16TR2 as a signal to the terminating equipment that the pulsing operation is completed.

When relay 10PU releases, it effects, as is hereinafter described, the release of the controller 1000 and also of the controller connector 1100.

In the illustrative operation of the embodiment of the present invention, with the tens digit being 9, the three pulses are all, as described above, positive. As also described above, for the digit 9 with all three pulses positive, the register relays 27XP, 27YP and 27ZP are operated. On the first pulse from the originating controller 1000, relay 27PP operates from ground on the operated armature 1 of relay 27DC1. The operation of relay 27PP causes the operation of relay 27XP by connecting ground through the normal armature of relay 27PN, the operated armature of relay 27PP, the normal armature 2 of relay 27X to the winding of relay 27XP which is also connected through the resistor 27XR to the battery 27XB.

When the first positive pulse corresponding to the digit 9 is removed from the ring 16TR1, relay 27PP releases and causes the operation of relay 27X in series with the winding of relay 27XP to ground on the normal armature 1 of relay 23RCA in a similar manner as described above for the series operation of the register relays in the controller 2700 with the relays 27X and 27Y for the registration of the units digit.

The second pulse, which is also a positive pulse, once again operates the relay 27PP to cause the relay 27YP to operate from ground on the normal armature of relay 27PN through the operated armature of relay 27PP, the operated armature 3 of relay 27X, the normal armature 3 of relay 27Y to the winding of relay 27YP which is also connected through the resistor 27YR to the negative battery 27YB. When relay 27PP releases at the termination of the second positive pulse, it causes the operation of the relay 27Y in series with the relay 27YP to ground on the normal armature 1 of relay 23RCA.

The third pulse, which is also positive, reoperates relay 27PP which in turn causes the operation of relay 27ZP from ground on the normal armature of relay 27PN through the operated armature of relay 27PP, the operated armature 3 of relay 27X, the operated armature 2 of relay 27Y, to the winding of relay 27ZP which is also connected through resistor 27ZR to the negative battery 27ZB.

At the completion of pulsing the tens digit, as described above, the originating controller 1000 removes battery 10D3 from the ring 16TR2 to cause the release of relay 27DC in the controller 2700 which in turn removes the ground connection to cause the release of relay 27DC1. When relay 27DC1 releases, it causes the operation of the relay 27TS by connecting ground from the normal armature 1 of relay 23RCA through lead 27G1 which passes through cable 23C, the operated armature 6 and front contact of relay 27PC, and the now normal armature 3 of relay 27DC1 to the winding of relay 27TS which is also connected to the negative battery 27TSB. The operation of relay 27TS at the termination of the pulsing operation provides, as is hereinafter described, for the operation of the crossbar switches 1900, 2000 and 2100 to extend connections to the lamp 18L91 and jack 18J91.

Returning to the controller 1000 in the originating end, the release of relay 10PU after the pulsing of the tens digit and release of relay 10ST2 causes the release of the controller 1000 and the controller connector 1100. When relay 10PU releases, it in turn releases the relays 10PU1, 10PT1 and 10DC by opening the operating path of relay 10PU1 at the operated armature 2 of relay 10PU; the operating path of relay 10DC at the operated armature 3 of relay 10PU; and the lower operating path of relay 10PT1 which is through its operated armature 3, at the operated armature 5 of relay 10PU to ground. The release of relays 10PT1 and 10DC in turn causes the release of relay 10DC1 which was connected to ground through the operated armature of relay 10DC and also through cable 10C1 and the normal armature 2 of relay front contact and operated armature 2 of relay 10PT1, the left normal armature of key 10RST, lead 10RS1 through cable 10C1 and the normal structure 2 of relay 8TAC to ground. When relay 10PU1 releases, it in turn causes the release of the relay 8H in the start circuit 800, and the relay 15T9 in the tens identifier 1500 and opens an operating path for the relay 16TS in the trunk 16T1. The operating path for relay 16TS which remains operated through armature 3 of relay 17TA0 from battery 16D1 through the winding of relay 16TS, the operated armature 6 of relay 17TA1, the operated armature 3 of relay 17TA0, lead 17L2 and the operated armature 5 of relay 10PU1 to ground. The operating path for relay 15T9 from the battery 15B9 was through the winding of relay 15T9, the operated armature 3 of relay 15T9, lead 15A through cable 15C1 and the operated armature 3 of relay 10PU1 to ground. The operating path for relay 8H was from ground through the operated armature 4 of relay 10PU1, the operated armature 1 and front contact of relays 11ST, the normal armature 1 of relay 8TAC, the operated armature 3 of relay 8H through the windings of relay 8H to batteries 8DA and 8DB.

When relay 8H releases, it releases the hold magnets 13H8 and 13H9 of the tens indentifier connector 1300 and also removes ground, which was connected through its operated armature 1 and resistors 8R2 and 8R3, from the starting anode of the timing tube 8CTA. When the ground connection from the armature 1 of relay 8H is removed from the starting anode of tube 8CTA, ionization is initiated across the starting gap of tube 8CTA after a delay determined essentially by the capacitor 8C4 which is connected between ground and the junction of resistors 8R2 and 8R3. The anode of tube 8CTA is connected to the starting anode through the resistors 8R4 and 8R3 and through the lead 8L3, the operated armature 2 of relay 8HA, the winding of relay 8CT, the back contacts of normal armatures 3 and 4 of relay 8H, the normal armature 1 of relay 8TAC, the operated armature 1 of relay 11ST, the normal armature 1 of relay 10DC2 and the normal armature 4 of relay 10DC1 to ground. After the initiation of ionization between the starting anode and the cathode, ionization is transferred across the main gap between the cathode and the main anode thereof, the cathode is connected to the negative potential source 8D3 through the resistor 8R5. In this manner when the relay 8H releases, it commences the operation of the timing circuit comprising the tube 8CTA and capacitor 8C4 which after a period of approximately one-half second breaks down and causes the operation of the relay 8CT, the windings of which are serially connected in the conductive path for tube 8CTA as described above. When relay 8CT operates, it causes the release of the relay 8HA, the operating path of which is from ground through the normal armature 4 of relay 8TAA, the normal armature 1 of relay 8CT, the operated armature 4 of relay 8HA through the windings of relay 8HA to batteries 8HA1 and 8HA2. When relay 8HA releases it opens the conductive path at its armature 2 for the tube 8CTA causing it to extinguish. When realy 8HA releases, it also releases the controller connector 1100 by opening the operating path through its armature 3 for the relay 11ST.

When relay 11ST releases, it prepares the controller connector 1100 for the operation of relay 11STB instead of relay 11STA. When relay 8HA operates during the next call, the operating path from the armature 3 of relay 8HA is transferred at the armature 4 of relay 11ST from the upper winding of relay 11STA to the winding of relay 11STB. Relay 11STA, however, remains operated at this time on its secondary or lower winding which is connected to the battery 11DA1 and also through the operated armature 5 of relay 11STA, the normal armature of key 11EA and the normal armature 5 of relay 11STB to ground. When the next call is originated it will be served by the controller 1400 instead of the controller 1000 since relay 11ST will be normal. When the next call is originated and relay 8HA is operated, relay 11STB in turn will be operated to provide the connections through cable 11C4 to the controller 1400 and also will cause the release of relay 11STA by removing ground at its armature 5. When relay 11STA is released during the origination of the second or next call, it reconnects battery 11DA1 through its operated armature 6 to cause the operation of relay 11ST so that controller 1000 will be utilized for the third call. In this manner the controllers 1000 and 1400 are alternately utilized on successive calls under control of the controller connector 1100.

The release of relay 11ST during the first call in turn causes the release of the relay 11STA1 by opening the operating path therefor through its armature 2. With relays 11ST and 11STA1 released, the controller connector 1100 is in a released or normal condition and ready for use for the next call.

When relay 11ST releases, it also causes the release of the relay 10DC2 in the controller 1000 the operating path of which is from ground through the winding of relay 10DC2, the operated armature 3 of relay 10DC2, the operated armature 6 of relay 11ST and the operated armature 6 of relay 11STA to the negative battery 11DA1. When relay 10DC2 is released in this manner, the controller 1000 is disconnected from the controller connector 1100 and is therefore in its released or normal condition ready for use for the next call applied thereto.

When relay 11ST releases, it also causes the release of the relay 17T in the trunk allotter 1700. The operating path for relay 17T from battery 17C1 is through the winding of relay 17T, lead 11T1 through cable 6C, the normal armature 2 of relay 6AA1, lead 11T through cable 11C, the operated armature 3 of relay 11STA and the operated armature 3 of relay 11ST. When relay 17T releases, it in turn causes the release of the relays 17TA0 and 17TC. The operating path for relay 17TC was through its operated armature 2 and the operated armature 2 of relay 17T and the operating path for relay 17TA0 was through its upper winding, its operated armature 2 and the operated armature 3 of relay 17T. With the relays 17T, 17TC and 17TA0 released, and only relay 17TA1 operated, the trunk allotter 1700 is ready for utilization on the next call.

When relay 17TA0 releases, it opens at its armature 3 the operating path for relay 16TS causing it to release and commences an allotter trunk walking sequence whereby the relays 17TA2–4 are operated and released successively under control of the relay 17ADV as is hereinafter described. The allotter trunk walking sequence times the seizure of the trunk 16T1 and maintains the connections through the trunk connectors 900 and 1900T for a period of approximately one and one-half seconds. At the expiration of the one and one-half seconds, if the answering bureau attendant does not respond, the allotter 1700 restores the trunk connectors 900 and 1900T removing the connections to the attendant. If the attendant, as is hereinafter described, answers during the one and one-half second walking sequence, the operating path for the advance relay 17ADV is opened and the timing function is halted. With relay 17TA1 operated, the advance relay 17ADV is operated over a path from battery 17C7, winding of relay 17ADV, the normal armature 1 of relay 17ADV1, the operated armature 4 of relay 16S1, the normal armature 1 of relay 17TB1, the back contacts of the normal armatures 6 of relays 17TA4–2, the operated armature 7 of relay 17TA1 and the normal armature 1 of relay 17TC to ground.

The operation of the relay 17ADV commences the trunk allotter walking sequence, briefly described above, to time the seizure of trunk 16T1. When relay 17ADV operates, it in turn causes the operation of relay 17ADV1 by connecting ground through the operated armature 2 of relay 17ADV to the winding of relay 17ADV1 which is also connected to battery 17C6. When relay 17ADV1 operates, it causes the slow release of relay 17ADV by opening its operating path through armature 1 of relay 17ADV1. When relay 17ADV thereafter releases it causes the operation of relay 17T and the release of relay 17ADV1. The operating path for relay 17ADV1 is through the operated armature 2 of relay 17ADV and the operating path for relay 17T is from battery 17C2 through the operated armature 2 of relay 17ADV1 and the normal armature 1 of relay 17ADV. Since the relay 17ADV1 is slow to release relay 17T is maintained operated for a short interval of time. When relay 17T operates it in turn causes the operation of the relay 17TA2 in series with the relay 17TA1. The operating path from battery 17TC2 is through the lower winding of relay 17TA1, the back contact and normal armature 4 of relay 17TB2, the upper winding of relay TA1, the front contact and operated armature 4 of relay 17TA1, the back contact and normal armature 2 of relay 17TA0 and the operated armature 3 and front contact of relay 17T to ground. With relays 17TA1 and 17TA2 operated, the relay 16TS in the trunk 16T2 will operate due to the ground connection from the normal armature 1 of relay 17TC which is connected through the operated armature 7 of relay 17TA1, the front contact and operated armature 6 of relay 17TA2, lead 17L4 through cable 17C8 to the winding of the relay 16TS in the trunk 16T2.

When the slow release relay 17ADV1 finally releases, it in turn opens the operating path through its armature 2 for relay 17T causing it to release. When relay 17T thereafter releases, it causes the release of the relay 17A1 the operating path of which was through the operated armature 3 of relay 17T to ground. Relay 17TA2, however, remains operated from ground through the normal armature 3 of relay 17T, the normal armature 2 of relay 17TB3, the operated armature 1 of relay 17TA2, the normal armatures 5 of relays 17TA4 and 17TA3, the operated armature 5 of relay 17TA2, the normal armature 4 of relay 17TB2, and the lower winding of relay 17TA2 to battery 17TC2. This cycle of events under control of relays 17ADV and 17ADV1 is thereafter repeated to operate and release relays 17TA3 and 17TA4. When relay 17TA4 releases, it causes the operation of relay 17TA0 by connecting ground from the normal armature 1 of relay 17TC through the normal armatures 7 of relays 17TA1–4 through resistor 17R and the lower winding of relay 17TA0 to the battery 17T0. When relay 17TA0 operates, relays 17ADV and 17ADV1 operate in order and subsequently release in order in a similar manner as described above. The release of relay 17ADV causes the operation of relay 17T which in turn operates relay 17TA1. When relay 17TA1 operates, ground from the normal armature 1 of relay 17TC is connected through the operated armature 3 of relay 17TA0 and the operated armature 6 of relay 17TA1 to the winding of relay 16TS. When relay 16TS operates, it causes the release of the seizure relay 16S1 by removing battery 16D2 which was connected thereto through its normal armature 7. When relay 16S1 releases, it releases the operated one of relay 16C11 or 16C10, releases hold magnet 12HS which is providing the connection between the trunk 16T1 and the subscriber's auxiliary line 7P91 and opens the operating path for relay 17ADC to stop the walking or timing operation of the allotter 1700. In this manner if the attendant does not answer for one and one-half seconds, the trunk 16T1 is released.

When relay 17ADV1 finally operates, it causes the release of the relay 17T which releases in turn the relay 17TA0. When relay 17TA0 releases, it once again causes relay 16TS to release. When the relay 17TA0 releases, relay 17TA1, however, remains operated over a path from ground through the normal armature 3 of relay 17T, the normal armature 2 of relay 17TB2, the operated armature 1 of relay 17TA1, the normal armature 5 of relays 17TA4–2, the operated armature 5 of relay 17TA1, the normal armature 4 of relay 17TB1, and the lower winding of relay 17TA1 to battery 17TC1. When the trunk allotter 1700 is next utilized, relay 17TA2 will be utilized and trunk 16T2 allotted.

Keys 17TBJ1–4 are provided in the trunk allotter 1700 to permit making any trunk 16T1–4 busy for maintenance. With the trunk made busy the allotter 1700 functions as described above with the exception that the operated one of keys 17TBJ1–4 shifts the operated path for the associated one of relays 17TA1–4 to the next higher numbered one thereof. When a trunk 16T2–4 is busy, the walking sequence takes less time to release trunk 16T1 since one of the relays 17TA2–4 is not operated and released in the walking sequence. If all three trunks 16T2–4 are busy and trunk 16T1 is allotted, as described above, the allotter 1700 functions in approximately one-half second, if the answering bureau atttendant fails to respond, to release the trunk 16T1.

When the trunk 16T1 is allotted, and the attendant in the answering bureau does not plug into jack 18J91, the trunk allotter 1700, by means of the walking sequence as described above, causes relay 17S1 to release and return the trunk 16T1 and the trunk connector 900 to normal. When relay 16S1 in trunk 16T1 releases, it removes battery 16D3 from the tip 16TT1 to cause relay 22TC in the terminating trunk 22T1 to release. When relay 22TC releases, it removes the locking ground for relays 22TCO1, 22E and 21D allowing them to release thereby restoring the terminating trunk connector 1900T and the trunk 22T1 ready for the next call.

The above-described release operations occur when the attendant does not answer during the walking sequence of trunk allotter 1700. If the attendant, as is hereinafter described, answers during the walking sequence, the operating path for relay 17ADV is opened at armature 4 of relay 16S1 and the timing function is halted.

As described above, when the originating controller 1000 removes battery 10D3 from the ring 16TR2 at the completion of pulsing the tens digit to result the operation of the relay 27TS in the controller 2700, the operation of the relay 27TS provides for the operation of the crossbar switches 1900, 2000 and 2100 which are part of a trunk connector 1900T to establish connections therethrough to the lamp 18L91 and the jack 18J91 associated therewith. The operation of relay 27TS performs the following specific functions:

(1) The operation of hold magnet 21F1;
(2) The operation of relays 26A and 26C;
(3) The operation of the hold magnet 21D; and
(4) The operation of relay 22E.

The operation of relay 27TS causes the operation of either the hold magnet 21E1 or 21F1 in the crossbar switch 2100 depending upon whether the subscriber's identification number is 0 to 49 or 50 to 99. When the subscriber's identification number is one of the numbers from 0 to 49, the hold magnet 21E1 is operated and when the subscriber's identification number is one of the numbers from 50 to 99, the hold magnet 21F1 is operated. The right four verticals of the crossbar switches 2000 and 2100 form essentially the indicator connectors 2003–4 and 2101–2 with two verticals or one of the connectors being assigned to each of the indicator circuits 26IND1–4. For example, the two verticals in connector 2101 associated with the hold magnets 21E1 and 21F1 correspond to the indicator circuit 26IND1 which is being utilized in the illustrative embodiment described herein; the two verticals in connector 2102 associated with the hold magnets 21E2 and 21F2 correspond to the indicator circuit 26IND2; the two verticals in connector 2003 which are associated with the hold magnets 20E1 and 20F1 correspond to the indicator circuit 26IND3; and the two verticals in connector 2004 associated with the hold magnets 20E2 and 20F2 correspond to the indicator circuit 26IND4. With the indicator circuit 26IND1 being utilized and with a subscriber's identification number of 91, the hold magnet 21F1 is operated over a path from the battery 21D6 through the winding of the hold magnet 21F1, the operated armature 1 of relay 26C1, lead 26F through cable 26C2, the now operated armature 2 of relay 27TS, the operated armature 2 of relay 27XP and the operated armature 2 of relay 27PC2 to ground. In accordance with the register relay table above, relay 27XP is operated whenever the digit is 5 through 9. When the digit is less than 5 and the relay 27XN is operated a conductive path is provided to ground through its operated armature 2 to cause the operation of the hold magnet 21E1 instead of the hold magnet 21F1. In this manner when the relay 27XN is operated during the registration of the tens digit, hold magnet 21E1 of the indicator connector 2101 of the crossbar switch 2100, which corresponds to the indicator circuit 26IND1, is operated and when the register relay 27XP is operated the hold magnet 21F1 is operated. The operation of hold magnet 21F1 together with the operation of the select magnet 25S1, described above, closes contacts which extend a path from the five tip leads 18T51, 18T61, 18T71, 18T81 and 18T91, respectively, through the indicator connector 2101 in the crossbar switch 2100 to the indicator circuit 26IND1. These five tip leads are connected from the jacks 18J51, 18J61, 18J71, 18J81 and 18J91, respectively, which are part of the switchboard 1800, through cable 18C, the trunk connector 1900T and the leads 25L1–5 to the indicator circuit 26IND1. The tip lead 18T91 in particular is extended from the jack 18J91 through cable 18C and cable 18C1, lead 19T91, cable 18C4 through cable 18C5, the operated armature or crosspoint 21C91 and lead 21L5 to the indicator circuit 26IND1.

When relay 27TS operates, it also causes the operation of a selected combination of the relays 26A, 26B and 26C in the indicator circuit 26IND1 depending upon the tens digit registered in the controller 2700. The operation of a combination of the relays 26A, 26B and 26C extends one of the leads 25L1–5 through the indicator circuit 26IND1 to battery 23D7 in the controller connector 2300 to cause the energization of one of the lamps 18L0–99. With a tens digit of 9, in accordance with the illustrative example described herein, the relays 26A and 26C are operated to extend the lead 25L5 through the indicator circuit 26IND1. Combinations of indicator relays 26A, 26B and 26C are selectively operated in accordance with the following table:

| Tens Digit Registered | Operated Relays 26A, 26B and 26C | | |
|---|---|---|---|
| 0 or 5 | ------- | ------- | ------- |
| 1 or 6 | ------- | 26B | 26C |
| 2 or 7 | ------- | ------- | 26C |
| 3 or 8 | 26A | 26B | 26C |
| 4 or 9 | 26A | ------- | 26C |

The operating path for relay 26A from battery 26D3 is through the winding of relay 26A, the operated armature 5 of relay 26C1, lead 26A1 through cable 26C2, the operated armature 3 of relay 27TS, the operated armature 1 of relay 27YP and the normal armature 1 of relay 27XN to ground and the operating path for relay 26C from battery 26D1 is through the winding of relay 26C, the operated armature 7 of relay 26C1, lead 26C4 through cable 26C2, the operated armature 5 of relay 27TS, the operated armature 1 of relay 27ZP, the normal armature 1 of relay 27YN and the normal armature 1 of relay 27XN to ground. The combination of indicator relays 26A, 26B and 26C that are operated in this manner depends upon the operated combination of register relays in the controller 2700 and the operated combination of register relays depends, as described above, upon the tens digit of the subscriber's identifying number. With relays 26A and 26C operated, the lead 25L5 from the indicator connector 2101 in the cross bar switch 2100 is extended through the operated armature 1 of relay 26A, the normal armature 1 of relay 26B, the operated armature 1 of relay 26C, the winding of relay 26C1A, fuse 23F1 to negative battery 23D7 causing the relays 26C1A, 18I91 and lamp 18L91 to operate in series. Since the tip lead 18T91 is connected through the upper armature of jack 18J91 through lamp 18L91 and the winding of relay 18I to ground the lamp 18L91, relays 18I and 26C1A are operated. The energization of lamp 18L91 provides a visual indication to the answering bureau attendant that the subscriber's line 7P91 is being called. The operation of relay 18I connects ground to the winding of relay 18P which is also connected to the battery 18D and accordingly operates. The operation of relay 18P connects ground from its operated armature 1 to the pilot lamp 18PL which is also connected to the negative battery 18DL and accordingly becomes energized to provide an indication of the operation of switchboard 1800. When relay 18P operates, it also closes a circuit from the ringing supply 18RS through the key 18PS, the operated armature 2 of relay 18P and the winding of the buzzer relay 18PB to provide an audible indication to the answering bureau attendant that a call is waiting to be serviced.

The operation of relay 26C1A performs no function at the present time but provides a locking ground for the hold magnet 21E1 when the relay 26C1, as is hereinafter described, releases. When relay 28HM operates as is hereinafter described, it opens the operating path through the back contacts of its armatures 1 and 2 for the relay 26C1 in the indicator circuit 26IND1 causing it to release.

The operation of hold magnet 21F1 together with the select magnet 25S1 closes ground through the armature or crosspoint 21G91 in the indicator connector 2101 of switch 2100, lead 25H through cable 28C, the front contact of the operated armature 3 of relay 28SA to the winding of relay 28SA1 causing relay 28SA1 to release. The operation release of relays 28SA1 and 28SA in the indicator control circuit 2801 provides for the alternate use of the allotters 2800 and 2901. Relay 28SA remains operated over a path to ground through the back contact of normal armature 2 of relay 28SA1 and lead 25H. Relay 28SA remains operated and relay 28SA1 released as long as ground is applied through lead 25H which is as long as the hold magnet 21F1 remains operated. Succeeding calls which originate while the crosspoints associated with the hold magnet 21F1 are still closed will also be served by the indicator allotter 2800. When as hereinafter described the hold magnet 21F1 is released, ground is removed from the winding of relay 28SA allowing it to release. When the next call is served the operation of one of the indicator connectors 2003–4 and 2101–2 will cause the operation of relay 28SA1 to provide for the operation of the indicator allotter 2901 instead of 2800. When the operated one of indicators 2003–4 and 2101–2 for the next call thereafter releases the shunting ground through the normal armature 3 of relay 28SA is removed allowing it to operate. After the next call, therefore, both relays 28SA and 28SA1 are operated to complete the allotting cycle. When both relays 28SA and 28SA1 are operated or when relay 28SA alone is operated, as described above, the allotter 2800 is utilized and when both relays 28SA and 28SA1 are released or when relay 28SA1 is operated allotter 2901 is utilized.

Returning now to the call being described herein the operation of relay 27TS as indicated above also causes the operation of relay 22E or 22F in the trunk 22T1 depending upon the tens digit registered as indicated in the following table:

| Tens Digit | Relay Operated |
|---|---|
| 0, 3, 5 or 8 | Neither. |
| 1, 4, 6 or 9 | 22E. |
| 2 or 7 | 22F. |

In the illustrative operation being described with a tens digit of 9, relay 22E is operated over a path from battery 22D4 through the winding of relay 22E, the operated armature 7 of relay 22TC02, lead 22E1 through cable 23C4, the operated armature 12 of relay 27TS, the operated armature 6 of relay 27PC2 and the operated armature 6 of relay 27ZP to ground. The operation of relay 22E extends the talking path from the leads 16TT1 and 16TR1 through the capacitors 22CA1 and 22CA2, the repeat coil 22RC and the operated armatures 1 and 3 of relay 22E to the trunk connector 1900T. When relay 22E operates, it also locks to ground through its operated armature 2, the operated armatures 2 and 4 of relay 22TC01 and the armature of the hold magnet 21D. The ground is supplied to the winding of the hold magnet 21D and upon its operation through its armature upon the operation of relay 27TS as indicated above which causes the operation of one of the hold magnets 21A, 21B, 21C or 21D of the crossbar switch 2100 depending upon the tens digit as indicated in the following table:

| Tens Digit | Hold Magnet |
|---|---|
| 0, 1 or 2 | 21A. |
| 3 or 4 | 21B. |
| 5, 6 or 7 | 21C. |
| 8 or 9 | 21D. |

In the illustrative operation being described with a tens digit of 9, the operating path for hold magnet 21D is from the battery 21D4 through the winding of hold magnet 21D, the operated armature 1 of relay 22TC02, lead 22D through cable 23C4, the operated armature 7 of relay 27TS, the operated armature 3 of relay 27XP, the operated armature 3 of relay 27PC2 and the operated armature 3 of relay 27YP to ground. The operation of the hold magnet 21D, together with the select magnet 25S1, closes a set of contacts extending a talking path from the trunk 16T1 through the trunk connector 1900T to the jack 18J91 in switchboard 1800. The leads 22L5 and 22L6 are connected from the operated armatures 1 and 3 of relay 22E through the contacts or crosspoints 21L and 21P to leads 21T and 21R through cables 18C1 and 18C5, respectively, which are connected together and through cable 18C to the leads 18T91 and 18R91 which are connected to the jack 18J91. In this manner the trunk 22T1 is connected to the jack 18J91 when the hold magnet 21D and the relay 22E are operated.

When the hold magnet 21D is operated, its operated ground is extended as a holding ground for the relay 22E as described above and is also connected to the winding of relay 22TC01 which is also connected to the battery 22D1. Relay 22TC01 operates and causes the release of the relay 22TC02, the operating path of which is connected through the back contacts of normal armatures 4 and 2 of relay 22TC01. When relay 22TC01 operates, it also locks to ground through its operated armature 4 and the operated armature of relay 22TC to ground. The same ground from the operated armature of relay 22TC functions to hold magnet 21D and relay 22E in their operated conditions. When relay 22TC02 releases, it opens the original operating paths for the hold magnets 21A, 21B, 21C and 21D and for the relays 21E and 21F. The relay 22E and the hold magnet 21D, however, as described above, remain operated.

When relay 22TC01 operates, it also connects ground through its operated armature 1, and the winding of relay 18CT to battery 18D3 to cause the operation of relay 18CT. Relay 18CT is part of a battery control circuit 1801 which is utilized when a suitable voltage supply is unavaliable at the location of the terminating end. When the circuit 1801 is idle, which is when relay 18CT is normal, a trickle charge of approximately 0.070 ampere is maintained on the battery 18D3 and the other batteries in the terminating end as designated by the arrow 18A. When one of the trunks 22T1–4 is seized as described above and relay 22TC01 is operated the charging rate of circuit 1801 is increased to 0.120 ampere.

When relay 18CT operates, it in turn causes the release of relay 18CC, the winding of which was connected to battery 18D3 through the normal armature of relay 18CT. When relay 18CC releases it shorts the resistive branch 18R1 which is serially connected with the branch 18R2 between the charging source 1802 and battery 18D3 together with the batteries designated by the arrow 18A.

When the trunk 22T1 is released, as is hereinafter described, and relay 22TC01 releases, it releases relay 18CT which in turn operates relay 18CC. When relay 18CC operates it removes the shunt across branch 18R1 to reduce the charging current to 0.070 ampere. If the voltage should drop so that relay 18CC does not reoperate once it is released the 0.120-ampere charging rate is maintained until the voltage increases sufficiently to cause relay 18CC to operate.

With relays 22TC02 and 26C1 released, relay 23CA in the controller connector 2300 also releases. The operating path as described above for the relay 23CA was through the operated armature 6 of relay 22TC02 or through the operated armature 9 of relay 26C1 to ground. When relay 23CA releases, it opens the operating path for relay 23CB1 and operates relay 23CB. Relay 23CB is operated over a path from ground on the operated armature 2 of relay 23CB1, the normal armature 3 of relay 23CA, and the winding of relay 23CB to battery 23D3. With relay 23CA released, the leads 22R0 and 22R1 from the controller 2700 are transferred at armatures 1 and 2 of relay 23CA to the controller 2900 to provide for the alternate use thereof. When relay 26C1 releases during the next call it will cause relay 23CA to operate and relay 23CB to release and thus provide for the utilization of controller 2700 so that the controllers 2700 and 2900 are alternately utilized on successive calls unless the exercise keys 23AR or 23EA are utilized.

When relay 23CA releases, it opens the operating path at its armature 3 causing the release of the relay 27SM in the controller 2700 to provide for the release of the controller 2700. When relay 27SM releases, it in turn provides for the release of the register relays 27XP, 27YP and 27ZP and the relays 27X and 27Y in a similar manner as described above after the registration of the units digit. The release of the register relays 27XP, 27YP and 27ZP and the relays 27X and 27Y in turn cause the release of the relays 27PC and 27PC1 which were operated through the operated armature 5 and an operated armature 8 of one of the register relays. The release of the relay 27PC opens the operating path for the relay 27PC2 at its armature 1 and for relay 27TS at its armature 6. The release of the relay 27PC1 causes the release of relay 28AC in the allotter 2800 by removing ground at armature 2 of relay 27PC1 to commence a walking sequence, similar to the walking sequence of allotter 1700 described above, to return the allotter 2800 to normal. When relay 28AC releases, it causes the release of relays 28I0 and 28HM and the operation of the relay 28IT. The operating path of relay 28I0 was through the operated armature 3 of relay 28AC and the operating path for relay 28HM was through the operated armature 1 of relay 28AC. Relay 28I1 remains operated from battery 28I1B through its lower winding, the right normal armature of key 28I1K, the operated armature 2 of relay 28I1, the serially connected normal armatures 2 of relays 28I2–4, the operatde armature 1 of relay 28I1, the normal armature 3 of key 28I2K and the back contact of normal armature 3 of relay 28AC to ground. Relay 28IT is operated from ground through the normal armature 1 of relay 28SA1, the operated armature 1 of relay 28SA, the normal armature 2 of relay 28AC, the normal armature 1 of relay 28IT1, and the winding of relay 28IT to battery 28D1.

When relay 28IT operates, it causes the operation of relay 28IT1 which is connected to battery 28D5 and to ground through the operated armature 2 of relay 28IT. The relays 28IT and 28IT1 function as advance relays for the allotter 2800 in a similar manner as the advance relays 17ADV and 17ADV1 in the allotter 1700. When relay 28IT1 operates, it opens the operating path of the slow-to-release relay 28IT which in turn operates relay 28AC and opens the operating path for relay 28IT1. The operating path for relay 28AC is from ground through the normal armature 1 of relay 28IT, the operated armature 2 of relay 28IT1, and the winding of relay 28AC to battery 28ACB.

When relay 28AC operates, it in turn operates relay 28I2 which is connected to battery 28I2B and through the normal armature 4 of key 28I2K, the upper winding of relay 28I1, the operated armature 4 of relay 28I1, the normal armature 2 of relay 28I0, and the operated armature 3 of relay 28AC to ground. When relay 28I2 operates, it connects ground through its operated armature 8 to relay 26C1 in the indicator circuit 26IND2.

When relay 28IT1 finally releases, it releases relay 28AC, which in turn releases relay 28I1 and reoperates relay 28IT. When relay 28I1 releases, it in turn releases relay 26C1 in a circuit 26IND2. The operation of relay 28IT commences another similar step in the walking sequence with relay 28I3 being operated and relay 28I2 being released. In a similar manner relay 28I4 is operated and relay 29I3 released. When relay 28I3 releases, relay 28I4 also releases and relay 28I0 is operated. During the next step in the walking sequence, relay 28I1 is reoperated to reoperate relay 26C1. When relay 26C1 operates, it releases relays 21F1, 26A and 26C to release the connector 2101 and extinguish the lamp 18L91. When magnet 21F1 releases, it causes the operation of relay 28SA1 to provide for the operation of allotter 2901 for the next call.

When relay 28IT1 releases for the last time, it releases relay 28AC which in turn releases relay 28I0 and relay 26C1 in order. Only relay 28I1 is operated in allotter 2800 so that the circuit 26IND2 will be allotted the next time allotter 2800 is utilized. The walking sequence in allotter 2800, in this manner, determines the length of time that the lamp 18L91 is energized at the switchboard 1800. The walking sequence is halted as is hereinafter described when the attendant answers the call.

When the answering service attendant plugs into the answering jack 18J91 with cord 18AN which is connected to the switchboard cord circuit 18C0 and operates a listening key, not shown, in circuit 19C0, responsive to the visual indication provided by the lamp 18L91 and the audible indication provided by the buzzer relay 18PB, the lamp 18L91 is extinguished, relay 26C1A is released, the buzzer relay 18PB is released, if not already released by key 18PS, and the relay 22TCA operated. When the crosspoints were closed at the hold magnet 21D in trunk connector 1900T a path was closed as described above from the lower or primary winding of relay 22TCA to the answering jack 18J91. The relay 22TCA did not, however, operate when magnet 21D operated because of the shunting path, described above, through the winding of relay 26C1A and the lamp 18L91. When, however, the attendant plugs into jack 18J91 and opens the shunting path, relay 22TCA operates over a path from battery 22D1, the lower winding of relay 22TCA, the lower right winding of repeat coil 22RC, the operated armature 3 of relay 22E, lead 22L2 through the trunk connector 1900T, cable 18C, lead 18T91, the attendant's cord circuit dry bridge, lead 18TR91 through cable 18C, back through trunk connector 1900T, lead 22L1, the operated armature 1 of relay 22E, the upper right winding of coil 22RC and resistor 22TS to ground. When relay 22TCA operates, it locks through its lower and upper winding and its armature 2 to ground. The operation of relay 22TCA shunts the high resistance lower winding over a path through the operated armature 1 of relay 22TCA, lead 23T6 through cable 22C, resistor 23R1S to ground. When the lower winding of relay 22TC is shunted in this manner, relay 16S which is connected through the tip lead 16TT1, as described above, to the upper winding of relay 22TC, is allowed to operate. When relay 16S operates, it closes the talking path through its operated armature 1 and the parallel circuit consisting of resistor 16RD and capacitor 16CD to trip ringing. A talking path is established in this manner from the jack 18J91 through the trunk connector 1900T, trunk 22T1 and 16T1, trunk connector 900 and line 7P91 to the calling subscriber.

When relay 16S operates it also closes an operating path for relay 17TB1 which functions to make the trunk 16T1 busy. The operating path for relay 17TB1 is from ground through the back contact of the normal armature 1 of relay 17T, the operated armature 2 of relay 16S, the upper winding of relay 17TB1 to battery 17C3. When relay 17TB1 operates, it shifts the operating path for relay 17TA1 to relay 17TA2 and functions to stop the timing operation of the allotter 1700. The timing function, as is hereinafter described, is under control of an advance relay 17ADV, the operating path of which is through the normal armature 1 of relay 17TB1.

When the attendant plugs an answering cord into jack 18J91, as described above, it also opens the operating path, which is the same for lamp 18L91, for relay 26C1A in the indicator 26IND1. When relay 26C1A releases, it removes locking ground from the hold magnet 21F1 in the indicator connector 2101 causing it to release. When relay 21F1 releases, it removes ground through lead 25H from relay 28SA causing it to release so that allotter 2901 will be utilized for the next call.

When both relays 28SA and 28SA1 in the allotter control circuit 2801 are either both operated or both released, the operating path for the advance relay 28IT is opened to stop the walking sequence of the allotter 2901 or 2800, respectively.

If the attendant does not answer or plug into jack 18J91 responsive to the energization of lamp 18L91, the lamp 18L91 remains energized for the duration of the allotter walking sequence of the allotter 2800 as described above, or for approximately one and one-half seconds.

After the conversation between the calling subscriber and the attendant is terminated, the attendant disconnects from jack 18J91 causing relay 22TCA to release by opening its operating path through jack 18J91. When relay 22TCA releases, it removes the shunting path for the lower winding of relay 22TC causing relay 16S in the trunk 16T1 to release.

When relay 16S releases, it functions to reopen the talking path through its armature 1 and to return the trunk allotter 1700 to normal. The release of relay 16S opens the operating path through its armature 2 for the relay 17TB1 causing it to release.

With relay 17TA1 operated, relay 17TB1 normal, and controller 1000 normal, the advance relay 17ADV is operated from ground through the normal armature 1 of relay 17TC, the operated armature 7 of relay 17TA1, the back contacts of normal armatures 6 of relays 17TA2–4, the normal armature 1 of relay 17TB1, the operated armature 4 of relay 16S1, the normal armature 1 of relay 17ADV1 and the winding of relay 17ADV to battery 17C7.

The operation of relay 17ADV commences the trunk allotter walking sequence described above to return the allotter 1700 to normal. The relay 17TA1 is released and relays 17A2–4 and 17TA0 are operated and released in order. When relay 17TA1 is reoperated during the walking sequence it reoperates relay 16TS which causes the release of relay 16S1. When relay 16S releases it releases the operated one of relays 16C10 and 16C11, if it is operated, and releases the hold magnet 12H6 which provides the connection between trunk 16T1 and the line 7P91. When relay 16S1 releases it also opens the operating path for the relay 17ADV to stop the walking sequence. Only relay 17TA1 in the allotter 1700 remains operated so that relay 17TA2 is operated for the next call to select trunk 16T2.

The attendant at the answering bureau may hold the trunk connections and halt the timing or walking sequence operation of the allotters 1700 and 2900 while answering a call by plugging in other answering cords 18AN into the indicated jack and operating holding keys, not shown, in the respective cord circuits 18C0. Relays 16S in the allotted ones of trunks 16T1–4 will be operated as described above to halt the allotter 1700 and relay 26C1A in the allotted ones of circuits 26IND1–4 will be also operated as described above the halt the allotter 2800.

Numerous other arrangements may be devised by those skilled in the art without departing from the spirit and scope of the invention. For example, the allotting of one of the trunks 16T1–4 may be timed by slow operating relay, or vacuum or gas tube circuits instead of by a walking sequence as described above; two alternatively functioning allotters may be used in the originating end; the number of trunks and serviced lines may be greater or smaller in number; the pulsing code may be varied; etc. It is to be understood, therefore, that the above-described arrangement is only illustrative of the application of the principles of the invention.

What is claimed is:

1. An answering system for subscribers in a telephone exchange comprising an answering position; a plurality of communication channels less in number than the number of said subscribers for connecting said answering position with said exchange; means responsive to ringing current on the line of one of said subscribers for transmitting signals which are indicative of the identity of the called subscriber over a portion of a predetermined one of said channels; means responsive to ringing current on the line of one of said subscribers for allotting a free channel for answering from said answering position; and means at said answering position responsive to said transmitted signals for providing an indication of the identity of said called subscriber.

2. An answering system in accordance with claim 1 wherein said signal transmitting means is independent in operation of the talking path availability of said channels for answering calls from said answering position.

3. An answering system in accordance with claim 2 comprising means at said answering position for signaling over a portion of a predetermined one of another of said channels to check the operation of said indication providing means.

4. An answering system in accordance with claim 3 wherein said signal transmitting means comprises holding means responsive to ringing current upon more than one of the lines of said subscribers whereby signals which are indicative of the identity of called subscribers are transmitted once before any are repeated.

5. An answering system for servicing a plurality of subscribers' lines comprising an originating end; a terminating end; a plurality of trunks less in number than said plurality of subscribers' lines for connecting said originating end with said terminating end; means at said originating end for recognizing the called condition of one of said subscribers' lines; means at said originating end responsive to said recognizing means for identifying the called subscriber's line; means at said originating end controlled by said identifying means for allotting one of said plurality of trunks; means at said originating end responsive to said allotting means for connecting said allotted trunk to said called line; means at said originating end controlled by said identifying means for transmitting the identity of said called line over a predetermined one of said trunks to said terminating end; means at said terminating end for registering the transmitted identity of said called line; means at said terminating end controlled by said registering means for providing an indication of said called line; and means at said terminating end controlled by said registering means for providing a talking path from said indicating means to said called line.

6. In a telephone system, a calling station; a plurality of lines; means for extending a call from said calling station to any called one of said lines and for initiating the transmission of ringing current thereover; line identity apparatus controlled by the extension of a call to any called one of said lines for identifying said called line; an answering bureau; a plurality of trunks smaller in number than said plurality of lines for connecting said answering bureau with said line identity apparatus; means controlled by the extension of a call to any called one of said lines for seizing an idle one of said trunks; means at said answering bureau controlled by said line identity apparatus for providing an indication of said identified called line; and means controllable from said answering bureau for answering the indicated call.

7. In a telephone system in accordance with claim 6, means whereby the operation of said line identity apparatus and said indication providing means is independent of the talking path availability of said trunks.

8. In a telephone system in accordance with claim 7, a plurality of terminating means at said answering bureau corresponding to said plurality of lines; and means at said answering bureau responsive to said idle trunk seizure means for connecting said seized trunk to said terminating means corresponding to said called line.

9. In a telephone system in accordance with claim 8 wherein said indication providing means comprises a plurality of indicating devices corresponding to said plurality of lines and positioned respectively adjacent said terminating means.

10. An answering system for servicing a plurality of subscribers' lines comprising an originating end; a terminating end; and a plurality of trunks less in number than said plurality of subscribers' lines for connecting said originating end with said terminating end; means at said originating end for recognizing the called condition of one of said subscribers' lines; means at said originating end responsive to said recognizing means for identifying said called subscriber's line; means at said originating end controlled by said identifying means for alloting one of said plurality of trunks; means at said originating end responsive to said allotting means for connecting said allotted trunk to said called line; means at said originating end controlled by said identifying means for transmitting the identity of said called line over a predetermined one of said trunks to said terminating end; means at said terminating end for registering the transmitted identity of said called line; a plurality of termination means at said terminating end and corresponding to said subscribers' lines; means at said terminating end controlled by said registering means for selecting said termination means corresponding to said called line; and means at said terminating end controlled by said registering means for connecting said allotted trunk to said selected termination means.

11. An answering system in accordance with claim 10 comprising, in addition, visual indication means at each of said termination means responsive to said selecting means.

12. An answering system in accordance with claim 10 comprising, in addition, means at said originating end responsive to said recognizing means for maintaining said recognizing means operated during the operation of said transmitting means and said allotting means although said called subscriber's line ceases to be in a called condition.

13. In combination a plurality of lines; an electronic device for each of said lines responsive to ringing current thereover; means controlled by said devices for identifying a called one of said lines; an answering position; an answering line for connecting said answering position to said called line; means controlled by said identifying means for establishing a connection between said called line and said answering line; and means at said answering position operating independently of said connection establishing means and controlled over a portion of said answering line by said identifying means for providing an indication of said called line.

14. In combination in accordance with claim 13, a plurality of termination means at said answering position corresponding to said plurality of lines; and means at said answering position responsive to said connection establishing means for establishing a connection between said termination means corresponding to said called line and said answering line, said indication providing means comprising a plurality of indicating devices corresponding to said plurality of lines positioned respectively adjacent said termination means.

15. In an answering service system a plurality of lines, a plurality of switchboard jacks remotely located from said lines corresponding individually with said lines; an identifier for identifying a called one of said lines; a plurality of links less in number than said plurality of lines for providing a connection from said lines to said jacks; an originating concentrator controlled by said identifier for providing a connection between an idle one of said links and said called line; a register remotely located with said jacks and controlled by said identifier over a portion of predetermined ones of said links; an indicator located with said jacks and controlled by said register for providing an indication at said jack corresponding to said called line; and a concentrator remotely located with said jacks for providing a connection between said indicated jack and said link connected to said called line.

16. In an answering service system in accordance with claim 15, means controlled through said indicated jack for providing a talking path through said link connected to said called line and to said indicated jack.

17. In an answering service system in accordance with claim 15 comprising, in addition, means controlled by said identifier for pulsing signals indicative of the identity of said called line over a portion of a predetermined one of said links to said register.

18. In an answering service system in accordance with claim 17 wherein said originating concentrator comprises means for allotting an idle one of said links for a predetermined interval, and means responsive to answering a call at said switchboard jack for interrupting said allotter means and for maintaining said allotted link connected.

19. In an answering service system in accordance with claim 18 wherin said allotter means comprises means for providing a shorter predetermined interval when some of said links are busy.

20. In an answering service system in accordance with claim 19, alternate allotter means responsive upon the failure of said allotter means to allot an idle one of said links for allotting a predetermined one of said trunks and wherein said allotter means comprises means for inhibiting the operation of said alternate allotter means when all of said links are busy.

21. In an answering service system a plurality of lines, a plurality of switchboard jacks remotely located from said lines and corresponding individually with said lines; an identifier for identifying a called one of said lines; a plurality of links less in number than said plurality of lines for providing a connection from said lines to said jacks; means controlled by said identifier for pulsing signals indicative of the identity of said called line over a portion of a predetermined one of said links; an originating concentrator controlled by said identifier for providing a connection between an idle one of said links and said called line comprising means for allotting an idle one of said links for a predetermined interval and means for providing progressively shorter predetermined intervals in accordance with the unavailability of said links; means whereby the operation of said pulsing means is independent of the talking path availability of said links; a register remotely located with said jacks controlled by said pulsing means over said predetermined one of said links; an indicator controlled by said register for providing an indication of one of said jacks corresponding to said called line; a concentrator remotely located with said jacks for providing a connection between said indicated jack and said link connected to said called line; means controlled through said indicated jack for providing a talking path through said link connected to said called line and to said indicated jack; and means responsive to answering a call at said switchboard jack for interrupting said allotter means and for maintaining said allotted link connected.

22. A scanning and concentrating system comprising a plurality of conductive lines; means for applying a varying potential to any one of said lines; a line scanner for detecting the occurrence of a varying potential on any one of said lines; a plurality of channels less in number than said plurality of lines; means responsive upon the detection of a varying potential by said scanner for alloting one of said channels; and a concentrator controlled by said scanner for connecting said line having the varying potential thereon to said allotted channel.

23. A scanning and concentrating system comprising a plurality of conductive lines; means for applying varying potentials to said lines; a line scanner for recognizing the occurrence of varying potentials on said lines; a plurality of channels less in number than said plurality of lines; a concentrator controlled by said scanner for connecting said lines having varying potentials thereon to said channels; and encoding means controlled by said scanner and operating independently of the availability of said channels for providing a coded representation of the identity of said lines having varying potentials thereon to a preddetermined one of said channels.

24. A scanning and concentrating system in accordance with claim 23 comprising a remote position connected to said channels having a plurality of output devices corresponding respectively with said plurality of lines, a concentrator for connecting said devices to said channels, and decoding means responsive to the coded representation of said lines for operating said concentrator of said remote position to connect said devices corresponding to lines having varying potentials thereon to said channels.

25. An answering service system comprising a plurality of service lines; a line scanner for recognizing the called condition of any one of said lines; an identifier controlled by said scanner for identifying said called line; an answering bureau; a trunk connected to said answering bureau; a first trunk connector controlled by said identifier for connecting said trunk to said called line; a first controller controlled by said identifier for transmitting a coded representation of the identity of said called line over a portion of said trunk to said answering bureau independently of the operation of said first trunk connector; a second controller located at said bureau for registering said coded representations from said first controller; a switchboard having a plurality of positions thereon corresponding respectively to said plurality of lines; indicating means controlled by said second controller for providing an indication at said position on said switchboard which corresponds to said called line; and a second trunk connector located at said bureau and controlled by said second controller for connecting said position on said switchboard which corresponds to said called line to said trunk.

26. An answering service system in accordance with claim 25 wherein said indicator means comprises a plurality of indicator circuits less in number than said plurality of positions; an indicator allotter responsive upon the operation of said second controller for selecting one of said indicator circuits; an indicating device at each of said positions; a plurality of indicator connectors corresponding selectively with said indicator circuits and controlled by said second controller for energizing said indicating device at said position corresponding to said called line.

27. An answering service system comprising a plurality of serviced lines; a line scanner for recognizing the called condition of any one of said lines; an identifier controlled by said scanner for identifying said called line; an answering bureau; a plurality of trunks less in number than said plurality of lines; a first trunk allotter responsive upon the operation of said identifier for selecting an idle one of said trunks; a second trunk allotter responsive upon the failure of operation of said first allotter for selecting a predetermined one of said trunks; a first trunk connector controlled by said identifier for connecting said selected trunk to said called line; a first controller controlled by said identifier for transmitting a coded representation of the identity of said called line over a portion of a predetermined one of said trunks to said answering bureau independently of the availability of an idle one of said trunks; a trouble timing circuit initiated in operation by said scanner for providing a portion of a different predetermined one of said trunks for the transmission of said coded representations from said first controller upon the occurrence of a trouble condition for a predetermined interval; a second controller located at said bureau for registering said coded representations from said first controller; a switchboard having a plurality of positions thereon corresponding respectively to said plurality of lines; indicating means controlled by said second controller for providing an indication at said position on said switchboard which corresponds to said called line; and a second trunk connector located at said bureau and controlled by said second controller for connecting said position on said switchboard which corresponds to said called line to said seized trunk.

28. An answering service system in accordance with claim 27 wherein some of said lines are multiparty lines; and wherein said scanner comprises means for recognizing the different calling conditions of said multiparty lines.

29. An answering service system in accordance with claim 27 comprising, in addition, means for delaying the operation of said first controller when another one of said lines is in a called condition until said indication is provided at said position; a first timing means responsive to said first controller for normalizing said first connector after a predetermined interval; a second timing means responsive to said second controller for normalizing said second connector; means at said switchboard for answering the call extended from said called line through said selected trunk to said position on said switchboard; and means responsive upon the answering of the call for interrupting said first and said second timing means.

30. An answering service system in accordance with claim 29 wherein said indicator means comprises a plurality of indicator circuits less in number than said plurality of positions; an indicator allotter responsive upon operation of said second controller for selecting one of said indicator circuits; an indicating device at each of said positions; a plurality of indicator connectors corresponding selectively with said indicator circuits and controlled by said second controller for energizing said indicating device at said position corresponding to said called line wherein some of said lines are multiparty lines; and wherein said scanner comprises means for recognizing the different calling conditions of said multiparty lines.

31. In an answering service system a plurality of lines, a plurality of switchboard jacks remotely located from said lines corresponding individually with said lines; an identifier for identifying a called one of said lines; a pluralty of links less in number than said plurality of lines for providing a connection from said lines to said jacks; an originating concentrator controlled by said identifier for providing a connection between an idle one of said links and said called line; a register remotely located with said jacks and controlled by said identifier over a portion of predetermined ones of said links; an indicator located with said jacks and controlled by said register for providing an indication at said jack corresponding to said called line; a concentration remotely located with said jacks for providing a connection between said indicated jack and said link connected to said called line; and a trouble and progress indicating circuit having means for indicating the progress of a call, means for indicating a trouble condition in said identifier, said links, said orignating concentrator, said register, said indicator and said remote concentrator, and means for maintaining the indication of the progress of a call after the occurrence of a trouble condition.

References Cited in the file of this patent

UNITED STATES PATENTS

| | | |
|---|---|---|
| Re. 23,054 | Deakin | Dec. 7, 1948 |
| 745,734 | Miner | Dec. 1, 1903 |
| 1,779,748 | Nicolson | Oct. 28, 1930 |
| 1,922,879 | Burgener | Aug. 15, 1933 |
| 2,685,614 | Curtin | Aug. 3, 1954 |
| 2,724,744 | Brewer et al. | Nov. 22, 1955 |
| 2,783,307 | Brewer | Feb. 26, 1957 |